United States Patent
Bailey et al.

(10) Patent No.: US 10,919,995 B2
(45) Date of Patent: Feb. 16, 2021

(54) OLEFIN POLYMERIZATION CATALYST SYSTEMS AND METHODS OF USE THEREOF

(71) Applicant: Dow Global Technologies LLC, Midland, MI (US)

(72) Inventors: Brad C. Bailey, Midland, MI (US); Matthew D. Christianson, Midland, MI (US); Sanil Sreekumar, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 279 days.

(21) Appl. No.: 16/089,559

(22) PCT Filed: Mar. 30, 2017

(86) PCT No.: PCT/US2017/025021
§ 371 (c)(1),
(2) Date: Sep. 28, 2018

(87) PCT Pub. No.: WO2017/173079
PCT Pub. Date: Oct. 5, 2017

(65) Prior Publication Data
US 2020/0299430 A1    Sep. 24, 2020

Related U.S. Application Data

(60) Provisional application No. 62/315,984, filed on Mar. 31, 2016.

(51) Int. Cl.
*C08F 210/16* (2006.01)
*C07F 7/00* (2006.01)

(52) U.S. Cl.
CPC .............. *C08F 210/16* (2013.01); *C07F 7/00* (2013.01); *C08F 2410/01* (2013.01)

(58) Field of Classification Search
CPC ....... C08F 210/16; C08F 2410/01; C07C 7/00
See application file for complete search history.

(56) References Cited

U.S. PATENT DOCUMENTS

| | | | |
|---|---|---|---|
| 3,709,853 A | 1/1973 | Karapinka | |
| 4,003,712 A | 1/1977 | Miller | |
| 4,011,382 A | 3/1977 | Levine et al. | |
| 4,302,566 A | 11/1981 | Karol et al. | |
| 4,543,399 A | 9/1985 | Jenkins, III et al. | |

(Continued)

FOREIGN PATENT DOCUMENTS

| | | | |
|---|---|---|---|
| EP | 802202 A1 | 10/1997 | |
| WO | 9745434 A1 | 12/1997 | |

(Continued)

OTHER PUBLICATIONS

Kretschmer et al., Journal of Organometallic Chemistry, vol. 692, Oct. 21, 2007, pp. 4569-4579.*
International Search Report and Written Opinion pertaining to PCT/US2017/0025021 dated Jun. 2, 2017.
Boaretto et al., "Synthesis, Characterization and Reactivity of New Complexes of Titanium and Zirconium Containing a Potentional Tridentate Amidinato-Cyclopentadienyl Ligand", Dalton Trans., 2007, 5179-5189.
Doye et al., "An (Aminopyrimidinato)titanium Catalyst for the Hydroamination of Alkyenes and Alkenes", Eur. J. Org. Chem., 2013, 7583-7592.
Fahey et al., "Application of Metallocene Catalysts to Large-scale Slurry Loop Reactors", Metallocene-based Polyolefins, 2000, Chapter 14, 321-332.
Kempe et al., "Synthesis and Structure of Mononuclear Titanium Complexes Containing ansa-Aminopyridinato Ligands", Chem. Ber., 1996, 129, 1087-1091.
Kretschmer et al., "Highly Active/Selective and Adjustable Zirconium Polymerization Catalysts Stabilized by Aminopyridinato Ligands", Journal of Organometallic Chemistry, 2007, 692, 4569-4579.
Narayana et al., "Access to Ultra-High-Molecular Weight Poly(ethylene) and Activity Boost in the Presence of Cyclopentene with Group 4 Bis-Amido Complexes", ChemPlusChem, 2014, 79, 151-162.
Noor et al., "Synthesis and Structure of Zirconium and Hafnium Polymerisation Catalysts Stabilised by Very Bulky Aminopyridinato Ligands", Eur. J. Inorg. Chem., 2008, 5088-5098.

(Continued)

*Primary Examiner* — Robert D Harlan
(74) *Attorney, Agent, or Firm* — Dinsmore & Shohl LLP

(57) ABSTRACT

An olefin polymerization catalyst system includes a procatalyst component chosen from metal-ligand complexes of Formula (I): In Formula (I), each X is independently a monodentate or polydentate ligand that is neutral, monoanionic, or dianionic; the metal-ligand complex of Formula (I) is overall neutral; each $Y^1$-$Y^4$ and $Y^7$-$Y^{10}$ independently is selected from C or N such that six membered diaza ($N_2$) or triaza ($N_3$) rings are formed; wherein each $R^1$ and $R^{10}$ independently are chosen from ($C_1$-$C_{40}$) hydrocarbyl, substituted ($C_1$-$C_{40}$) hydrocarbyl, ($C_1$-$C_{40}$) heterohydrocarbyl, and substituted ($C_1$-$C_{40}$) heterohydrocarbyl or is absent; each $R^2$, $R^3$, $R^4$, $R^7$, $R^8$, and $R^9$ is chosen from hydrogen; ($C_1$-$C_{40}$) hydrocarbyl; substituted ($C_1$-$C_{40}$) hydrocarbyl; ($C_1$-$C_{40}$) heterohydrocarbyl; substituted ($C_1$-$C_{40}$) heterohydrocarbyl; halogen, nitro ($NO_2$) or is absent; each $R^5$ and $R^6$ independently is chosen from ($C_1$-$C_{40}$) hydrocarbyl, substituted ($C_1$-$C_{40}$) hydrocarbyl, ($C_1$-$C_{40}$) heterohydrocarbyl, and substituted ($C_1$-$C_{40}$) heterohydrocarbyl.

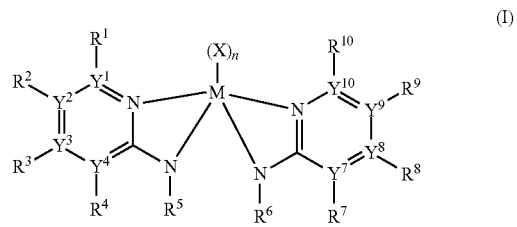

(I)

12 Claims, No Drawings

(56) References Cited

U.S. PATENT DOCUMENTS

| | | | |
|---|---|---|---|
| 4,613,484 A | 9/1986 | Ayres et al. | |
| 4,882,400 A | 11/1989 | Dumain et al. | |
| 5,064,802 A | 11/1991 | Stevens et al. | |
| 5,153,157 A | 10/1992 | Hlatky et al. | |
| 5,296,433 A | 3/1994 | Siedle et al. | |
| 5,321,106 A | 6/1994 | Lapointe | |
| 5,350,723 A | 9/1994 | Neithamer et al. | |
| 5,352,749 A | 10/1994 | Dechellis et al. | |
| 5,425,872 A | 6/1995 | Devore et al. | |
| 5,541,270 A | 7/1996 | Chinh et al. | |
| 5,625,087 A | 4/1997 | Neithamer et al. | |
| 5,721,185 A | 2/1998 | Lapointe et al. | |
| 5,783,512 A | 7/1998 | Jacobsen et al. | |
| 5,883,204 A | 3/1999 | Spencer et al. | |
| 5,919,983 A | 7/1999 | Rosen et al. | |
| 6,103,657 A | 8/2000 | Murray | |
| 6,515,155 B1 | 2/2003 | Klosin et al. | |
| 6,696,379 B1 | 2/2004 | Carnahan et al. | |
| 7,163,907 B1 | 1/2007 | Canich et al. | |
| 2013/0131294 A1* | 5/2013 | Hagadorn | C08F 210/16 526/170 |

FOREIGN PATENT DOCUMENTS

| | | |
|---|---|---|
| WO | 2012155022 A1 | 11/2012 |
| WO | 2014139861 A1 | 9/2014 |

OTHER PUBLICATIONS

Talja et al., "Bis(alkylphenylaminopyridinato) Titanium Dichlorides as Ethylene Polymerization Catalysts", Journal of Molecular Catalysis A: Chemical, 2008, 280, 102-105.

* cited by examiner

OLEFIN POLYMERIZATION CATALYST SYSTEMS AND METHODS OF USE THEREOF

CROSS-REFERENCE TO RELATED APPLICATIONS

This application claims the benefit of priority to U.S. Provisional Application Ser. No. 62/315,984, filed Mar. 31, 2016, which is incorporated herein by reference in its entirety.

TECHNICAL FIELD

Embodiments of the present disclosure generally relate to olefin polymerization catalysts and catalyst systems. More specifically, embodiments of the present disclosure relate to olefin polymerization catalyst systems including a procatalyst component, olefin-based polymers that contain the polymerization reaction of the catalyst system, and processes for polymerizing olefin-based polymers using the catalyst systems.

BACKGROUND

Olefin based polymers such as polyethylene are produced via various catalyst systems and polymerization processes. Selection of such catalyst systems used in the polymerization process of the olefin based polymers is an important factor contributing to the characteristics and properties of such olefin based polymers.

The polyolefin polymerization process can be varied in a number of ways to produce a wide variety of resultant polyolefin resins having different physical properties suitable for use in different applications. It is generally known that polyolefin can be produced in solution phase polymerization process, gas phase polymerization process, and/or slurry phase polymerization process in one or more reactors, for example, connected in series or parallel, in the presence of one or more catalyst systems.

Despite the currently available olefin polymerization catalyst systems, there is a need for an olefin polymerization catalyst system having improved properties facilitating the production of high molecular weight ($M_w$) polyolefins with narrow polydispersities.

SUMMARY

The present embodiments address these needs by providing olefin polymerization catalyst systems, methods of using the catalyst systems, and polymers produced therefrom that facilitate high molecular weight polyolefin production with narrow polydispersities and low octene concentrations.

The disclosure provides an olefin polymerization catalyst system comprising: a procatalyst component comprising a metal-ligand complex of Formula (I):

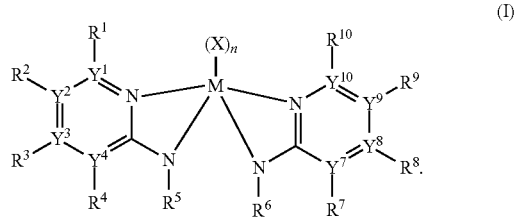

In Formula (I), M is titanium, zirconium, or hafnium; each X is independently a monodentate or polydentate ligand that is neutral, monoanionic, or dianionic; n is an integer; and the metal-ligand complex of Formula (I) is overall charge-neutral. Each of $Y^{1-4}$ is independently selected from C or N with the proviso that exactly one of $Y^{1-4}$ is N or exactly two of $Y^{1-4}$ are N. Each of $Y^{7-10}$ is independently selected from C or N with the proviso that exactly one of $Y^{7-10}$ is N or exactly two of $Y^{7-10}$ are N. Groups $R^1$ and $R^{10}$ are both independently selected from the group consisting of ($C_1$-$C_{40}$) hydrocarbyl, substituted ($C_1$-$C_{40}$) hydrocarbyl, ($C_1$-$C_{40}$) heterohydrocarbyl, substituted ($C_1$-$C_{40}$) heterohydrocarbyl, and an electron pair. Each of $R^2$, $R^3$, $R^4$, $R^7$, $R^8$, and $R^9$ is independently selected from the group consisting of hydrogen, ($C_1$-$C_{40}$) hydrocarbyl, substituted ($C_1$-$C_{40}$) hydrocarbyl, ($C_1$-$C_{40}$) heterohydrocarbyl, substituted ($C_1$-$C_{40}$) heterohydrocarbyl, halogen, nitro, and an electron pair. Groups $R^5$ and $R^6$ are both independently selected from the group consisting of ($C_1$-$C_{40}$) hydrocarbyl, substituted ($C_1$-$C_{40}$) hydrocarbyl, ($C_1$-$C_{40}$) heterohydrocarbyl, and substituted ($C_1$-$C_{40}$) heterohydrocarbyl. Any two or more of $R^{1-5}$ optionally may be taken together to form at least one ring structure having from 5 to 16 atoms in the ring excluding any hydrogen atoms. Any two or more of $R^{6-10}$ optionally may be taken together to form at least one ring structure having from 5 to 16 atoms in the ring excluding any hydrogen atoms. Any two or more of $R^{1-10}$ optionally may be taken together form a linked tetradentate chelant structure.

Embodiments of the disclosure additionally relate to olefin-based polymers containing the polymerization reaction product of one or more olefin monomers in the presence of the olefin polymerization catalyst systems of the present disclosure.

Further embodiments of the present disclosure relate to processes for polymerizing one or more olefin-based polymers by polymerizing one or more olefin monomers in the presence of the one or more olefin polymerization catalyst systems of the present disclosure.

These and additional features provided by the embodiments of the present disclosure will be more fully understood in view of the following detailed description.

DETAILED DESCRIPTION

The disclosure provides an olefin polymerization catalyst system comprising: a procatalyst component comprising a metal-ligand complex of Formula (I):

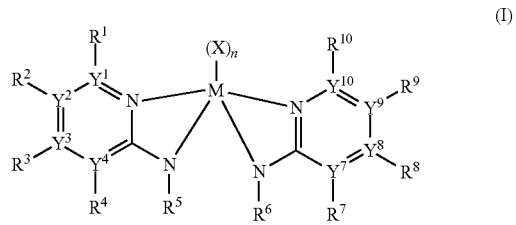

In Formula (I), M is titanium, zirconium, or hafnium; each X is independently a monodentate or polydentate ligand that is neutral, monoanionic, or dianionic; n is an integer; and the metal-ligand complex of Formula (I) is overall charge-neutral. Each of $Y^{1-4}$ is independently selected from C or N with the proviso that exactly one of $Y^{1-4}$ is N or exactly two of $Y^{1-4}$ are N. Each of $Y^{7-10}$ is independently selected from C or N with the proviso that exactly one of $Y^{7-10}$ is N or exactly two of $Y^{7-10}$ are N. Groups $R^1$ and $R^{10}$ are both independently selected from the group consisting of ($C_1$-$C_{40}$) hydrocarbyl, substituted ($C_1$-$C_{40}$) hydrocarbyl, ($C_1$-$C_{40}$) heterohydrocarbyl, substituted ($C_1$-$C_{40}$) heterohydrocarbyl, and an electron pair. Each of $R^2$, $R^3$, $R^4$, $R^7$, $R^8$, and $R^9$ is independently selected from the group consisting of hydrogen, ($C_1$-$C_{40}$) hydrocarbyl, substituted ($C_1$-$C_{40}$) hydrocarbyl, ($C_1$-$C_{40}$) heterohydrocarbyl, substituted ($C_1$-$C_{40}$) heterohydrocarbyl, halogen, nitro, and an electron pair. Groups $R^5$ and $R^6$ are both independently selected from the group consisting of ($C_1$-$C_{40}$) hydrocarbyl, substituted ($C_1$-$C_{40}$) hydrocarbyl, ($C_1$-$C_{40}$) heterohydrocarbyl, and substituted ($C_1$-$C_{40}$) heterohydrocarbyl. Any two or more of $R^{1-5}$ optionally may be taken together to form at least one ring structure having from 5 to 16 atoms in the ring excluding any hydrogen atoms. Any two or more of $R^{6-10}$ optionally may be taken together to form at least one ring structure having from 5 to 16 atoms in the ring excluding any hydrogen atoms. Any two or more of $R^{1-10}$ optionally may be taken together form a linked tetradentate chelant structure.

The metal ligand complex of Formula (I) above, and all specific embodiments thereof herein, is intended to include every possible stereoisomer, including coordination isomers, thereof.

The following abbreviations will be used throughout this disclosure: Me: methyl; Ph: phenyl; Bn: benzyl; i-Pr: isopropyl; t-Bu: tert-butyl; n-Oct: 1-octyl; Fe(Cp)2: ferrocenyl; THF: tetrahydrofuran; $CH_2Cl_2$: dichloromethane; EtOH: Bethanol; EtOAc: ethyl acetate; TCB: 1,2,4-trichlorobenzene; Benzene-$d_6$: deuterated benzene; $C_6D_6$: deuterated benzene; $CDCl_3$: deuterated chloroform; $Mg(OH)_2$: magnesium hydroxide; MesMgBr: 2,4,6-trimethylphenylmagnesium bromide; MeMgBr: methylmagnesium bromide; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $Ni(Acac)_2$: nickel (II) acetylacetonate; MMAO, MMAO-3A: modified methylaluminoxane; GPC: gel permeation chromatography; HT-GPC: high-temperature gel permeation chromatography; PDI: polydispersity index; NMR: nuclear magnetic resonance; g: grams; mg: milligrams; mmol: millimoles; mL: milliliters; µL: microliters; M: molar; Mw: weight-average molecular weight; Mn: number-average molecular weight; µm: micrometers; min: minutes; h: hours; d: days; Mhz: megahertz; xs: excess.

In some embodiments, each of the ($C_1$-$C_{40}$) hydrocarbyl and ($C_1$-$C_{40}$) heterohydrocarbyl of any one or more of $R^1$, $R^2$, $R^3$, $R^4$, $R^5$, $R^6$, $R^7$, $R^8$, $R^9$, or $R^{10}$ each independently may be unsubstituted or substituted with one or more $R^S$ substituents, wherein each $R^S$ independently is a halogen atom, ($C_1$-$C_{18}$)alkyl, perfluoro or polyfluoro ($C_1$-$C_{18}$)alkyl, unsubstituted ($C_1$-$C_{18}$)alkyl, ($C_6$-$C_{18}$)aryl, $F_3C$, $FCH_2O$, $F_2HCO$, $F_3CO$, $(R^C)_3Si$, $(R^C)_3Ge$, $(R^C)O$, $(R^C)S$, $(R^C)S(O)$, $(R^C)S(O)_2$, $(R^C)_2P$, $(R^C)_2N$, $(R^C)_2C=N$, NC, $NO_2$, $(R^C)C(O)O$, $(R^C)OC(O)$, $(R^C)C(O)N(R^C)$, or $(R^C)_2NC(O)$, where in all instances each $R^C$ independently is an unsubstituted ($C_1$-$C_{18}$)alkyl. In particular embodiments, two of the $R^S$ are taken together to form an unsubstituted ($C_1$-$C_{18}$)alkylene. In some embodiments, one or more of $R^1$, $R^2$, $R^3$, $R^4$, $R^5$, $R^6$, $R^7$, $R^8$, $R^9$, or $R^{10}$ may be polyfluoro substituted or perfluoro substituted with $R^S$ substituents that are fluoro.

In particular embodiments, $R^5$ and $R^6$ are each independently ($C_1$-$C_{40}$) primary or secondary alkyl groups with respect to their connection to the amine nitrogen of the parent ligand structure. The terms primary and secondary alkyl groups are given their usual and customary meaning herein; i.e., primary indicating that the carbon atom directly linked to the ligand nitrogen bears at least two hydrogen atoms and secondary indicates that the carbon atom directly linked to the ligand nitrogen bears only one hydrogen atom.

In another embodiment, the olefin polymerization catalyst system includes a metal-ligand complex of Formula (I) wherein each X independently is Me, Bn, or Cl.

In another embodiment, the olefin polymerization catalyst system includes a metal-ligand complex of Formula (I) wherein $R^5$ and $R^6$ are each independently ($C_1$-$C_{40}$) primary or secondary alkyl groups or substituted primary or secondary alkyl groups.

In another embodiment, the olefin polymerization catalyst system includes a metal-ligand complex of Formula (I) wherein $R^1$ and $R^{10}$ are aryl, substituted aryl, heteroaryl or substituted heteroaryl groups.

Each of $Y^{1-4}$ is independently selected from C or N with the proviso that exactly one of $Y^{1-4}$ is N or exactly two of $Y^{1-4}$ are N. Each of $Y^{7-10}$ is independently selected from C or N with the proviso that exactly one of $Y^{7-10}$ is N or exactly two of $Y^{7-10}$ are N. Thus, the six-membered ring including $Y^{1-4}$, a nitrogen atom bonded to M, and a carbon atom bonded to both $Y^4$ and the nitrogen atom bonded to M may be a diaza ring with exactly two nitrogen heteroatoms or a triaza ring with exactly three nitrogen heteroatoms. Likewise, the six-membered ring including $Y^{7-10}$, a nitrogen atom bonded to M, and a carbon atom bonded to both $Y^7$ and the nitrogen atom bonded to M may be a diaza ring with exactly two nitrogen heteroatoms or a triaza ring with exactly three nitrogen heteroatoms.

Groups $R^1$ and $R^{10}$ are both independently selected from the group consisting of ($C_1$-$C_{40}$) hydrocarbyl, substituted ($C_1$-$C_{40}$) hydrocarbyl, ($C_1$-$C_{40}$) heterohydrocarbyl, substituted ($C_1$-$C_{40}$) heterohydrocarbyl, and an electron pair. In particular, when $Y^1$ is carbon, $R^1$ is selected from the group consisting of ($C_1$-$C_{40}$) hydrocarbyl, substituted ($C_1$-$C_{40}$) hydrocarbyl, ($C_1$-$C_{40}$) heterohydrocarbyl, and substituted ($C_1$-$C_{40}$) heterohydrocarbyl. When $Y^1$ is nitrogen, $R^1$ is an electron pair or otherwise absent. Likewise, when $Y^{10}$ is carbon, $R^{10}$ is selected from the group consisting of ($C_1$-$C_{40}$) hydrocarbyl, substituted ($C_1$-$C_{40}$) hydrocarbyl, ($C_1$-$C_{40}$) heterohydrocarbyl, and substituted ($C_1$-$C_{40}$) heterohydrocarbyl. When $Y^{10}$ is nitrogen, $R^{10}$ is an electron pair or otherwise absent.

Each of $R^2$, $R^3$, $R^4$, $R^7$, $R^8$, and $R^9$ is independently selected from the group consisting of hydrogen, ($C_1$-$C_{40}$) hydrocarbyl, substituted ($C_1$-$C_{40}$) hydrocarbyl, ($C_1$-$C_{40}$) heterohydrocarbyl, substituted ($C_1$-$C_{40}$) heterohydrocarbyl, halogen, nitro, and an electron pair. In particular, when the corresponding atom $Y^2$, $Y^3$, $Y^4$, $Y^7$, $Y^8$, or $Y^9$ to which the respective group $R^2$, $R^3$, $R^4$, $R^7$, $R^8$, and $R^9$ is bonded is carbon, the respective group $R^2$, $R^3$, $R^4$, $R^7$, $R^8$, and $R^9$ is selected from the group consisting of ($C_1$-$C_{40}$) hydrocarbyl, substituted ($C_1$-$C_{40}$) hydrocarbyl, ($C_1$-$C_{40}$) heterohydrocarbyl, and substituted ($C_1$-$C_{40}$) heterohydrocarbyl. When the corresponding atom $Y^2$, $Y^3$, $Y^4$, $Y^7$, $Y^8$, or $Y^9$ to which the respective group $R^2$, $R^3$, $R^4$, $R^7$, $R^8$, and $R^9$ is bonded is nitrogen, the respective group $R^2$, $R^3$, $R^4$, $R^7$, $R^8$, and $R^9$ is an electron pair or otherwise absent.

Thus, the metal-ligand complexes of Formula (I) in general also conform to Formula (II):

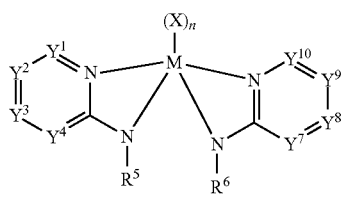

(II)

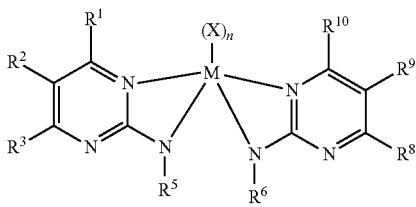

Formula (I.c)

In Formula (II), M, X, n, $R^5$, and $R^6$ are as defined in Formula (I). Also in Formula (II), each $Y^W$ (where W is 1, 2, 3, 4, 7, 8, 9, or 10) is independently selected from =C($R^W$)— (where W has the same value in $R^W$ as in $Y^W$) or =N—, with the provisos that (A) exactly one of $Y^{1-4}$ is =N— or exactly two of $Y^{1-4}$ are =N—; and (B) exactly one of $Y^{7-10}$ is =N— or exactly two of $Y^{7-10}$ are =N—. When W is 1 or 10 and $Y^W$ (i.e., $Y^1$ or $Y^{10}$) is =C($R^W$)—, the corresponding $R^W$ (i.e., $R^1$ or $R^{10}$) is independently selected from the group consisting of ($C_1$-$C_{40}$) hydrocarbyl, substituted ($C_1$-$C_{40}$) hydrocarbyl, ($C_1$-$C_{40}$) heterohydrocarbyl, and substituted ($C_1$-$C_{40}$) heterohydrocarbyl. When W is 2, 3, 4, 7, 8, or 9 and $Y^W$ (i.e., $Y^2$, $Y^3$, $Y^4$, $Y^7$, $Y^8$, or $Y^9$) is =C($R^W$)—, the corresponding $R^W$ (i.e., $R^2$, $R^3$, $R^4$, $R^7$, $R^8$, or $R^9$) is independently selected from the group consisting of hydrogen, ($C_1$-$C_{40}$) hydrocarbyl, substituted ($C_1$-$C_{40}$) hydrocarbyl, ($C_1$-$C_{40}$) heterohydrocarbyl, substituted ($C_1$-$C_{40}$) heterohydrocarbyl, halogen, and nitro ($NO_2$). As in Formula (I), any two or more of $R^{1-5}$ optionally may be taken together to form at least one ring structure having from 5 to 16 atoms in the ring excluding any hydrogen atoms. As in Formula (I), any two or more of $R^6$-10 optionally may be taken together to form at least one ring structure having from 5 to 16 atoms in the ring excluding any hydrogen atoms. As in Formula (I), any two or more of $R^{1-10}$ optionally may be taken together form a linked tetradentate chelant structure.

In some embodiments the metal-ligand complex of Formula (I) is a metal-ligand complex of any one of the following Formulas (I.a), (I.b), (I.c), (I.d), (I.e), (I.f), (I.g), (I.h), or (I.i), for which each of $R^{1-10}$, M, X, and n are as defined in Formula (I):

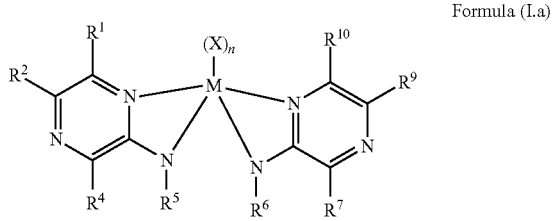

Formula (I.a)

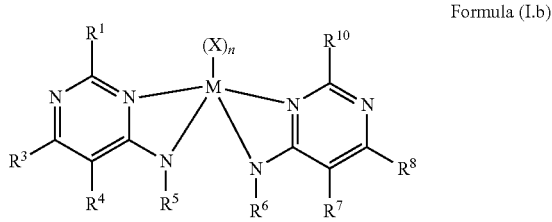

Formula (I.b)

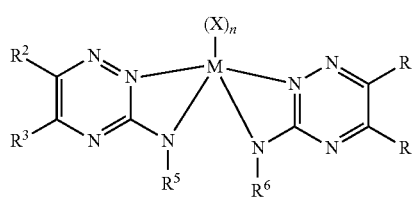

Formula (I.d)

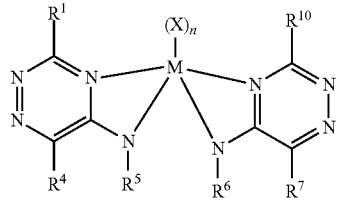

Formula (I.e)

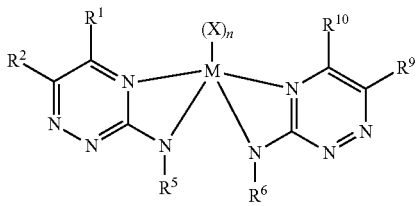

Formula (I.f)

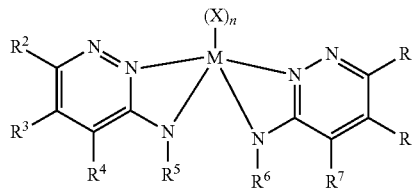

Formula (I.g)

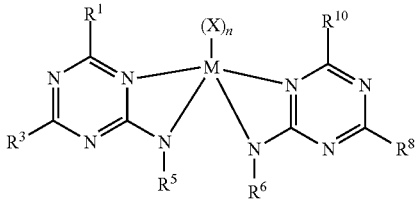

Formula (I.h)

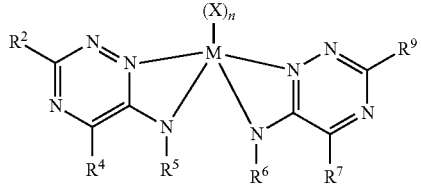

Formula (I.i)

The metal-ligand complex of Formula (I) provides for homoleptic as well as heteroleptic procatalyst components.

When used to describe certain carbon atom-containing chemical groups, parenthetical expressions of the form "($C_x$-$C_y$)" (for example, "($C_1$-$C_{40}$)alkyl") mean that the unsubstituted version of the chemical group has from "x" carbon atoms to "y" carbon atoms, inclusive of "x" and "y", where "x" and "y" are integers. The $R^S$ substituted version of the chemical group may contain more than "y" carbon atoms depending on chemical structure of the substitutents $R^S$. Thus, for example, an unsubstituted $(C_1-C_{40})$alkyl contains from 1 to 40 carbon atoms (x=1 and y=40). When the chemical group is substituted by one or more carbon atom-containing $R^S$ substituents, the substituted $(C_x-C_y)$ chemical group may have more than "y" total carbon atoms. The maximum total number of carbon atoms of the $(C_x-C_y)$ chemical group substituted by the one or more carbon atom-containing $R^S$ substituents equals "y" plus the combined total number of carbon atoms present in the carbon atom-containing substituent(s) $R^S$. Any atom of a chemical group that is not specified herein is understood to be a hydrogen atom.

In some embodiments, each of the chemical groups (e.g. $R^{1-10}$) of the metal-ligand complex of Formula (I) may be unsubstituted, that is, can be defined without use of a substituent $R^S$, provided the above-mentioned conditions are satisfied. In other embodiments, at least one of the chemical groups of the metal-ligand complex of Formula (I) independently contain one or more of the substituents $R^S$. Where the compound contains two or more substituents $R^S$, each $R^S$ independently is bonded to a same or different substituted chemical group. When two or more $R^S$ are bonded to a same chemical group, they independently are bonded to a same or different carbon atom or heteroatom, as the case may be, in the same chemical group up to and including persubstitution of the chemical group.

The term "persubstitution" means each hydrogen atom (H) bonded to a carbon atom or heteroatom of a corresponding unsubstituted compound or functional group, as the case may be, is replaced by a substituent (e.g., $R^S$). The term "polysubstitution" means each of at least two, but not all, hydrogen atoms (H) bonded to carbon atoms or heteroatoms of a corresponding unsubstituted compound or functional group, as the case may be, is replaced by a substituent (e.g., $R^S$). The term "monosubstitution" means that only one hydrogen atom (H) bonded to a carbon atom or heteroatom of a corresponding unsubstituted compound or functional group, as the case may be, is replaced by a substituent (e.g., $R^S$).

As used herein, the definitions of the terms hydrocarbyl, heterohydrocarbyl, hydrocarbylene, heterohydrocarbylene, alkyl, alkylene, heteroalkyl, heteroalkylene, aryl, arylene, heteroaryl, heteroarylene, cycloalkyl, cycloalkylene, heterocycloalkyl, heterocycloalkylene are intended to include every possible stereoisomer.

As used herein, the term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and polycyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

Preferably, a $(C_1-C_{40})$hydrocarbyl independently is an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. More preferably, each of the aforementioned $(C_1-C_{40})$hydrocarbyl groups independently has a maximum of 40 carbon atoms. All individual values and subranges from 1 to 40 carbon atoms are included and disclosed herein; for example, the number of carbon atoms may range from 1 carbon atom to an upper limit of 40 carbon atoms, preferably from 1 to 30 carbon atoms, more preferably from 1 to 20 carbon atoms, more preferably from 1 to 15 carbon atoms, more preferably from 1 to 12 carbon atoms or most preferably from 1 to 10 carbon atoms. For example each $(C_1-C_{40})$hydrocarbyl groups independently may be a $(C_1-C_{20})$hydrocarbyl), or in the alternative, a $(C_1-C_{12})$hydrocarbyl), or in the alternative, a $(C_5-C_{30})$hydrocarbyl), or in the alternative, a $(C_{10}-C_{35})$hydrocarbyl) group.

Examples of $(C_1-C_{40})$hydrocarbylene are unsubstituted or substituted $(C_3-C_{40})$hydrocarbylene; $(C_6-C_{40})$arylene, $(C_3-C_{40})$cycloalkylene, and $(C_3-C_{40})$alkylene (e.g., $(C_3-C_{20})$alkylene). In some embodiments, the diradicals are on the terminal atoms of the hydrocarbylene as in a 1,3-α,ω-diradical (e.g., —$CH_2CH_2CH_2$—) or a 1,5-α,ω-diradical with internal substitution (e.g., —$CH_2CH_2CH(CH_3)CH_2CH_2$—). In other embodiments, the diradicals are on the non-terminal atoms of the hydrocarbylene as in a $C_7$ 2,6-diradical

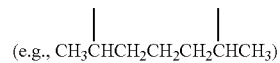

(e.g., $CH_3CHCH_2CH_2CH_2CHCH_3$)

or a $C_7$ 2,6-diradical with internal substitution

(e.g., $CH_3CHCH_2CH(CH_3)CH_2CHCH_3$).

The term "$(C_1-C_{40})$alkyl" means a saturated straight or branched hydrocarbon radical of from 1 to 40 carbon atoms, that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 2,2-dimethylpropyl, 1-butyl; 2-butyl; 2-methylpropyl; 1,1-dimethylethyl; 1-pentyl; 1-hexyl; 2-ethylhexyl, 1-heptyl; 1-nonyl; 1-decyl; and 2,2,4-trimethylpentyl. Examples of substituted $(C_1-C_{40})$alkyl are substituted $(C_1-C_{20})$alkyl; substituted $(C_1-C_{10})$alkyl; trifluoromethyl; trimethylsilylmethyl; methoxymethyl; dimethylaminomethyl; trimethylgermylmethyl; phenylmethyl (benzyl); 2-phenyl-2,2-methylethyl; 2-(dimethylphenylsilyl)ethyl; and dimethyl(t-butyl) silylmethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein one ring is aromatic and the optional second and third rings independently are fused or non-fused and the second and third rings are each independently optionally aromatic. Examples of unsubstituted $(C_6-C_{40})$aryl are unsubstituted $(C_6-C_{20})$aryl; unsubstituted $(C_6-C_{18})$aryl; phenyl; biphenyl; ortho-terphenyl; meta-terphenyl; fluorenyl; tetrahydrofluorenyl; indacenyl; hexahydroindacenyl; indenyl; dihydroindenyl; naphthyl; tetrahydronaphthyl; phenanthrenyl and triptycenyl. Examples of substituted $(C_6-C_{40})$aryl are substituted $(C_6-C_{20})$aryl; substituted $(C_6-C_{18})$aryl; 2,6-bis[$(C_1-C_{20})$alkyl]-phenyl; 2-$(C_1-C_5)$alkyl-phenyl; 2,6-bis$(C_1-C_5)$alkyl-phenyl;

2,4,6-tris($C_1$-$C_5$)alkyl-phenyl; polyfluorophenyl; pentafluorophenyl; 2,6-dimethylphenyl, 2,6-diisopropylphenyl; 2,4,6-triisopropylphenyl; 2,4,6-trimethylphenyl; 2-methyl-6-trimethylsilylphenyl; 2-methyl-4,6-diisopropylphenyl; 4-methoxyphenyl; and 4-methoxy-2,6-dimethylphenyl.

The term "($C_3$-$C_{40}$)cycloalkyl" means a saturated cyclic or polycyclic (i.e. fused or unfused) hydrocarbon radical of from 3 to 40 carbon atoms that is unsubstituted or substituted by one or more $R^S$. Other cycloalkyl groups (e.g., ($C_3$-$C_{12}$)alkyl)) are defined in an analogous manner. Examples of unsubstituted ($C_3$-$C_{40}$)cycloalkyl are unsubstituted ($C_3$-$C_{20}$)cycloalkyl, unsubstituted ($C_3$-$C_{10}$)cycloalkyl; cyclopropyl; cyclobutyl; cyclopentyl; cyclohexyl; cycloheptyl; cyclooctyl; cyclononyl; cyclodecyl; octahydroindenyl; bicyclo[4.4.0]decyl; bicyclo[2.2.1]heptyl; and tricyclo[3.3.1.1]decyl. Examples of substituted ($C_3$-$C_{40}$)cycloalkyl are substituted ($C_3$-$C_{20}$)cycloalkyl; substituted ($C_3$-$C_{10}$)cycloalkyl; 2-methylcyclohexyl; and perfluorocyclohexyl.

The term "($C_1$-$C_{40}$)alkylene" means a saturated or unsaturated straight chain or branched chain diradical of from 1 to 40 carbon atoms that is unsubstituted or substituted by one or more $R^S$. Examples of unsubstituted ($C_1$-$C_{40}$)alkylene are unsubstituted ($C_3$-$C_{20}$)alkylene, including unsubstituted 1,3-($C_3$-$C_{10}$)alkylene; 1,4-($C_4$-$C_{10}$)alkylene; —($CH_2$)$_3$—; —($CH_2$)$_4$—; —($CH_2$)$_5$—; —($CH_2$)$_6$—; —($CH_2$)$_7$—; —($CH_2$)$_8$—; and —($CH_2$)$_4$CH($CH_3$)—. Examples of substituted ($C_1$-$C_{40}$)alkylene are substituted ($C_3$-$C_{20}$)alkylene; —$CF_2CF_2CF_2$—; and —($CH_2$)$_{14}$C($CH_3$)$_2$($CH_2$)$_5$— (i.e., a 6,6-dimethyl substituted normal-1,20-eicosylene). Since as mentioned previously two $R^S$ may be taken together to form a ($C_1$-$C_{40}$)alkylene, examples of substituted ($C_1$-$C_{40}$)alkylene also include 1,2-bis(methylene)cyclopentane; 1,2-bis(methylene)cyclohexane; 2,3-bis(methylene)-7,7-dimethylbicyclo[2.2.1]heptane; and 2,3-bis(methylene)bicyclo[2.2.2]octane.

The term "($C_3$-$C_{40}$)cycloalkylene" means a cyclic diradical (i.e., the radicals are on ring atoms) of from 3 to 40 carbon atoms that is unsubstituted or substituted by one or more $R^S$. Examples of unsubstituted ($C_3$-$C_{40}$)cycloalkylene are 1,3-cyclobutylene, 1,3-cyclopentylene, and 1,4-cyclohexylene. Examples of substituted ($C_3$-$C_{40}$)cycloalkylene are 2-trimethylsilyl-1,4-cyclohexylene and 1,2-dimethyl-1,3-cyclohexylene.

The terms "($C_1$-$C_{40}$)heterohydrocarbyl" and "($C_1$-$C_{40}$)heterohydrocarbylene" mean a heterohydrocarbon radical or diradical, respectively, of from 1 to 40 carbon atoms, and each heterohydrocarbon independently has one or more heteroatoms or heteroatomic groups O; S; N; S(O); S(O)$_2$; S(O)$_2$N; Si($R^C$)$_2$; Ge($R^C$)$_2$; P($R^C$); P(O)($R^C$); N($R^C$); and FeCp$_2$ (where Cp is cyclopentadienyl or substituted versions thereof) wherein independently each $R^C$ is unsubstituted ($C_1$-$C_{18}$)hydrocarbyl or an unsubstituted ($C_1$-$C_{18}$)heterohydrocarbyl. Each ($C_1$-$C_{40}$)heterohydrocarbyl and ($C_1$-$C_{40}$)heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

In some embodiments, the ($C_1$-$C_{40}$)heterohydrocarbyl independently is unsubstituted or substituted ($C_1$-$C_{40}$)heteroalkyl, ($C_1$-$C_{40}$)hydrocarbyl-O—, ($C_1$-$C_{40}$)hydrocarbyl-S—, ($C_1$-$C_{40}$)hydrocarbyl-S(O)—, ($C_1$-$C_{40}$)hydrocarbyl-S(O)$_2$—, ($C_1$-$C_{40}$)hydrocarbyl-Si($R^C$)$_2$—, ($C_1$-$C_{40}$)hydrocarbyl-Ge($R^C$)$_2$-, ($C_1$-$C_{40}$)hydrocarbyl-N($R^C$)—, ($C_1$-$C_{40}$)hydrocarbyl-P($R^C$)—, ($C_2$-$C_{40}$)heterocycloalkyl, ($C_2$-$C_{19}$)heterocycloalkyl-($C_1$-$C_{20}$)alkylene, ($C_3$-$C_{20}$)cycloalkyl-($C_1$-$C_{19}$)heteroalkylene, ($C_2$-$C_{19}$)heterocycloalkyl-($C_1$-$C_{20}$)heteroalkylene, ($C_1$-$C_{40}$)heteroaryl, ($C_1$-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene.

The term "($C_1$-$C_{40}$)heteroaryl" means an unsubstituted or substituted (by one or more $R^S$) mono-, bi- or tricyclic heteroaromatic hydrocarbon radical of from 1 to 40 total carbon atoms and from 1 to 6 heteroatoms, and the mono-, bi- or tricyclic radical comprises 1, 2 or 3 rings, respectively, wherein one ring is heteroaromatic and the optional second and third rings independently are fused or non-fused; and the second or third rings are each independently optionally heteroaromatic. The monocyclic heteroaromatic hydrocarbon radical may be a 5-membered or 6-membered ring. The 5-membered ring has from 1 to 4 carbon atoms and from 4 to 1 heteroatoms, respectively, each heteroatom being O, S, N, or P, and preferably O, S, or N. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 3, 4 or 5 carbon atoms and 3,2 or 1 heteroatoms, the heteroatoms being N or P, and preferably N. Examples of 6-membered ring heteroaromatic hydrocarbon radical are pyridine-2-yl; pyrimidin-2-yl; and pyrazin-2-yl. The bicyclic heteroaromatic hydrocarbon radical may be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical preferably is a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

In some embodiments the ($C_1$-$C_{40}$)heteroaryl is 2,7-disubstituted carbazolyl or 3,6-disubstituted carbazolyl, more preferably wherein each $R^S$ independently is phenyl, methyl, ethyl, isopropyl, or tertiary-butyl, still more preferably 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

The aforementioned heteroalkyl and heteroalkylene groups are saturated straight or branched chain radicals or diradicals, respectively, containing ($C_1$-$C_{40}$)carbon atoms, and one or more of the heteroatoms or heteroatomic groups O; S; N; S(O); S(O)$_2$; S(O)$_2$N; Si($R^C$)$_2$; Ge($R^C$)$_2$; P($R^C$); P(O)($R^C$); and N($R^C$), as defined above, wherein each of the heteroalkyl and heteroalkylene groups independently are unsubstituted or substituted by one or more $R^S$. Examples of substituted and unsubstituted heteroalkyl groups are methoxyl; ethoxyl; trimethylsilyl; dimethylphenylsilyl; tert-butyldimethylsilyl; and dimethylamino.

A heteroalkyl group may optionally be cyclic, i.e. a heterocycloalkyl group. Examples of unsubstituted ($C_3$-$C_{40}$)heterocycloalkyl are unsubstituted ($C_3$-$C_{20}$)heterocycloalkyl, unsubstituted ($C_3$-$C_{10}$)heterocycloalkyl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" means fluorine atom (F), chlorine atom (Cl), bromine atom (Br), or iodine atom (I) radical. Preferably each halogen atom independently is the Br, F, or Cl radical, and more preferably the F or Cl radical. The term "halide" means fluoride (F⁻), chloride (Cl⁻), bromide (Br⁻), or iodide (I⁻) anion.

In some embodiments, there are no O—O, S—S, or O—S bonds, other than O—S bonds in an S(O) or S(O)$_2$ diradical functional group, in the metal-ligand complex of Formula (I). More preferably, there are no O—O, P—P, S—S, or O—S bonds, other than O—S bonds in an S(O) or S(O)$_2$ diradical functional group, in the metal-ligand complex of Formula (I).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, and carbon-nitrogen triple bonds, not including any such double bonds that may be present in substituents $R^S$, if any, or in (hetero)aromatic rings, if any.

M is titanium, zirconium, or hafnium. In one embodiment, M is titanium. In another embodiment, M is zirconium. In another embodiment, M is hafnium. In some embodiments, M is in a formal oxidation state of +2, +3, or +4. Each X independently is a monodentate or polydentate ligand that is neutral, monoanionic, or dianionic. In general, the metal-ligand complex of Formula (I) is overall charge-neutral. The metal-ligand complex of Formula (I) may, in some embodiments, acquire a charge when activated to form a catalyst, such as a catalyst for a polymerization reaction. In some embodiments each X independently is the monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, borate, borohydride, sulfate, HC(O)O—, alkoxide or aryloxide (RO⁻), $(C_1-C_{40})$hydrocarbylC(O)O⁻; HC(O)N(H)⁻, $(C_1-C_{40})$hydrocarbylC(O)N(H)⁻, $(C_1-C_{40})$hydrocarbylC(O)N$((C_1-C_{20})$ hydrocarbyl)⁻, $R^K R^L B^-$, $R^K R^L N^-$, $R^K O^-$, $R^K S^-$, $R^K R^L P^-$, or $R^M R^K R^L Si^-$, wherein each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{40})$heterohydrocarbylene and $R^M$ is as defined above.

In some embodiments at least one monodentate ligand of X independently is the neutral ligand. In one embodiment, the neutral ligand is a neutral Lewis base group that is $R^X NR^K R^L$, $R^K OR^L$, $R^K SR^L$, or $R^X PR^K R^L$, wherein each $R^X$ independently is hydrogen, $(C_1-C_{40})$hydrocarbyl, $[(C_1-C_{10})$hydrocarbyl]$_3$Si, $[(C_1-C_{10})$hydrocarbyl]$_3$Si$(C_1-C_{10})$hydrocarbyl, or $(C_1-C_{40})$heterohydrocarbyl and each $R^K$ and $R^L$ independently is as defined above.

In some embodiments, each X is a monodentate ligand that independently is a halogen atom, unsubstituted $(C_1-C_{20})$ hydrocarbyl, unsubstituted $(C_1-C_{20})$hydrocarbylC(O)O—, or $R^K R^L N$— wherein each of $R^K$ and $R^L$ independently is an unsubstituted $(C_1-C_{20})$hydrocarbyl. In some embodiments each monodentate ligand X is a chlorine atom, $(C_1-C_{10})$ hydrocarbyl (e.g., $(C_1-C_6)$alkyl or benzyl), unsubstituted $(C_1-C_{10})$hydrocarbylC(O)O—, or $R^K R^L N$— wherein each of $R^K$ and $R^L$ independently is an unsubstituted $(C_1-C_{10})$ hydrocarbyl.

In some embodiments there are at least two Xs and the two Xs are taken together to form the bidentate ligand. In some embodiments the bidentate ligand is a neutral bidentate ligand. In one embodiment, the neutral bidentate ligand is a diene of formula $(R^D)_2 C=C(R^D)—C(R^D)=C(R^D)_2$, wherein each $R^D$ independently is H, unsubstituted $(C_1-C_6)$ alkyl, phenyl, or naphthyl. In some embodiments the bidentate ligand is a monoanionic-mono(Lewis base) ligand. The monoanionic-mono(Lewis base) ligand may be a 1,3-dionate of the following formula: $R^E—C(O^-)=CH—C(=O)—R^E$, wherein each $R^E$ independently is H, unsubstituted $(C_1-C_6)$alkyl, phenyl, or naphthyl. In some embodiments the bidentate ligand is a dianionic ligand. The dianionic ligand has a net formal oxidation state of −2. In one embodiment, each dianionic ligand independently is carbonate, oxalate (i.e., —O$_2$CCO$_2$—), $(C_2-C_{40})$hydrocarbylene dicarbanion, $(C_1-C_{40})$heterohydrocarbylene dicarbanion, phosphate, or sulfate.

As previously mentioned, number and charge (neutral, monoanionic, dianionic) of X are selected depending on the formal oxidation state of M such that the metal-ligand complex of Formula (I) is, overall, neutral.

In some embodiments each X is the same, wherein each X is methyl; isobutyl; neopentyl; neophyl; trimethylsilylmethyl; phenyl; benzyl; or chloro. In some embodiments n is 2 and each X is the same.

In some embodiments at least two X are different. In some embodiments, each X is a different one of methyl; isobutyl; neopentyl; neophyl; trimethylsilylmethyl; phenyl; benzyl; and chloro.

In one embodiment, the metal-ligand complex of Formula (I) is a mononuclear metal complex. In another embodiment the metal-ligand complex of Formula (I) comprises a tethered chelant to form a tetradentate structure. In another embodiment, with bridging units attached to the central nitrogen donors, the tethered structures enforce metal complex geometries most amenable to catalysis. In a particular embodiment, the bridge length is greater than or equal to three atoms. All individual values and subranges from greater than or equal to three atoms are included and disclosed herein; for example, the bridge length may be greater than 3 atoms, or in the alternative, greater than or equal to 4 atoms. For example, the bridge length may be from 3 to 8 atoms, or in the alternative, from 4 to 6 atoms.

In one embodiment, the olefin polymerization catalyst system comprises a tethered tetradentate procatalyst component facilitating the production of high molecular weight ($M_w$) polyolefins with narrow polydispersities. In another embodiment, the disclosed olefin polymerization catalyst systems demonstrate reversible chain transfer indicative of chain shuttling behavior in the presence of appropriate chain shuttling agents. Such combination of attributes is particularly of interest in the preparation of olefin block copolymers. In general, the ability to tune α-olefin incorporation and thus short-chain branching distribution is critical to accessing materials with performance differentiation.

Structures exemplifying metal-ligand complexes described by Formula (I) are shown below:
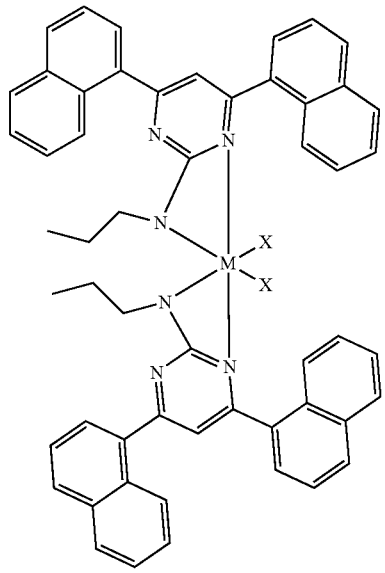
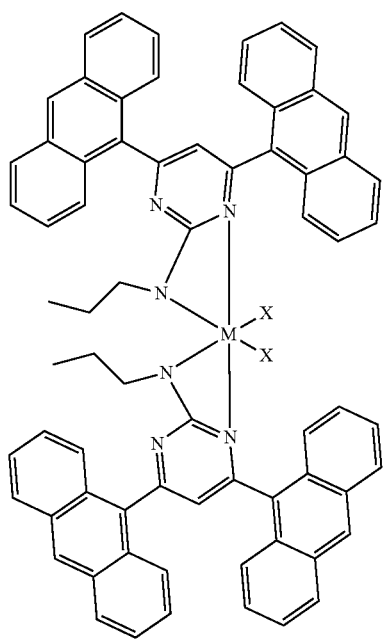
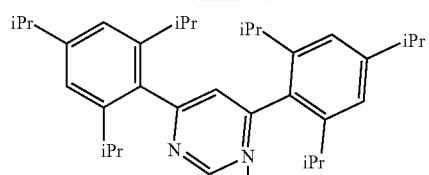
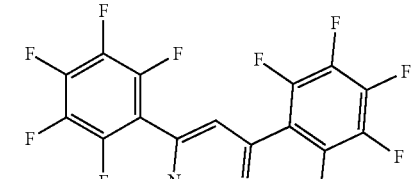
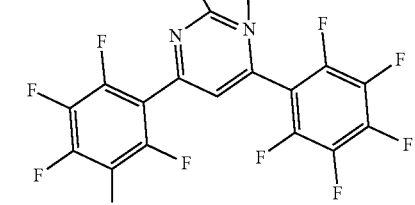

-continued
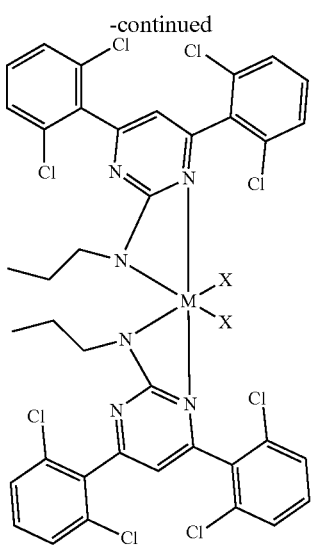
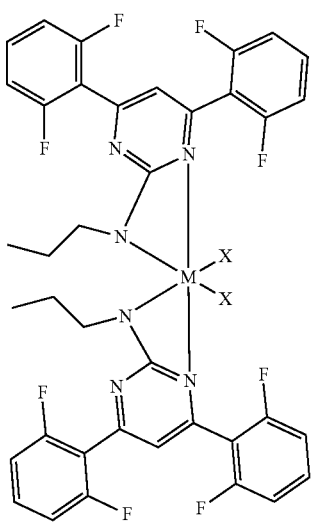
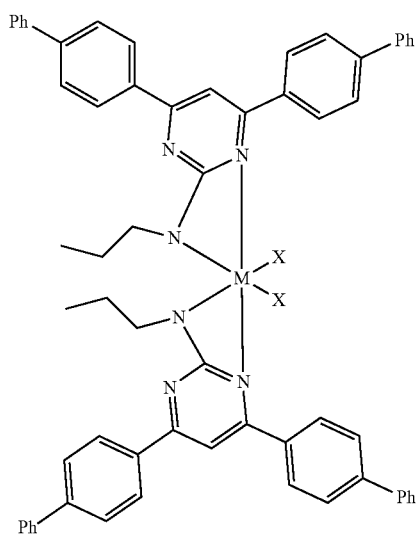
-continued
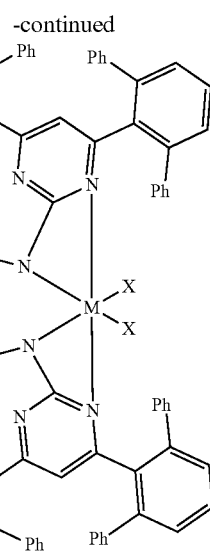
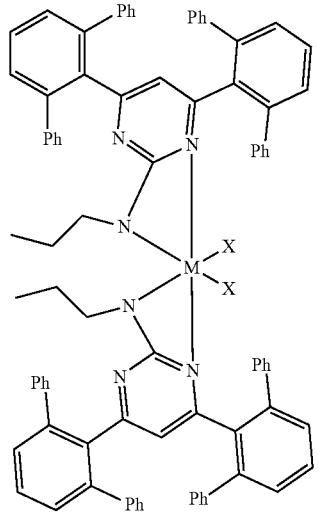
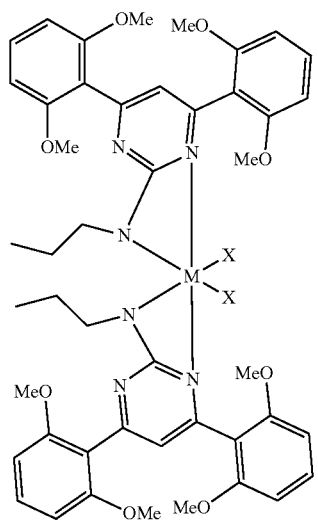
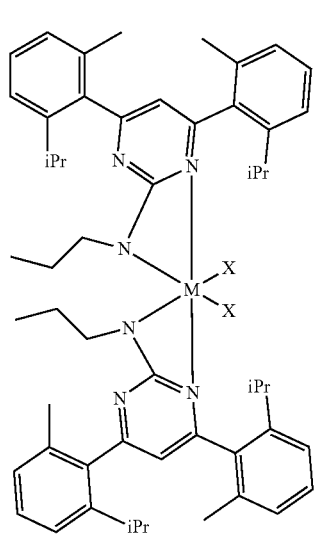

-continued
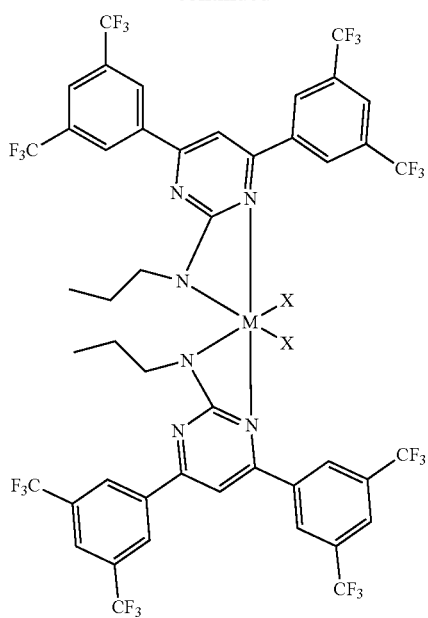
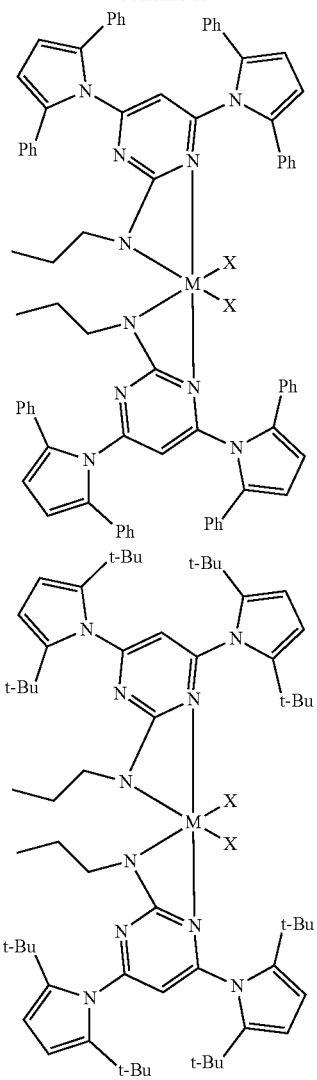
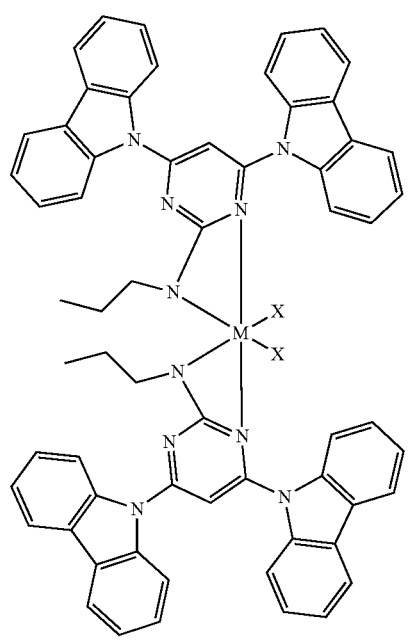
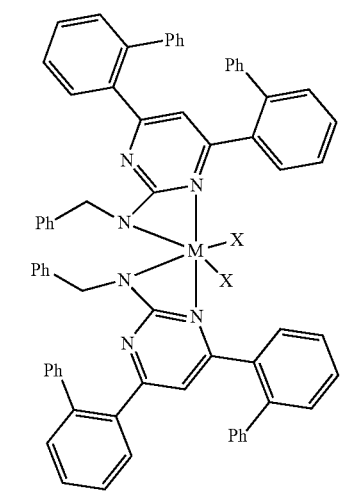
Additional structures exemplifying metal-ligand complexes described by Formula (I) are shown below:

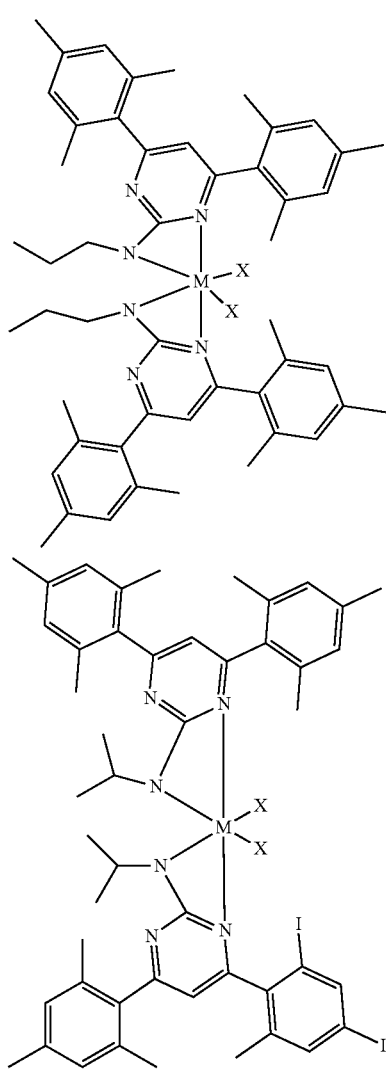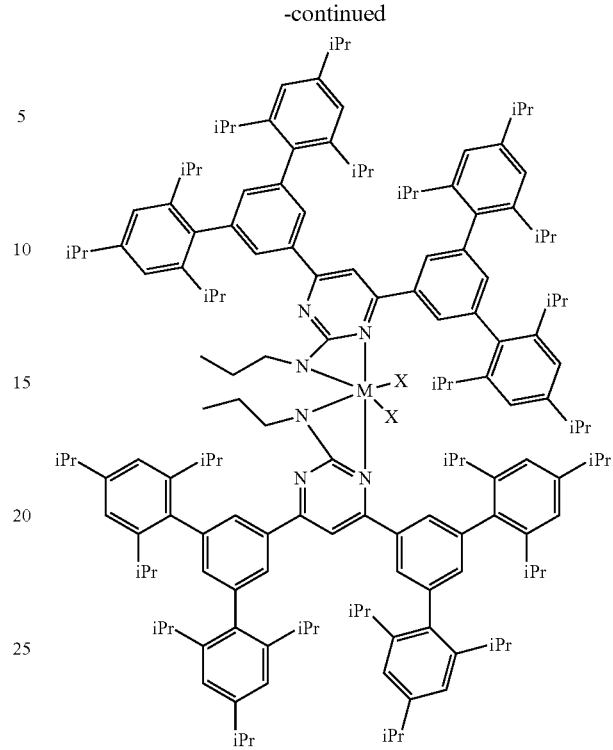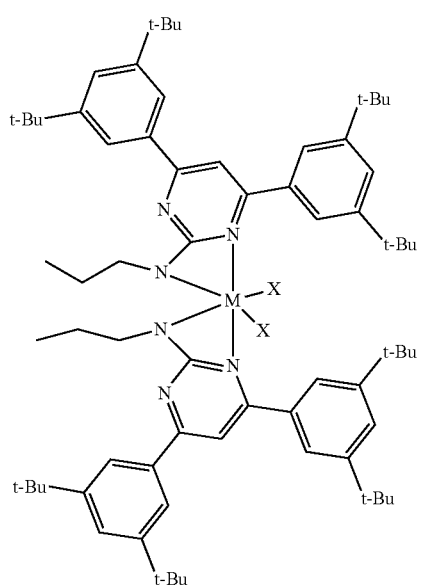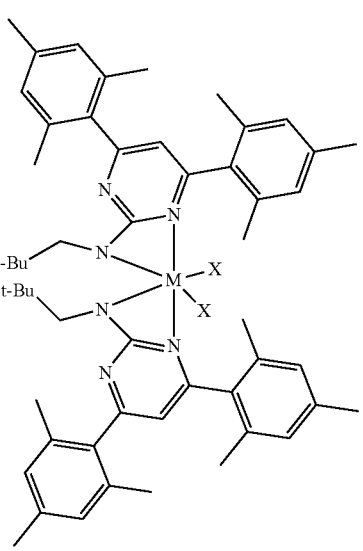

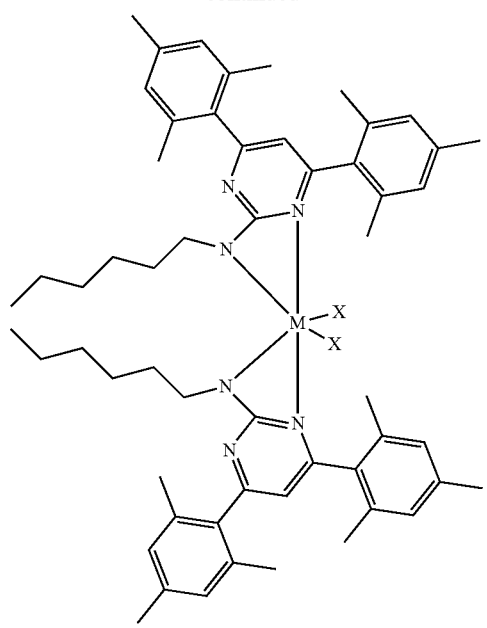
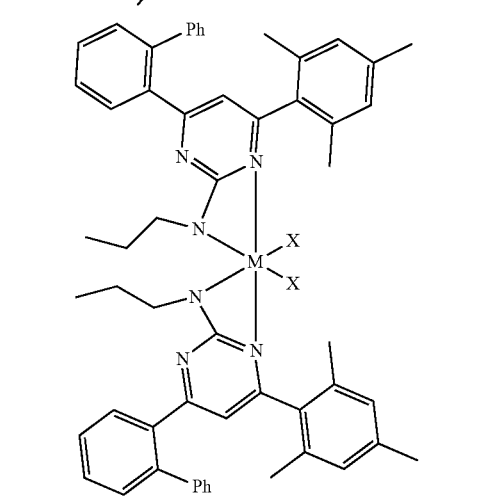
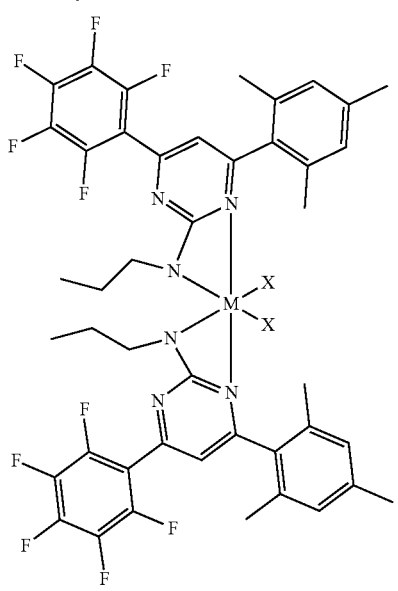
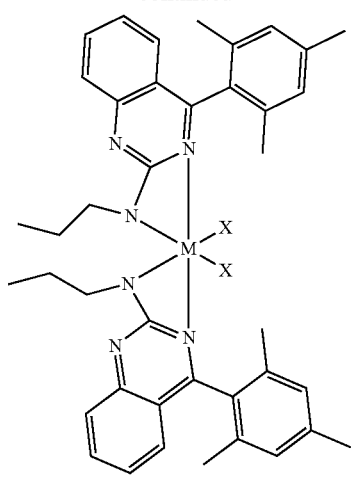
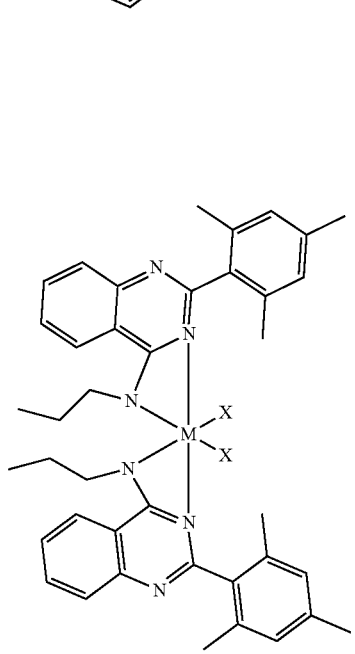
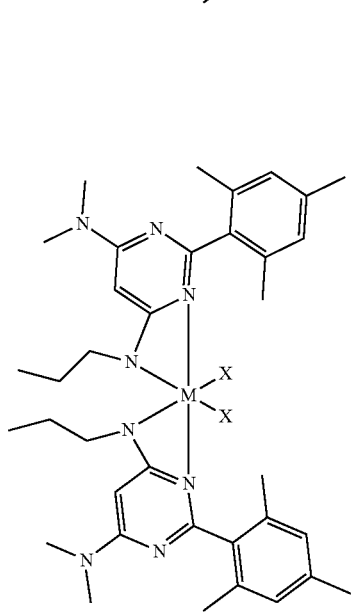

-continued
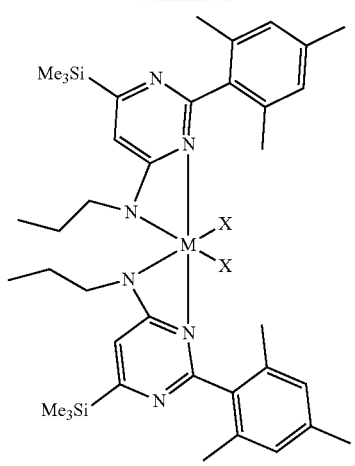
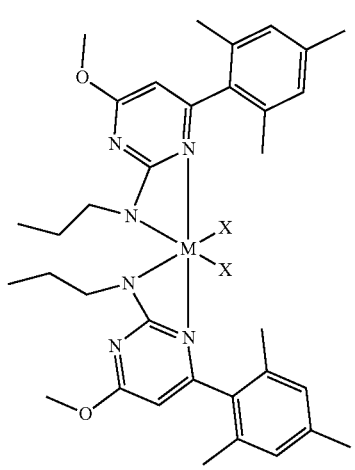
-continued
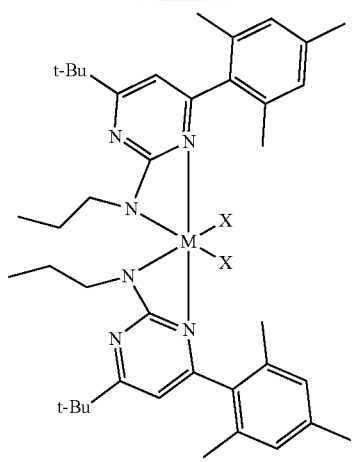
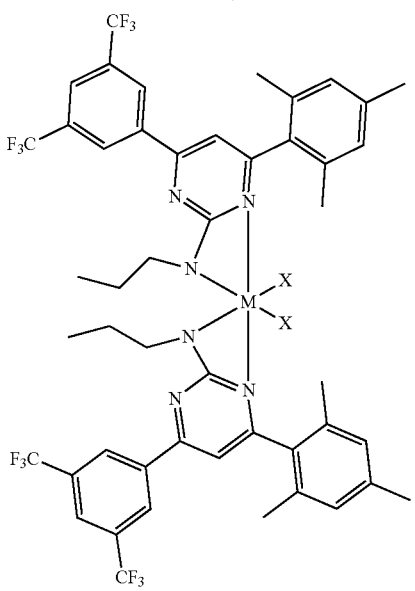
Additional structures exemplifying metal-ligand complexes described by Formula (I) are shown below:
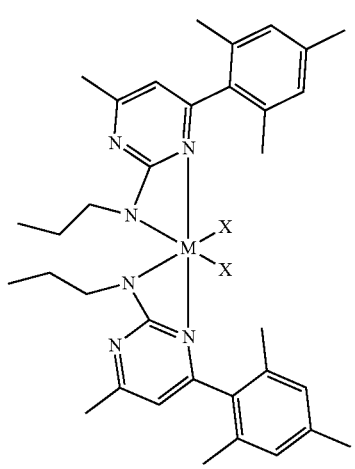
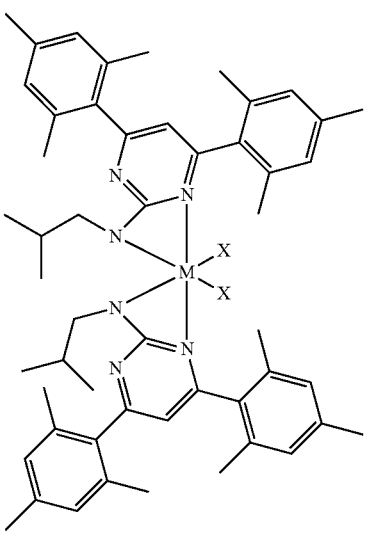

25
-continued
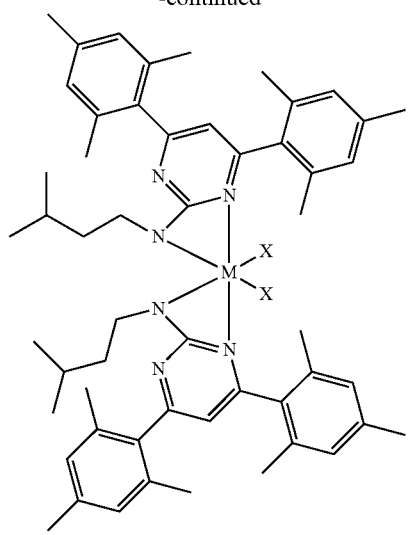
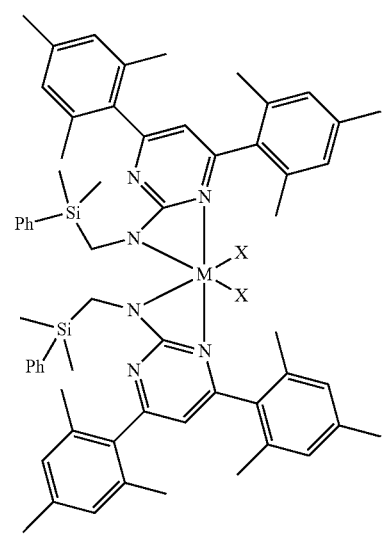
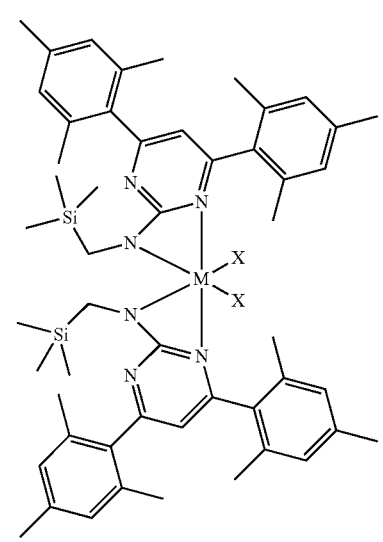
26
-continued
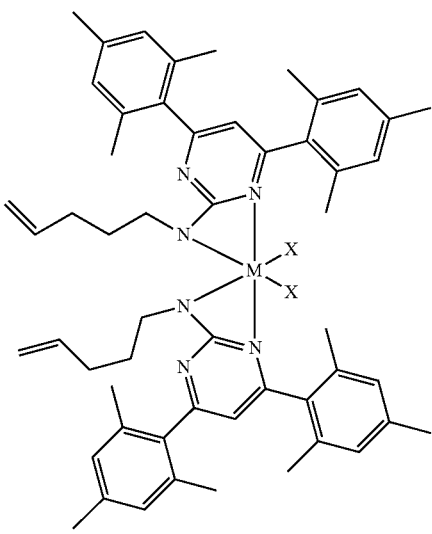
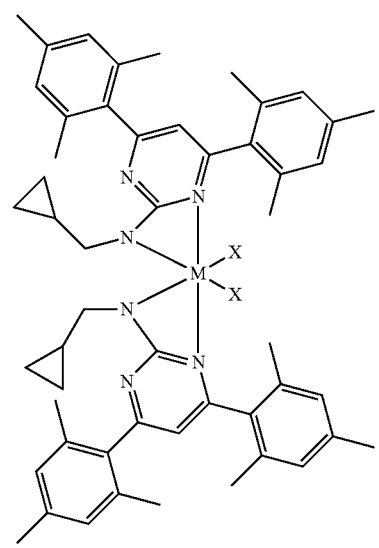
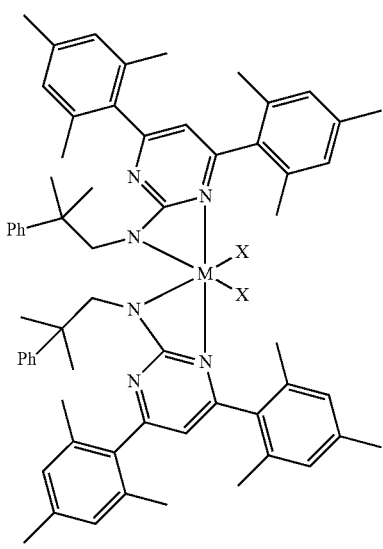

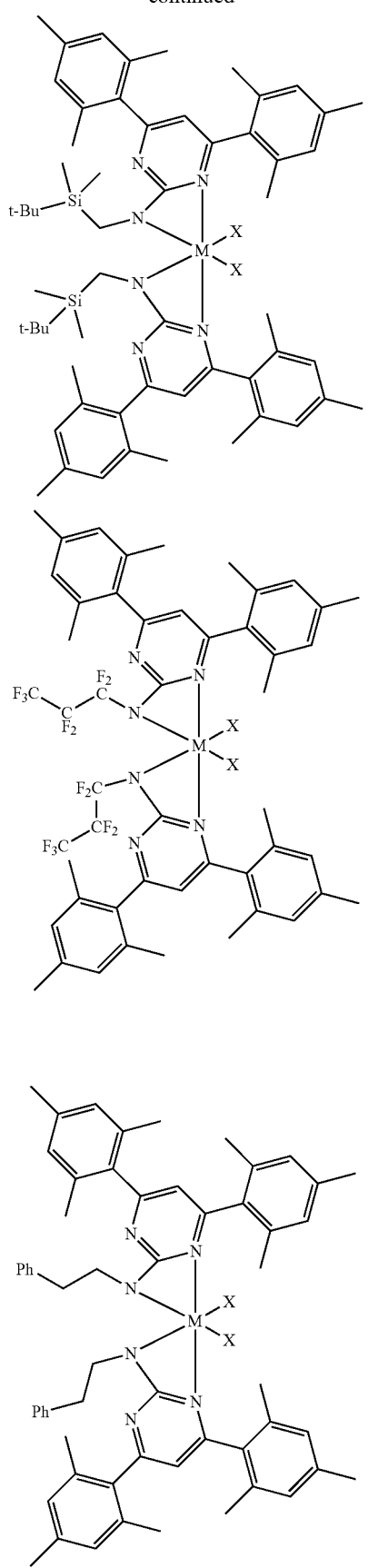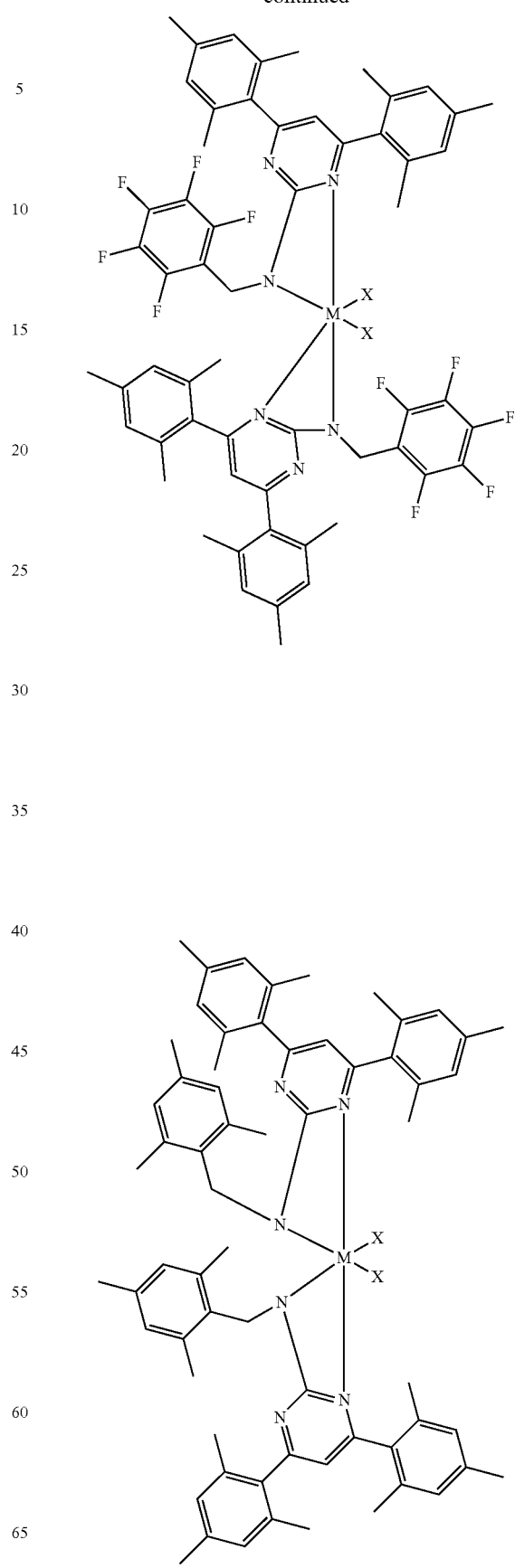

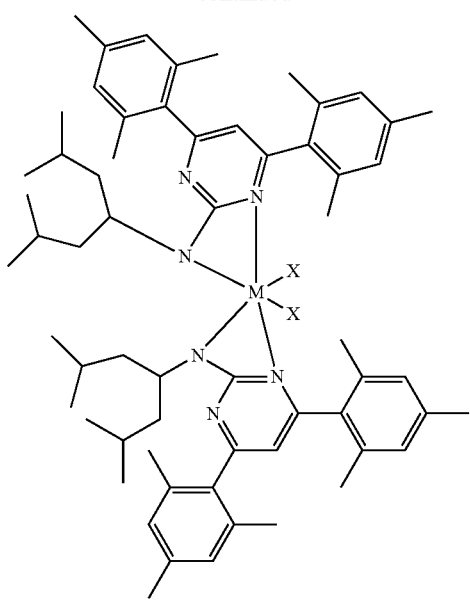
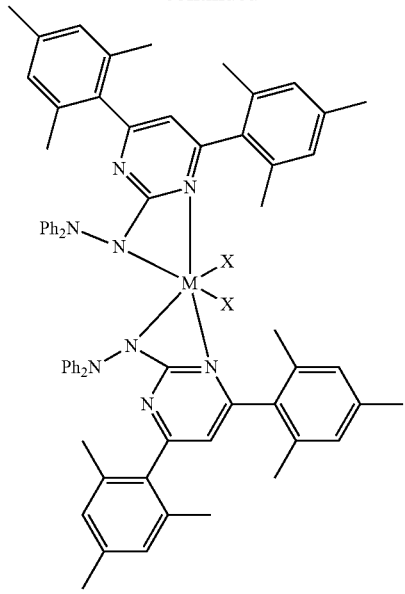
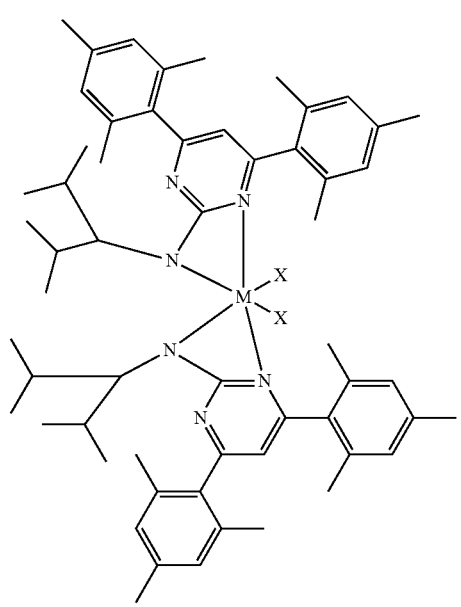
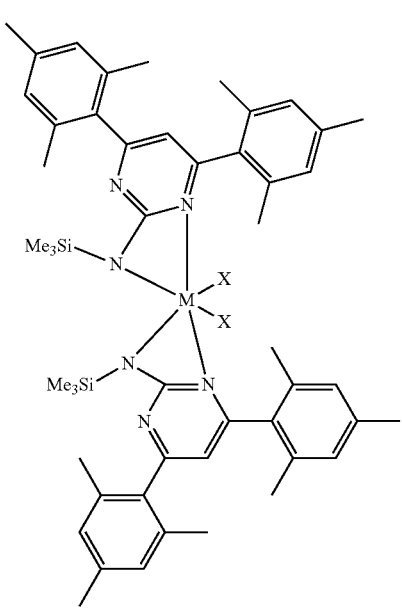
Additional structures exemplifying metal-ligand complexes described by Formula (I) are shown below:

31
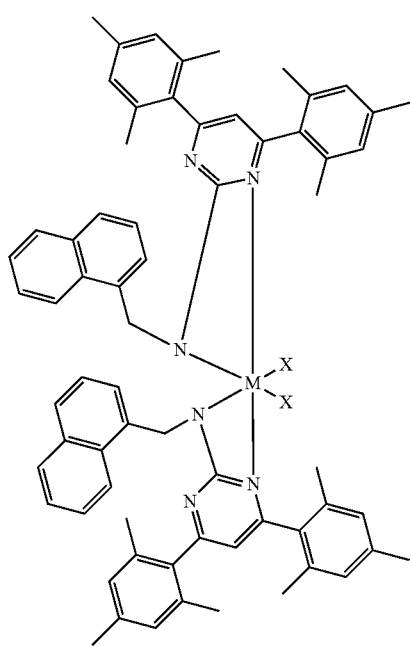
32
-continued
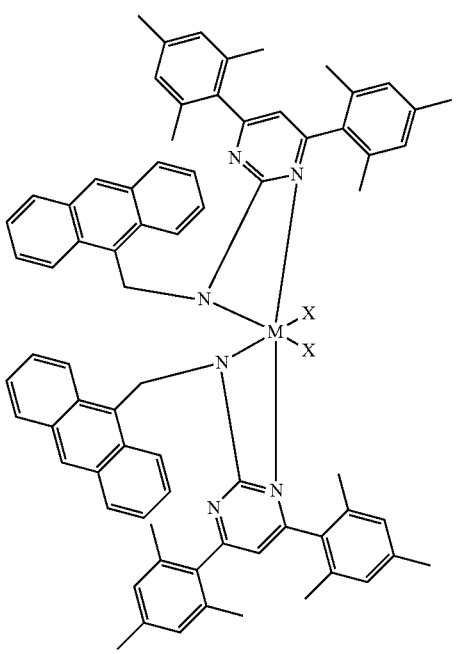
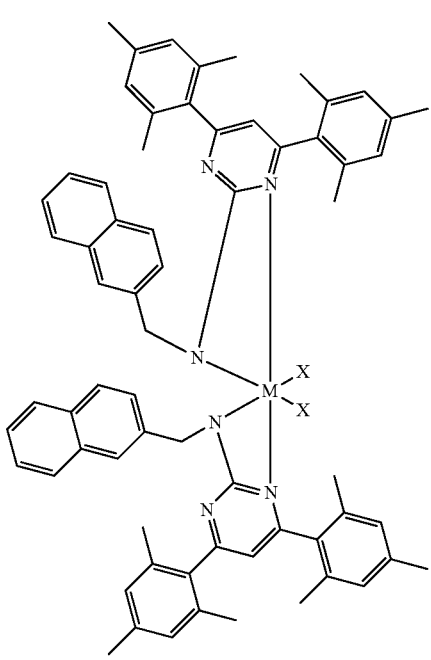
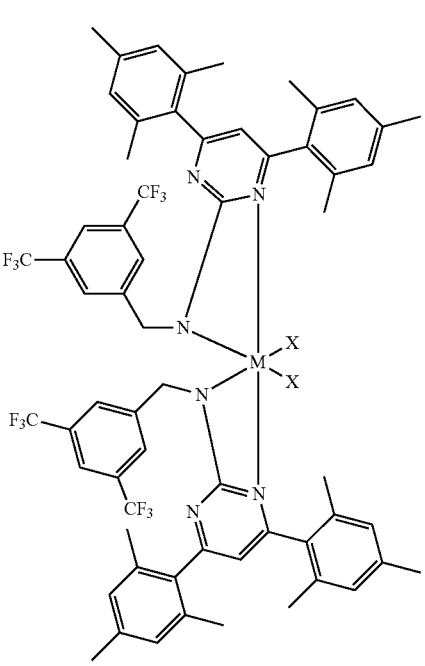

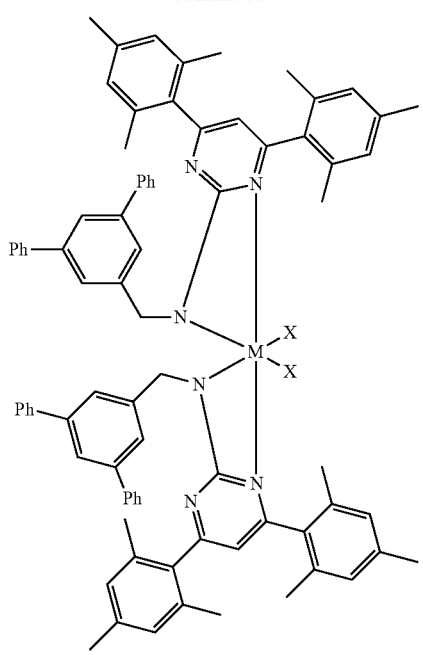
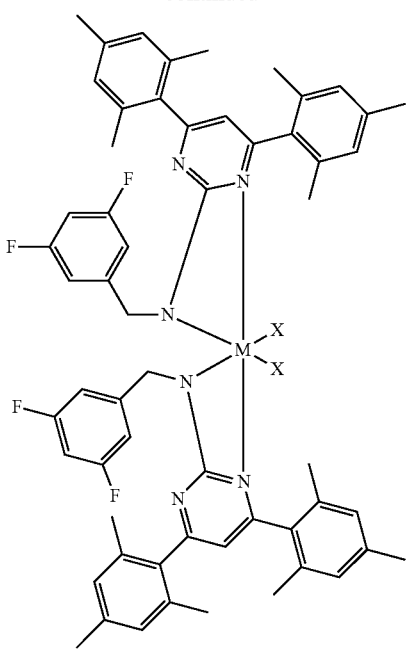
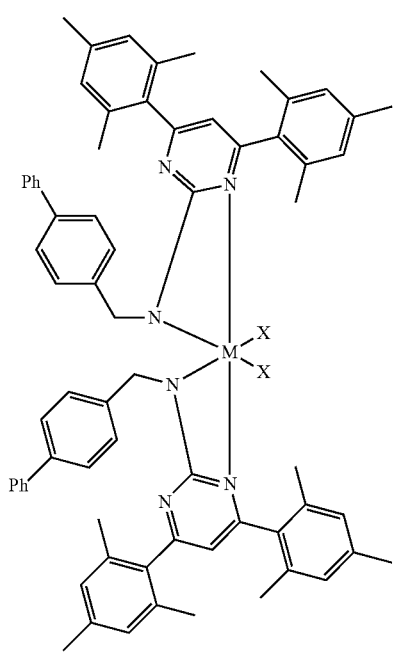
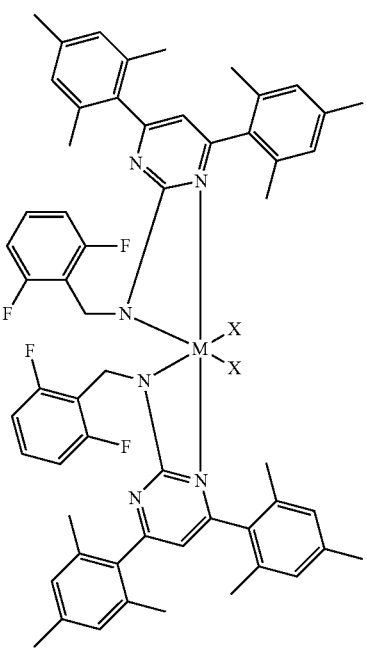

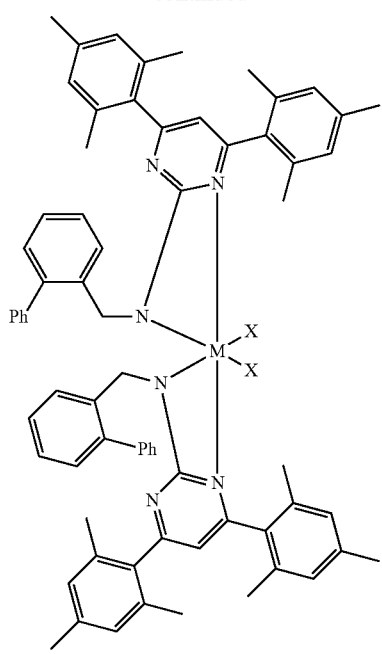
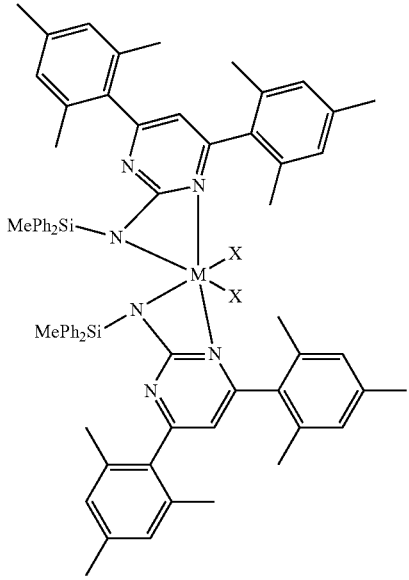
Additional structures exemplifying metal-ligand complexes described by Formula (I) are shown below:
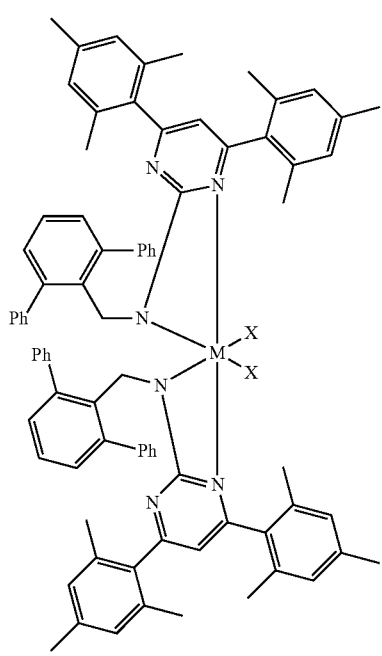
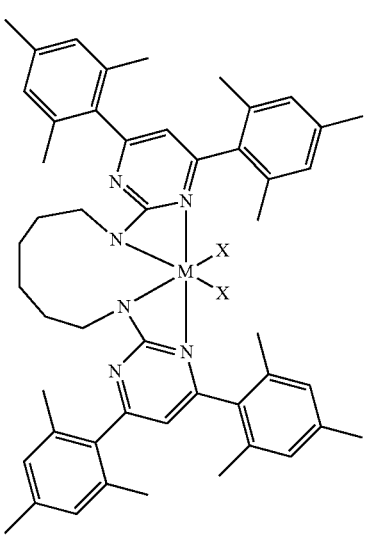

-continued
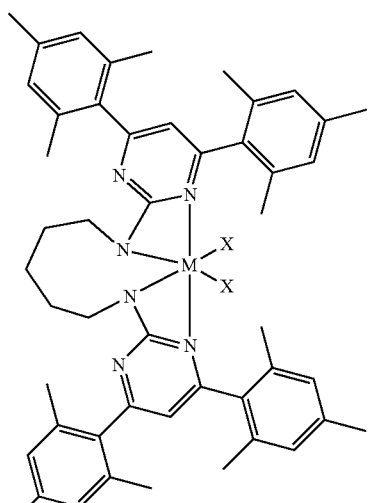
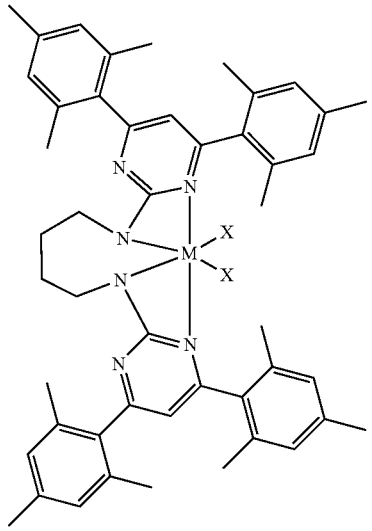
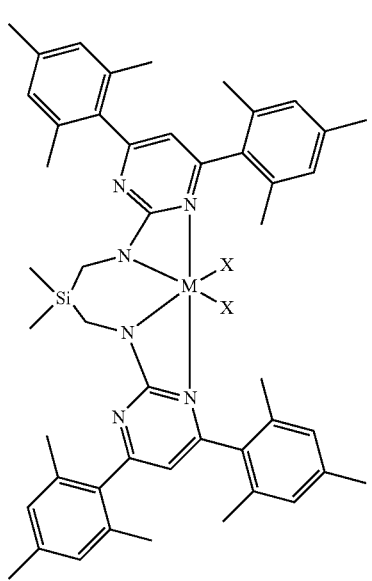
-continued
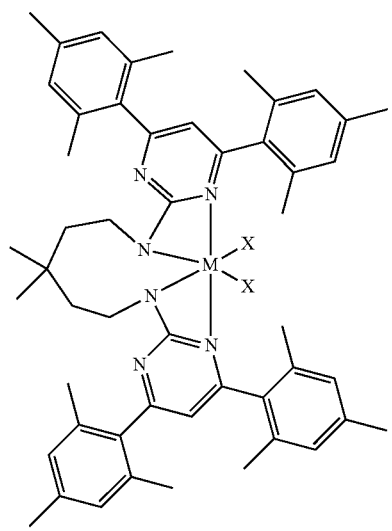
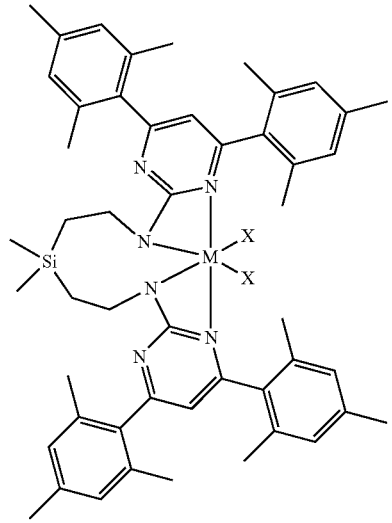
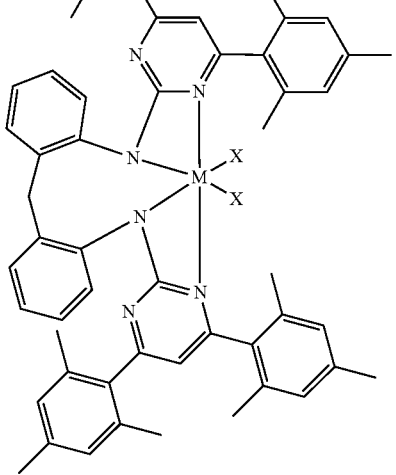

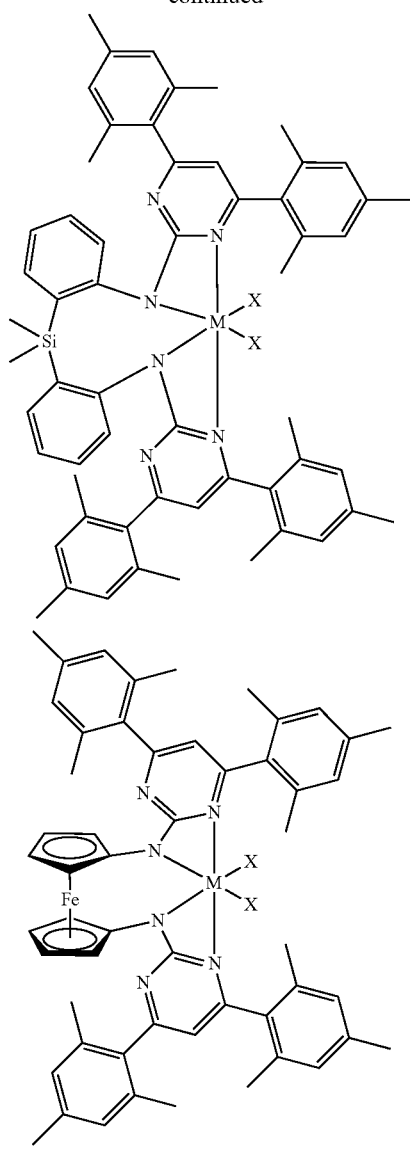
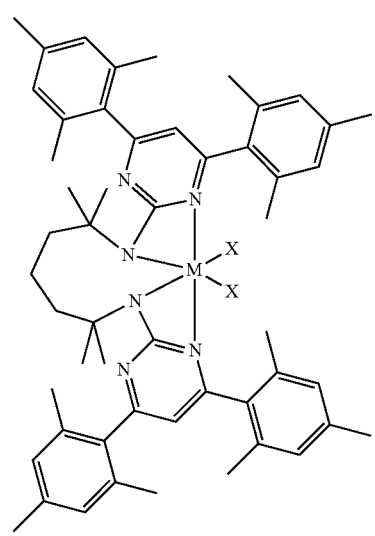
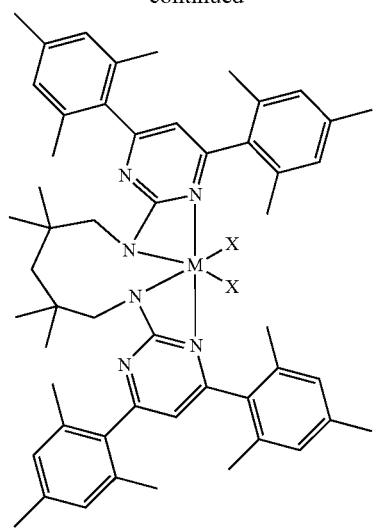
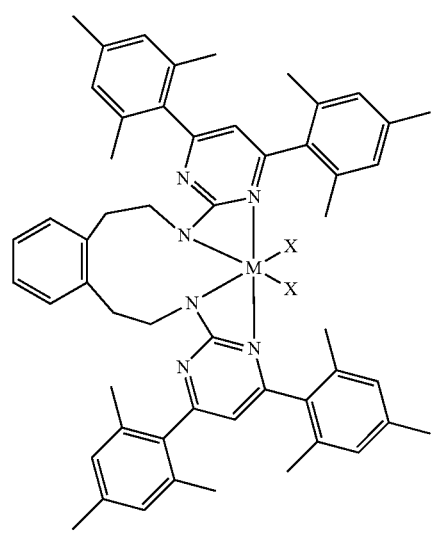
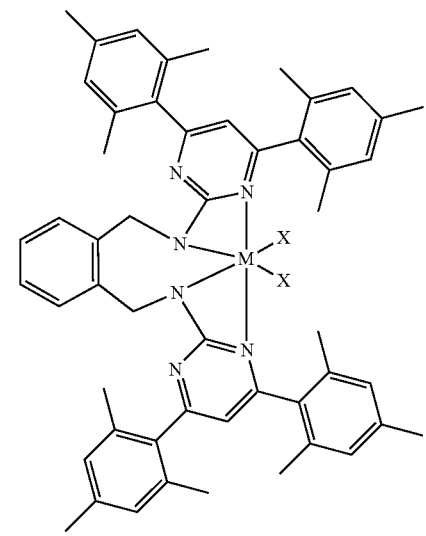

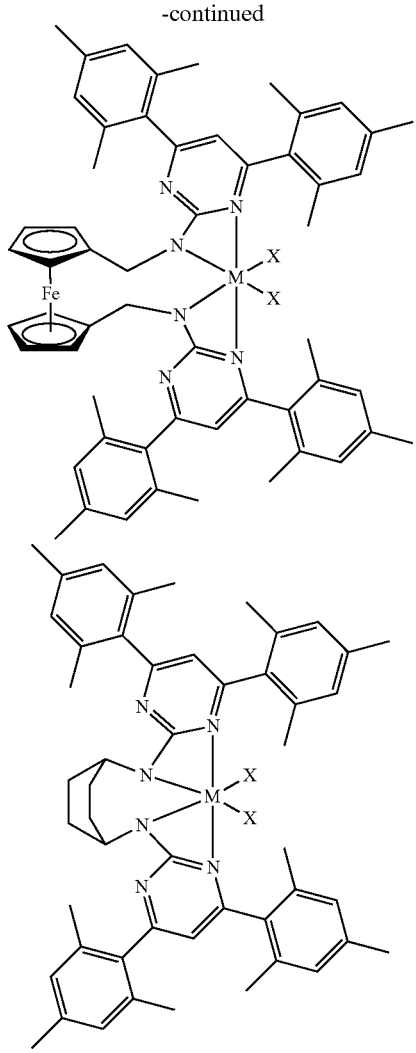
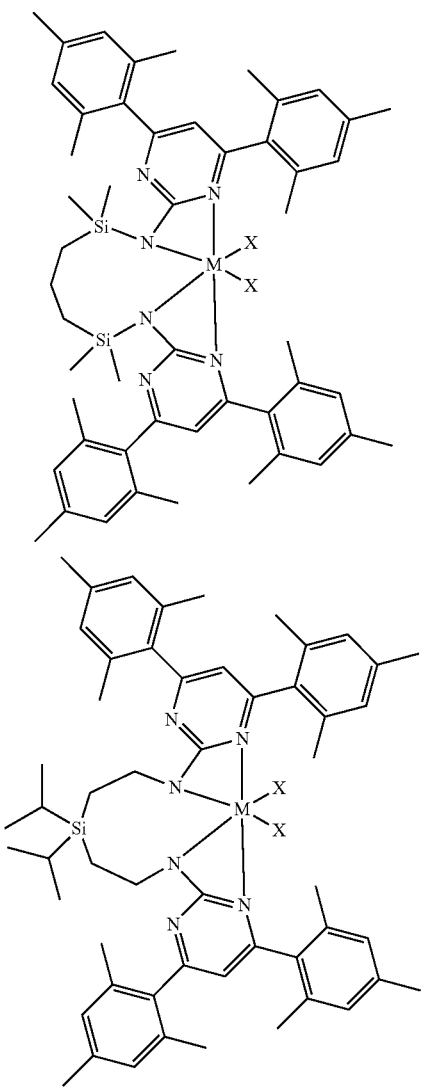
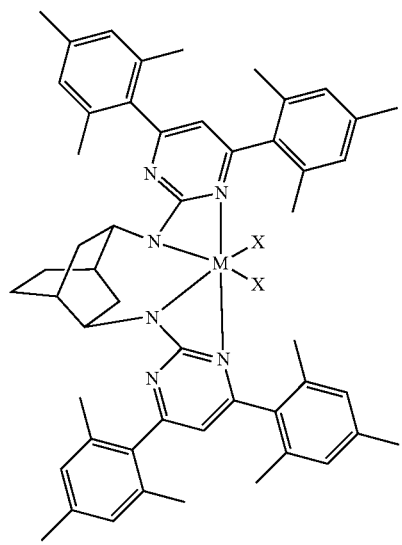
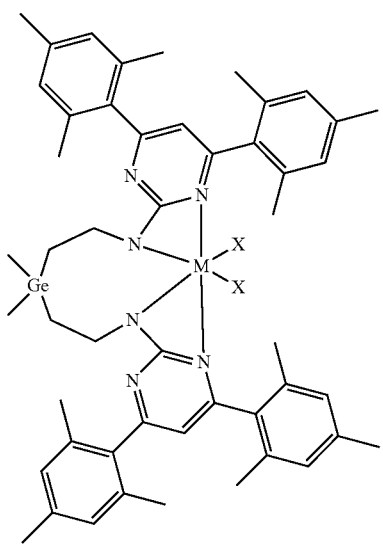
Additional structures exemplifying metal-ligand complexes described by Formula (I) are shown below:

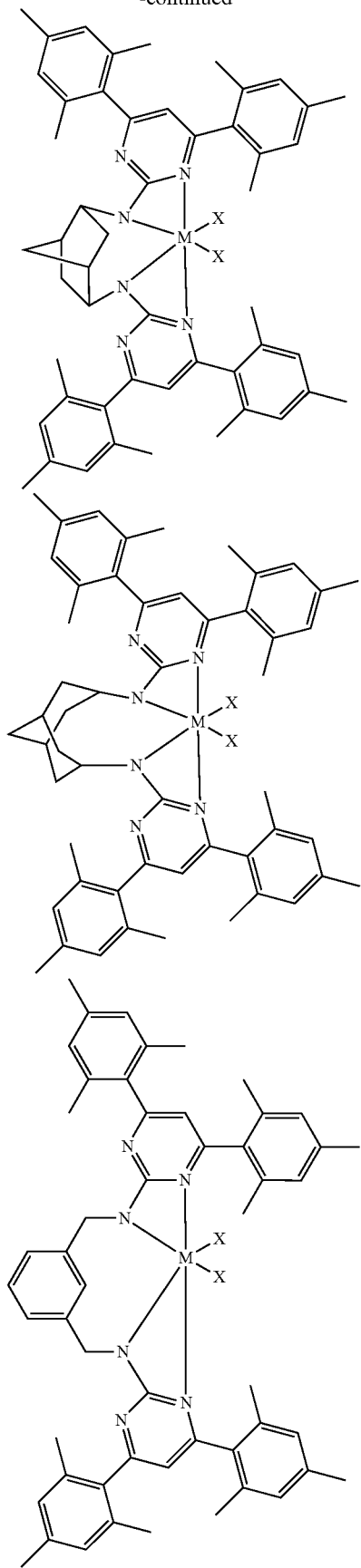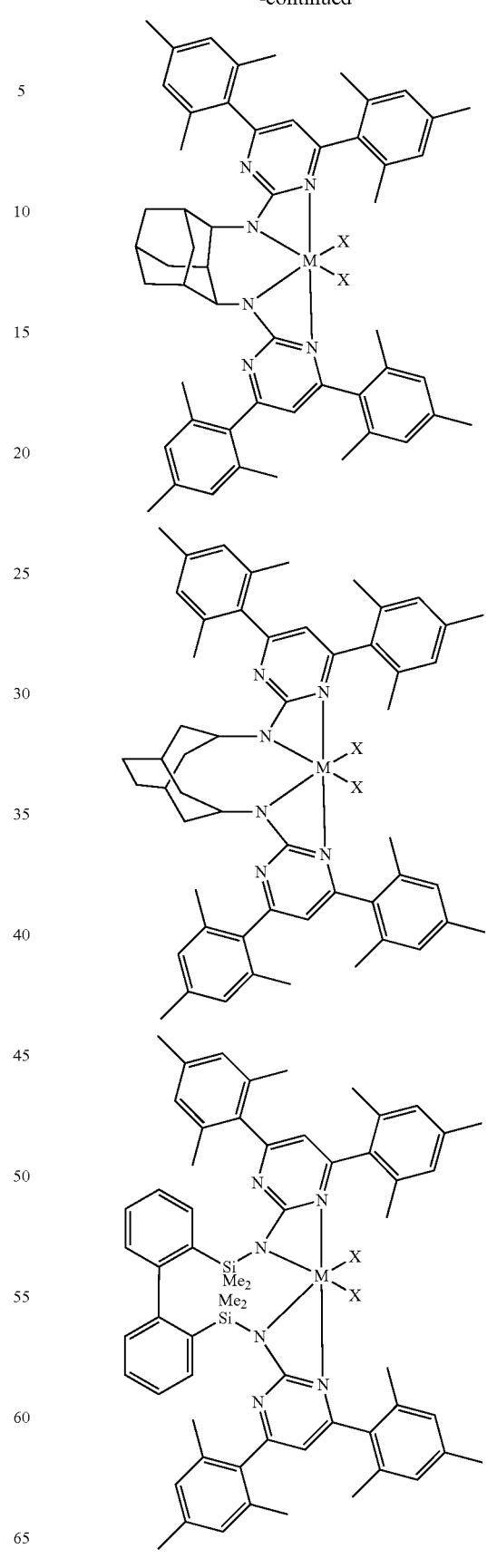

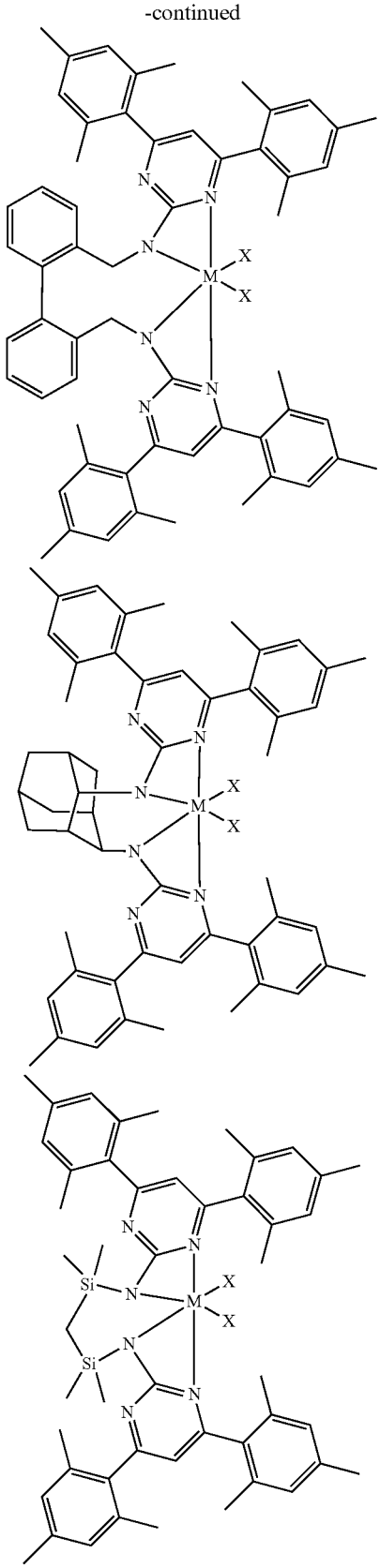
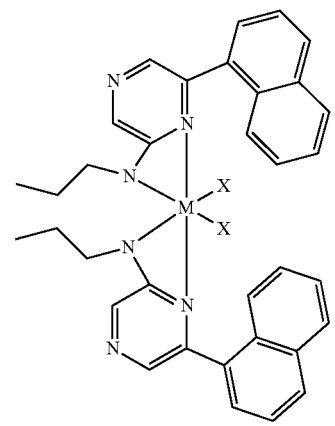
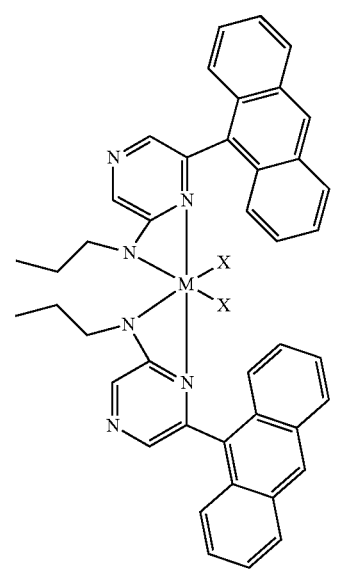
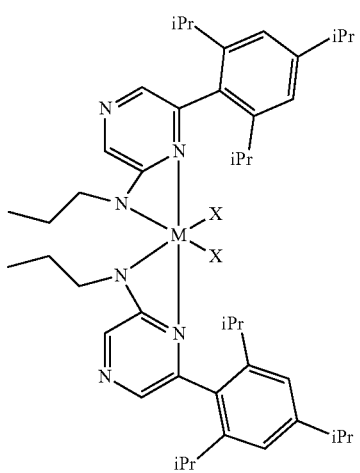
Additional structures exemplifying metal-ligand complexes described by Formula (I) are shown below:

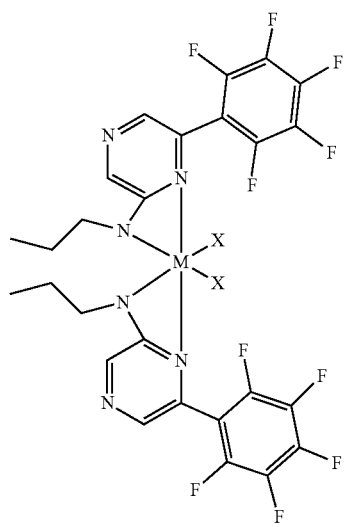
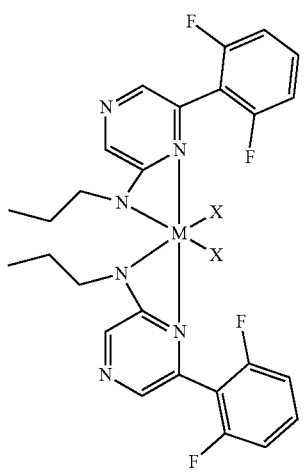
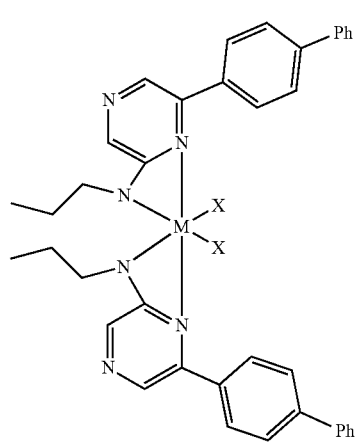
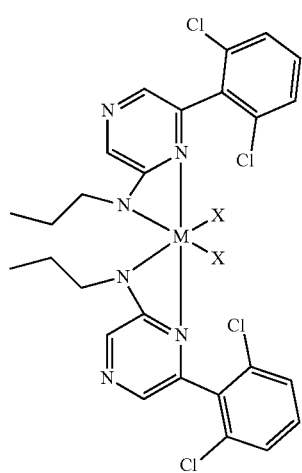
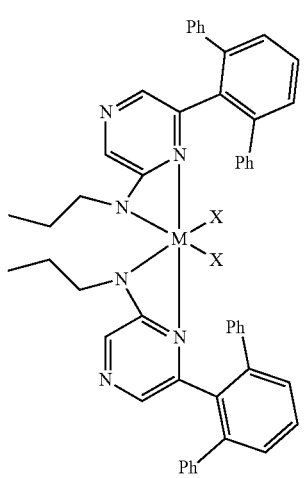

-continued
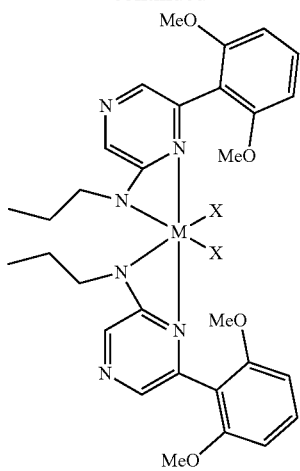
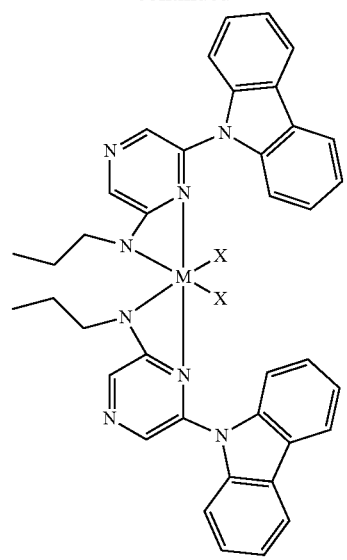
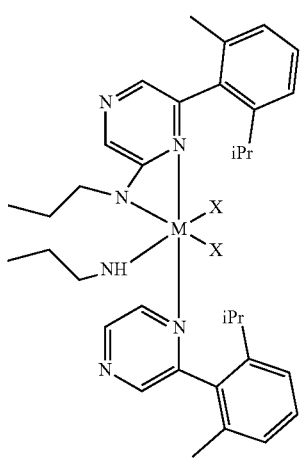
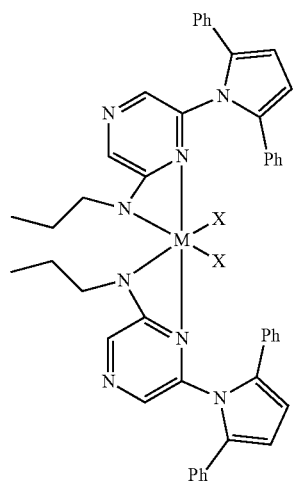
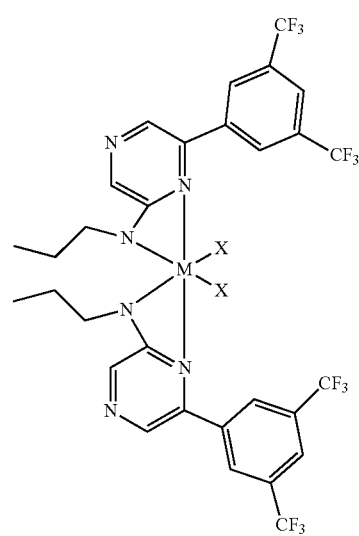
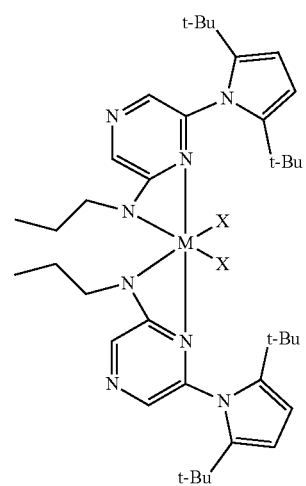

-continued
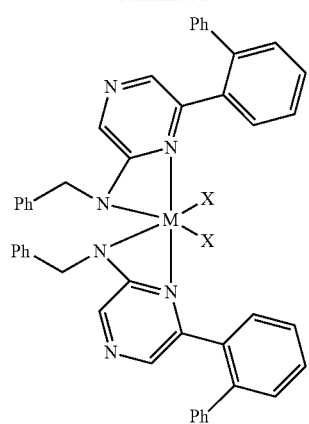
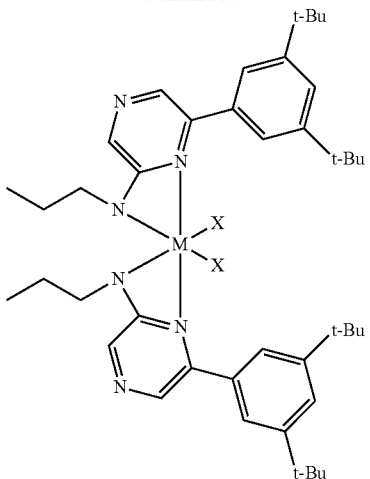
Additional structures exemplifying metal-ligand complexes described by Formula (I) are shown below:
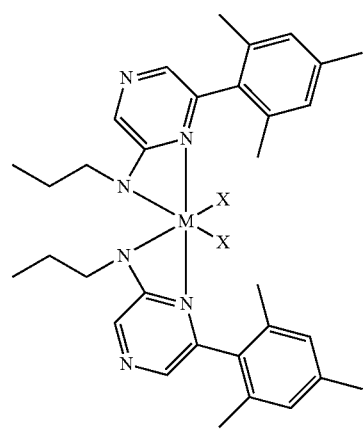
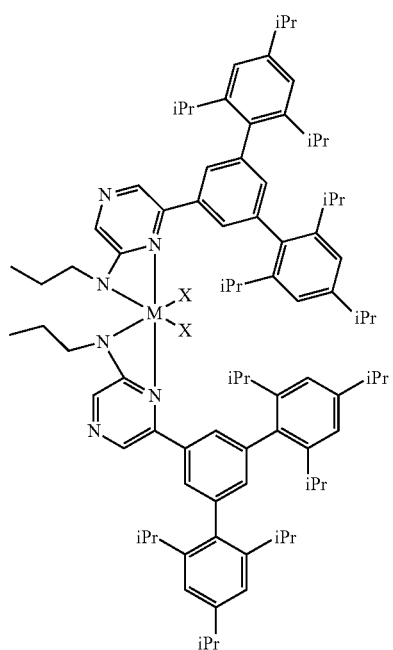
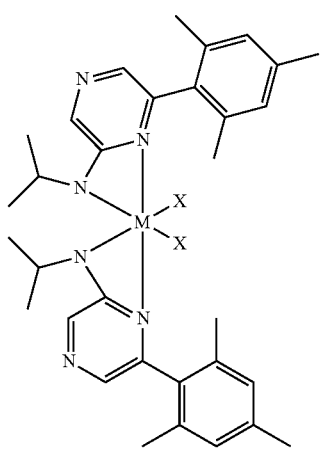
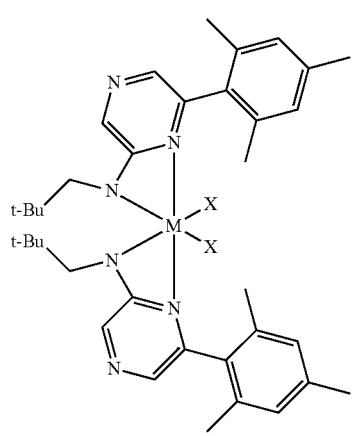

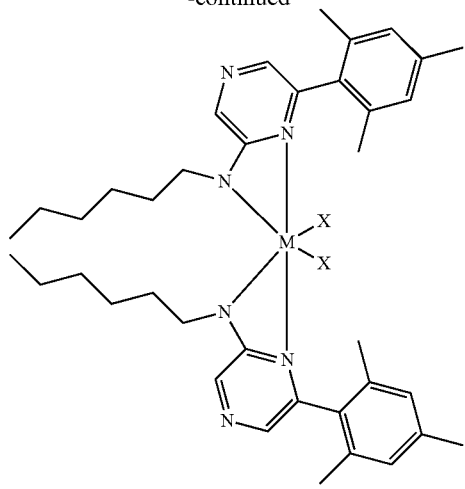
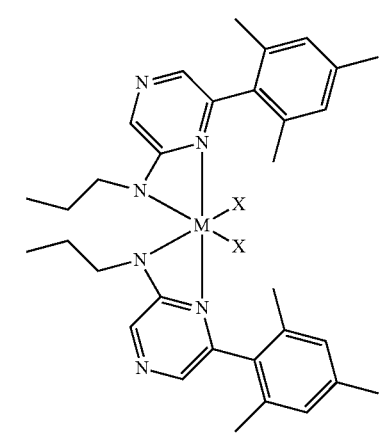
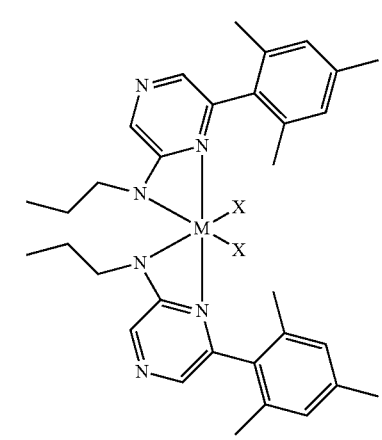
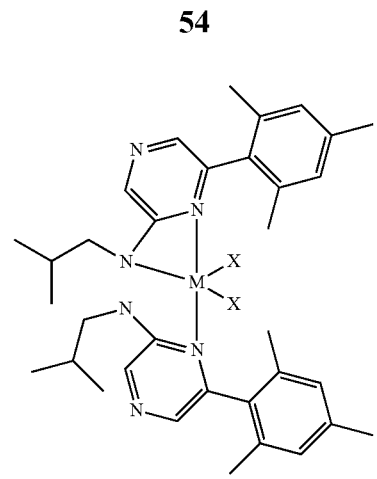
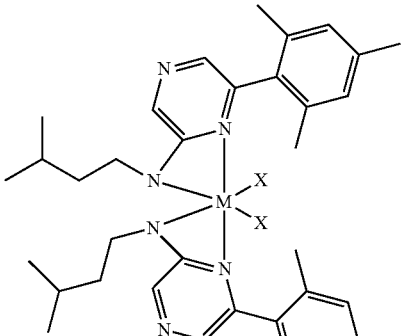
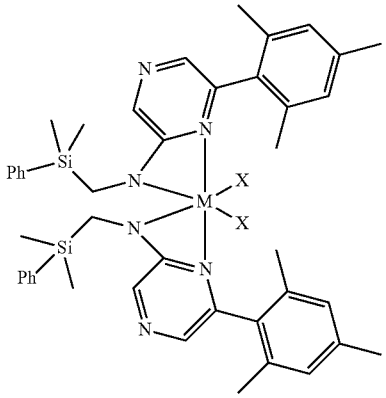
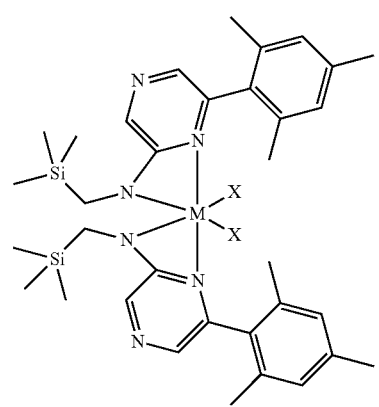
Additional structures exemplifying metal-ligand complexes described by Formula (I) are shown below:

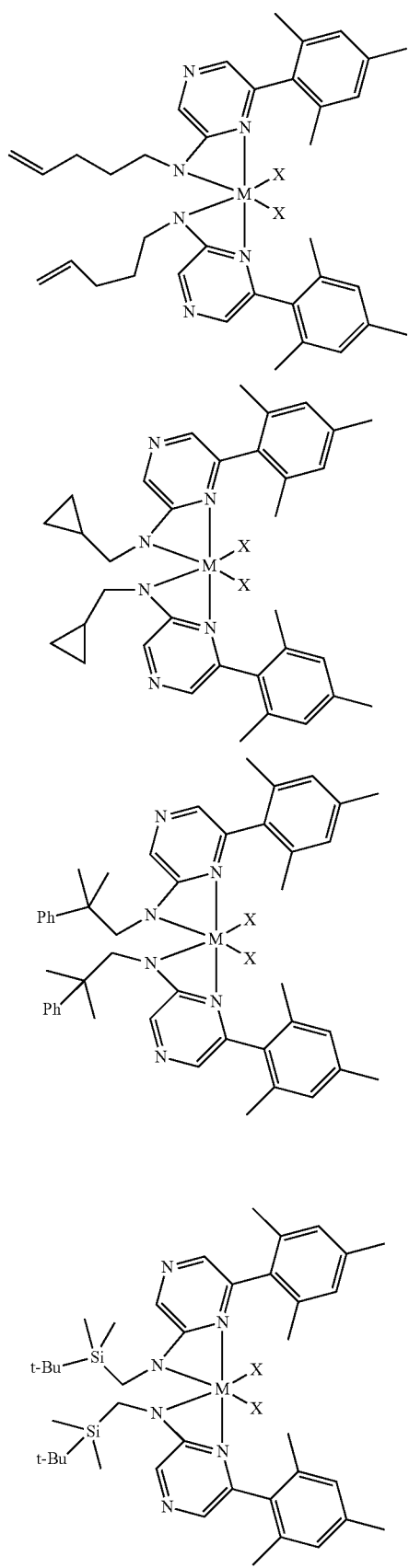
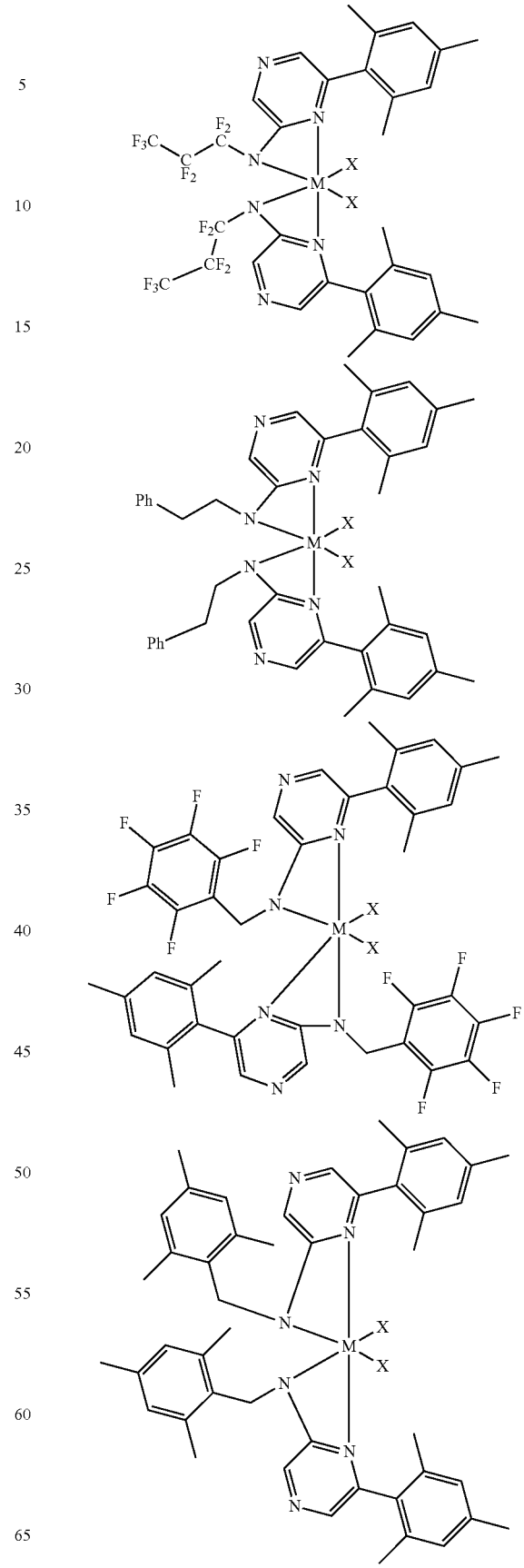

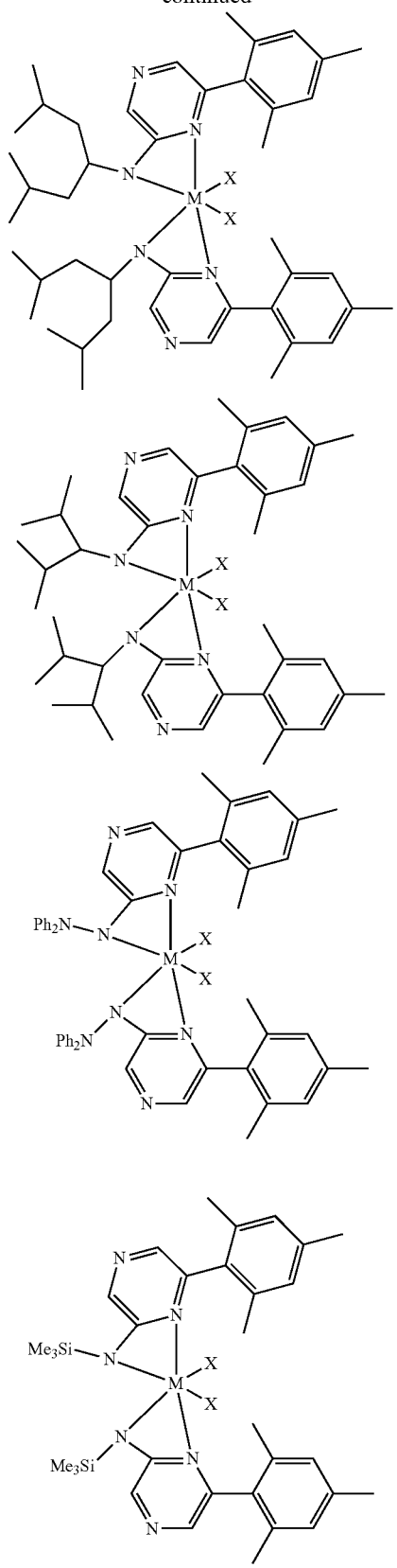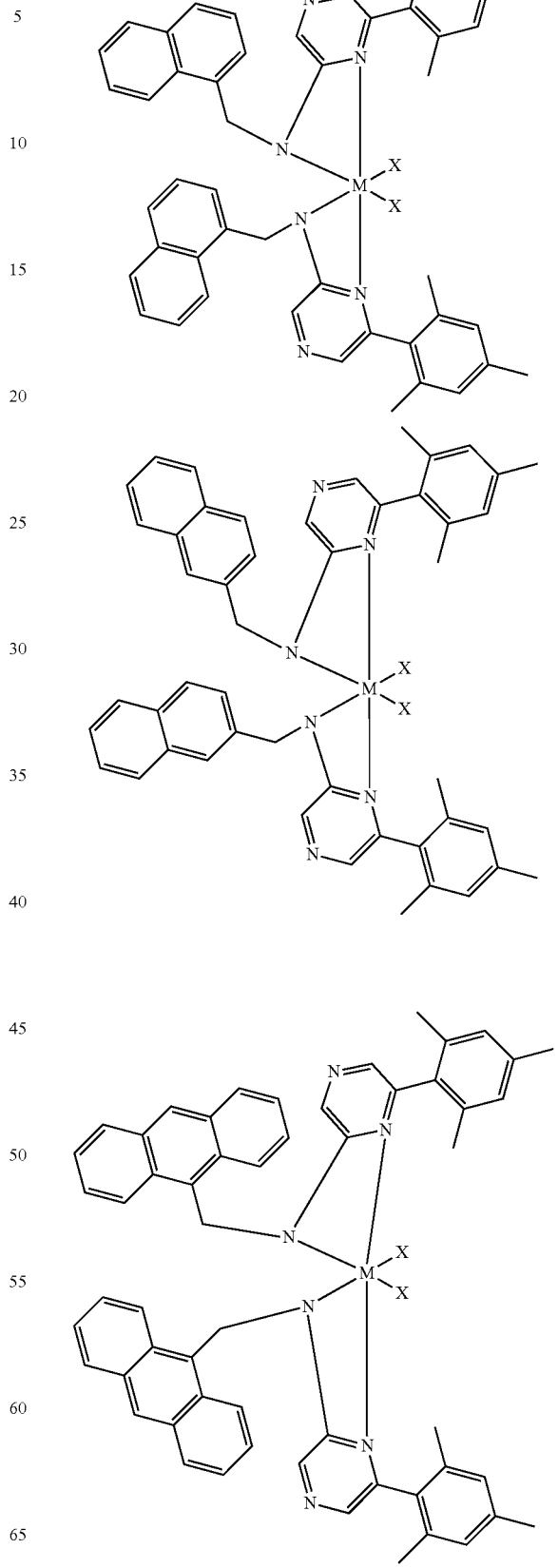
Additional structures exemplifying metal-ligand complexes described by Formula (I) are shown below:

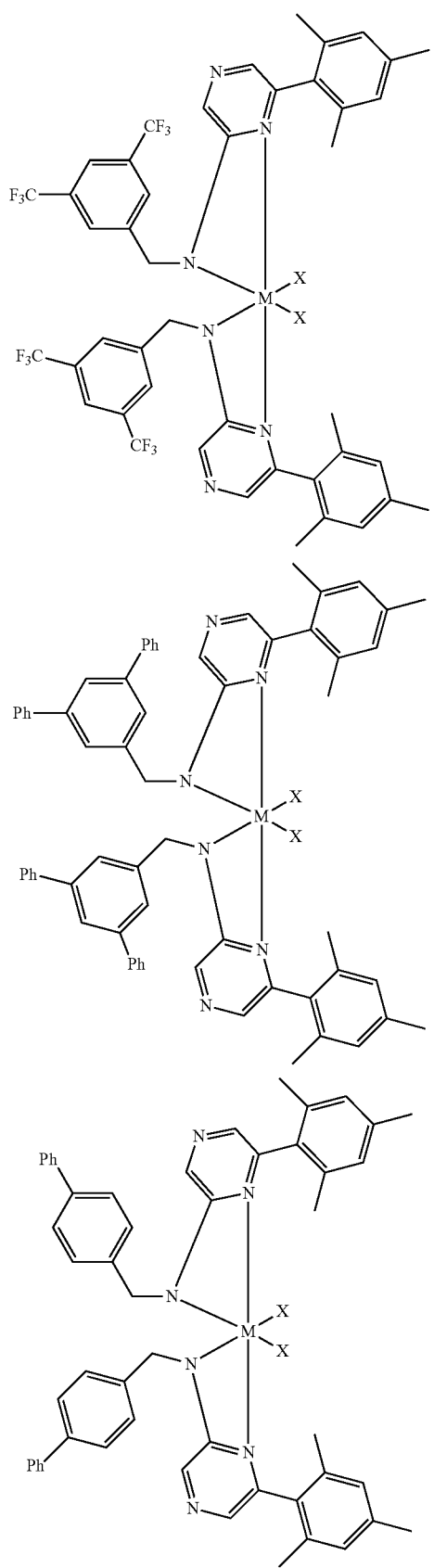
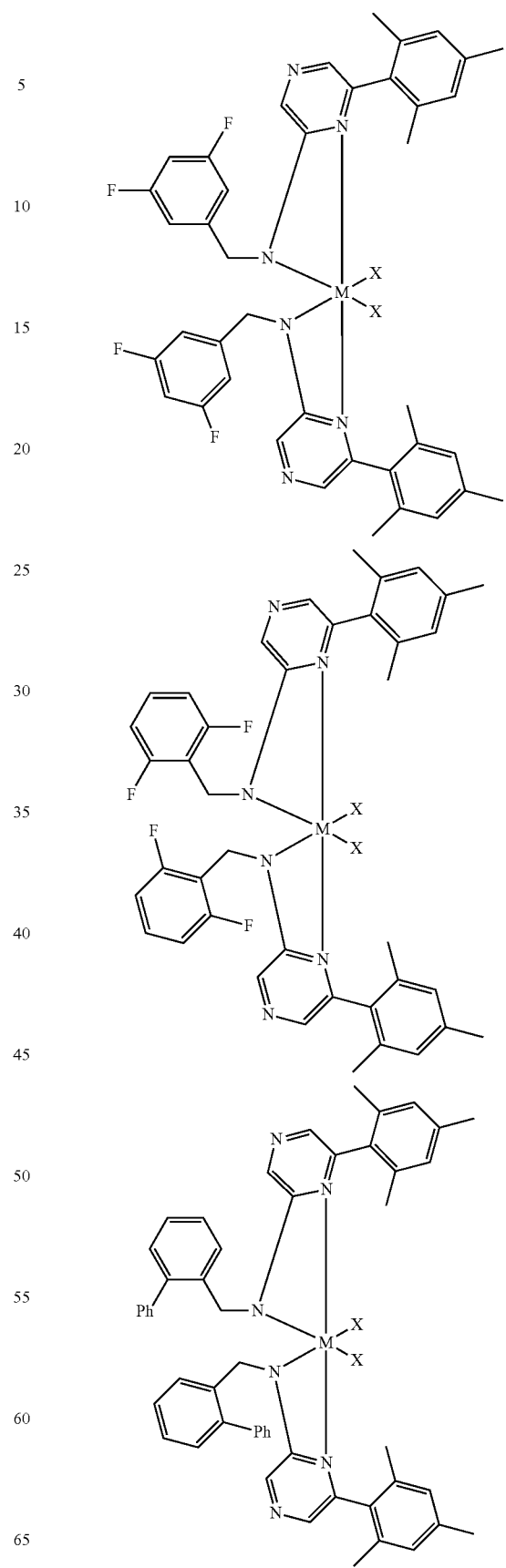

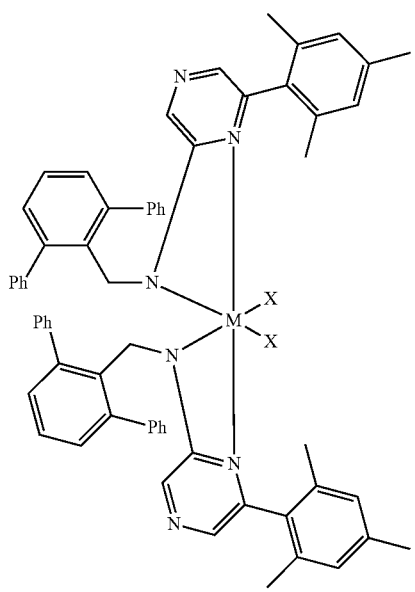
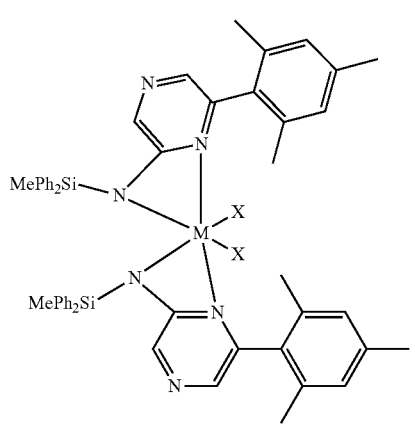
Additional structures exemplifying metal-ligand complexes described by Formula (I) are shown below:
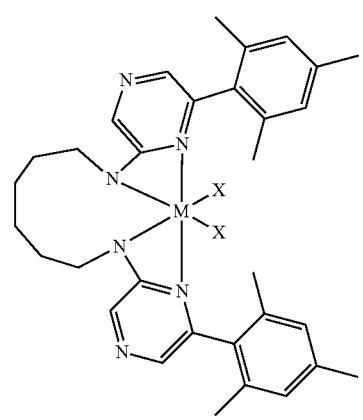
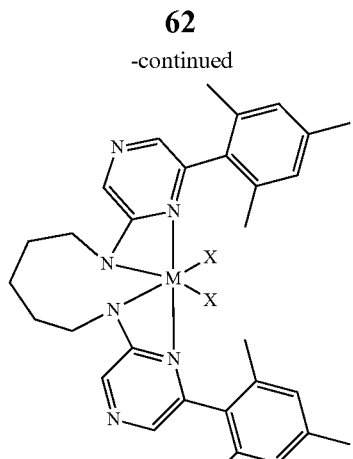
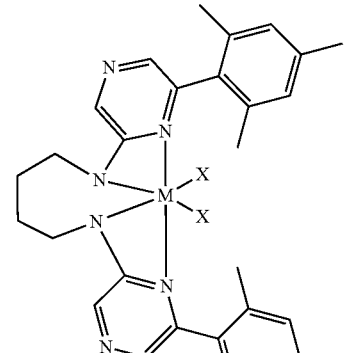
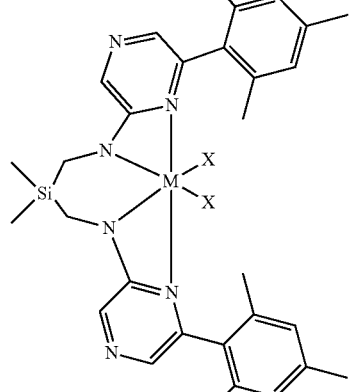
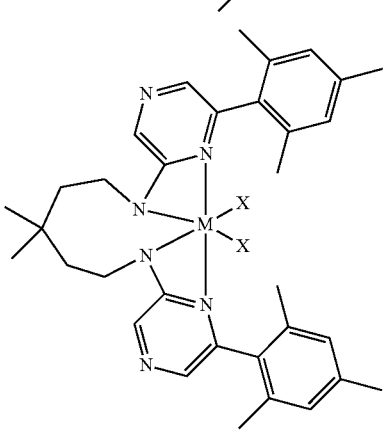

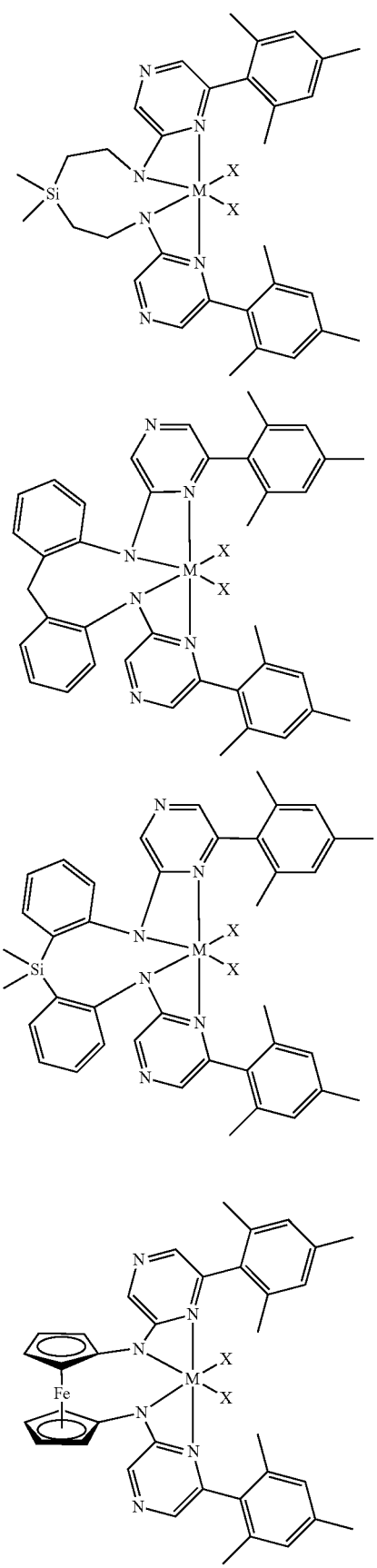
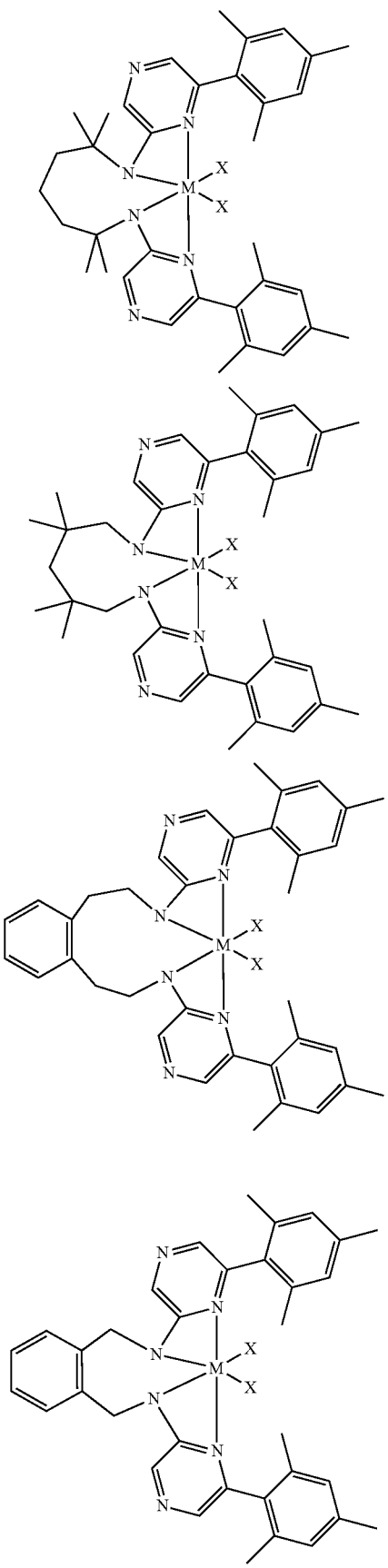

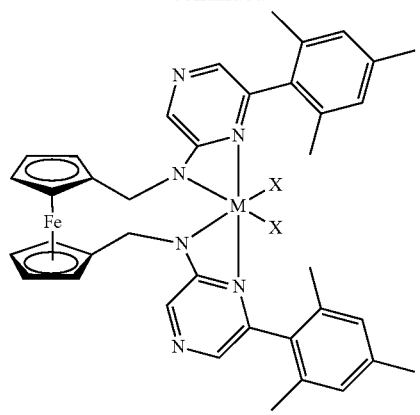
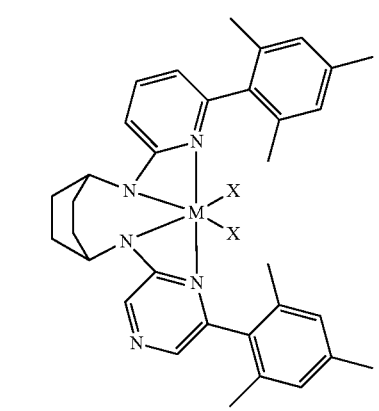
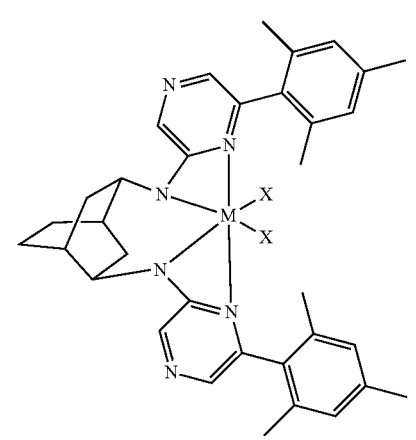
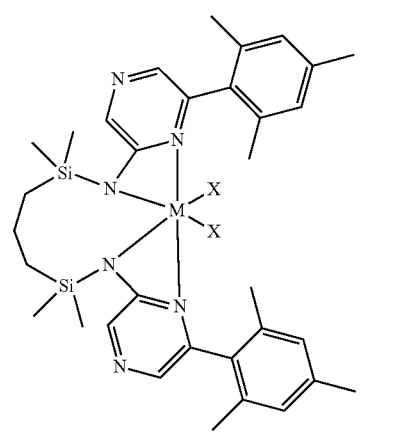
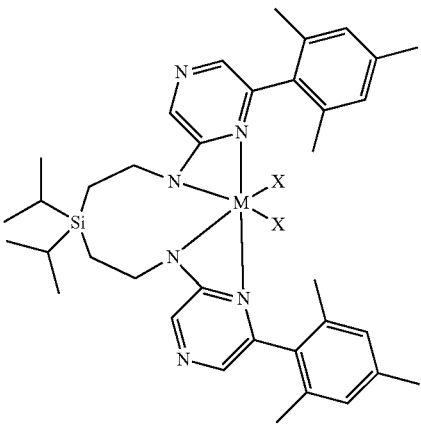
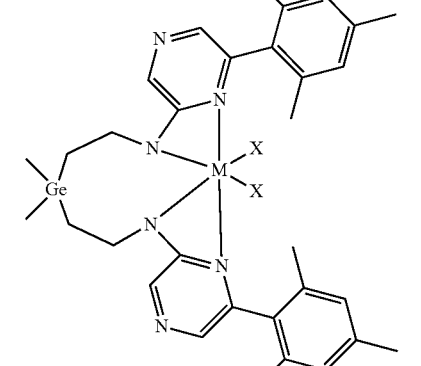
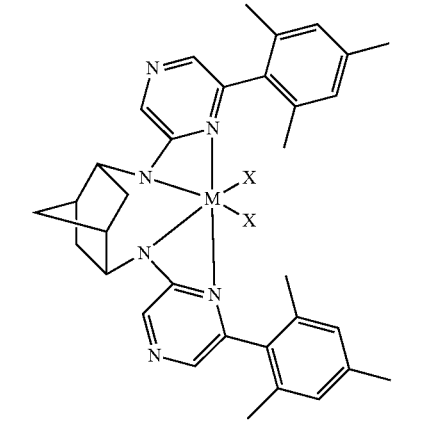
Additional structures exemplifying metal-ligand complexes described by Formula (I) are shown below:

67
-continued
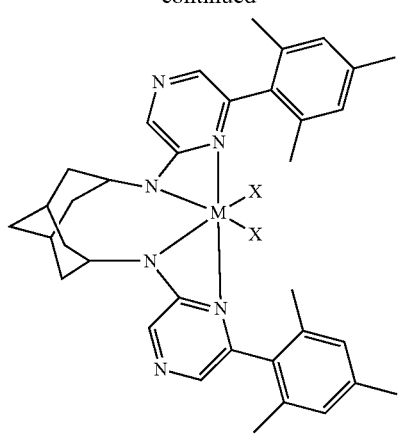
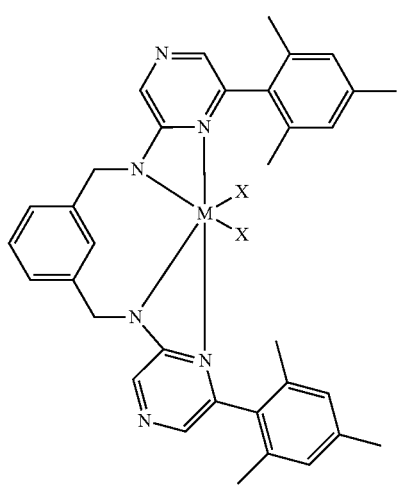
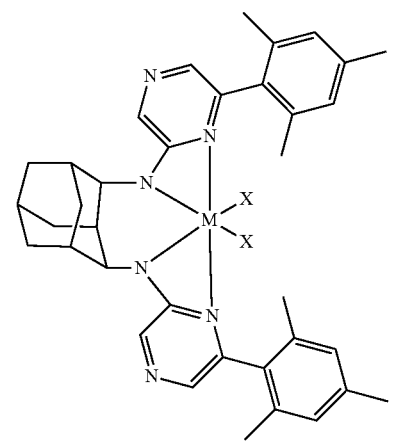
68
-continued
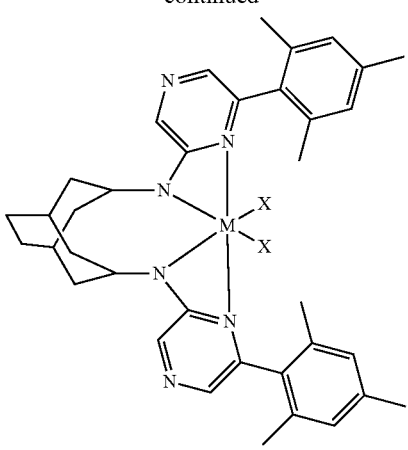
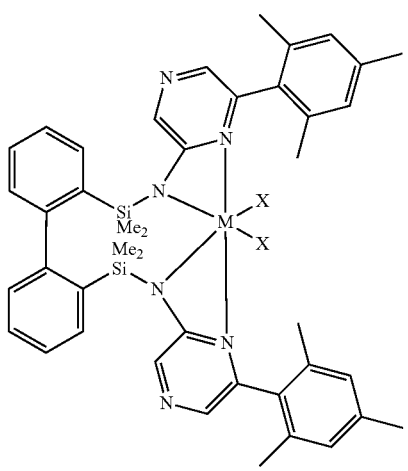
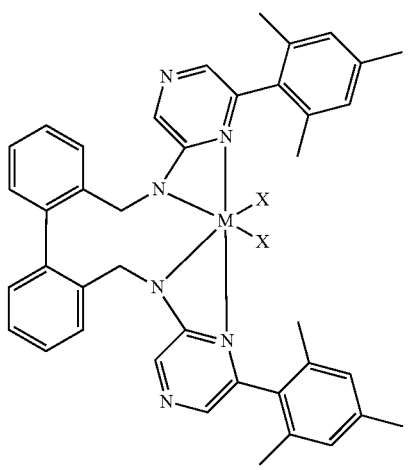

-continued
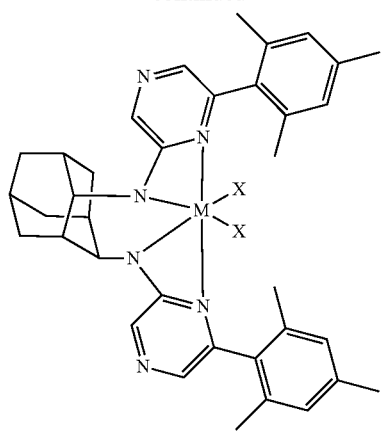
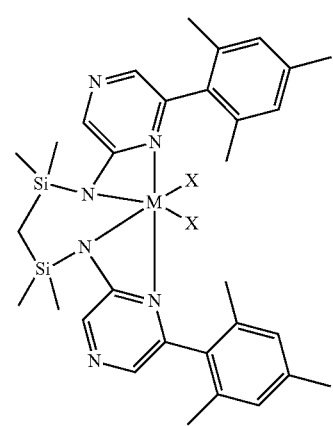
Additional structures exemplifying metal-ligand complexes described by Formula (I) are shown below:
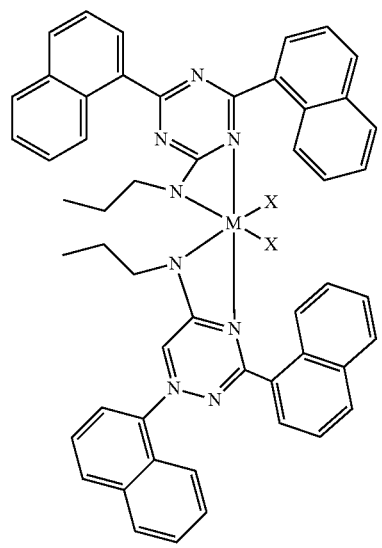
-continued
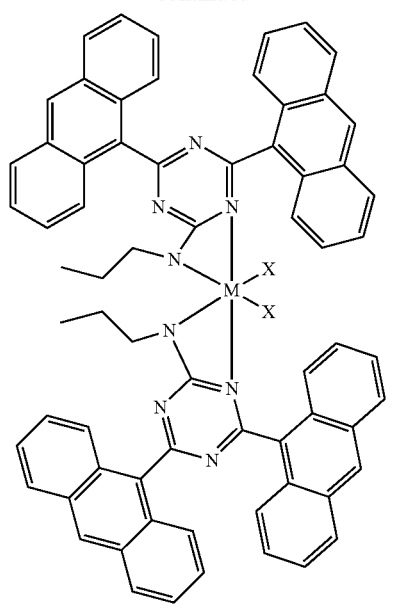
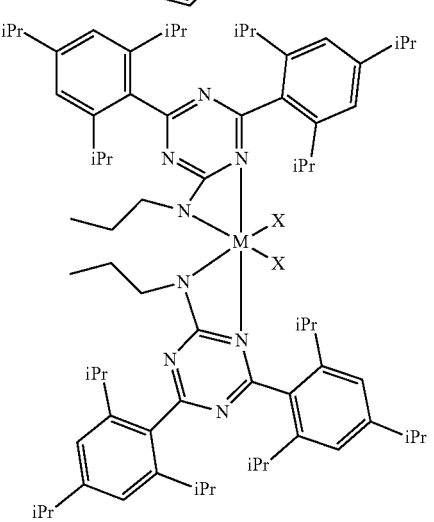
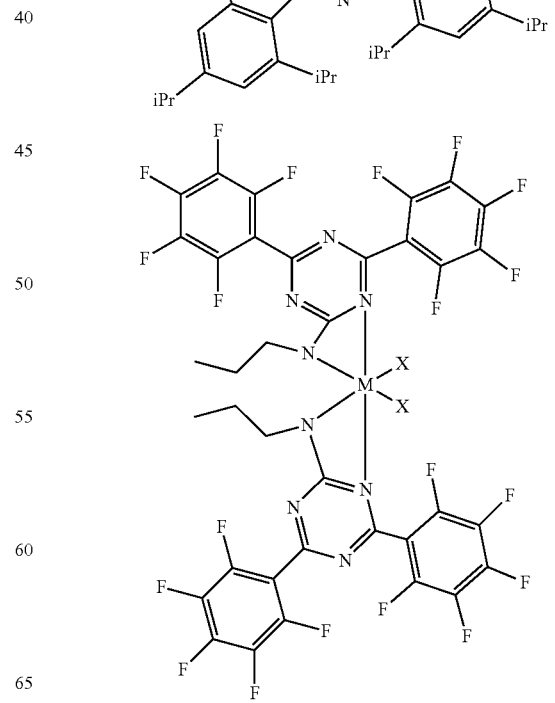

71
-continued
72
-continued
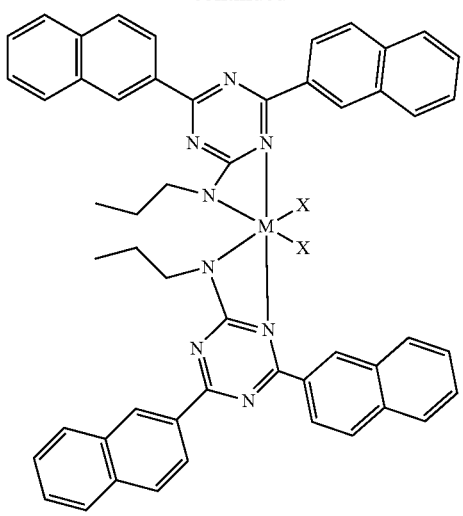
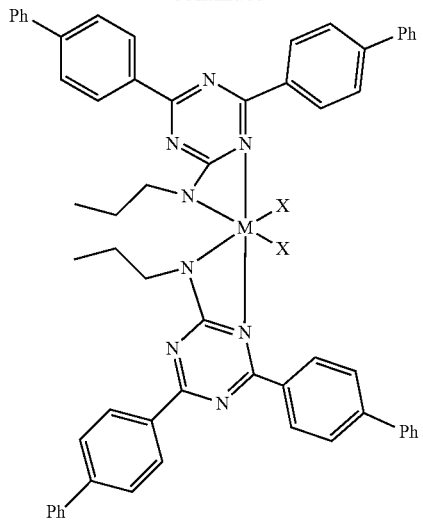
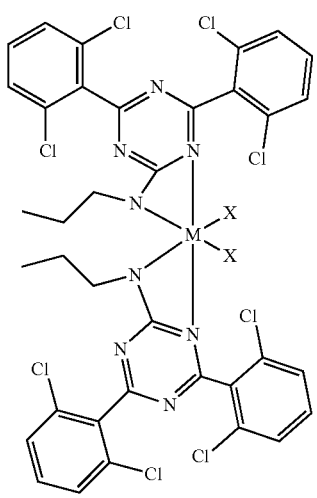
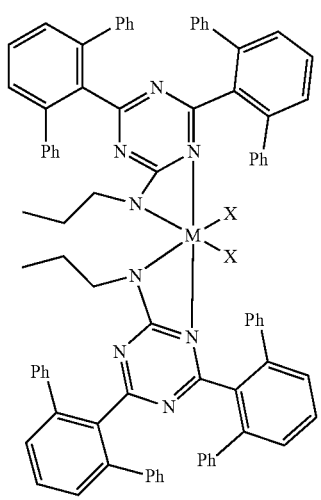
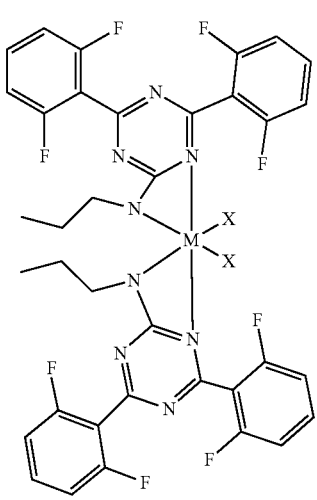
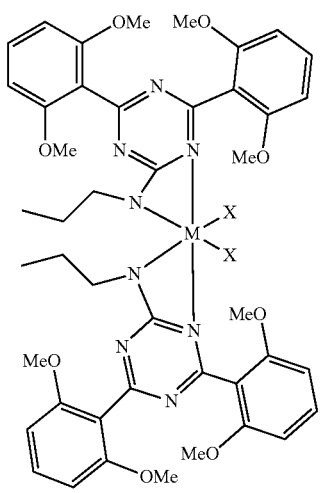

73
-continued
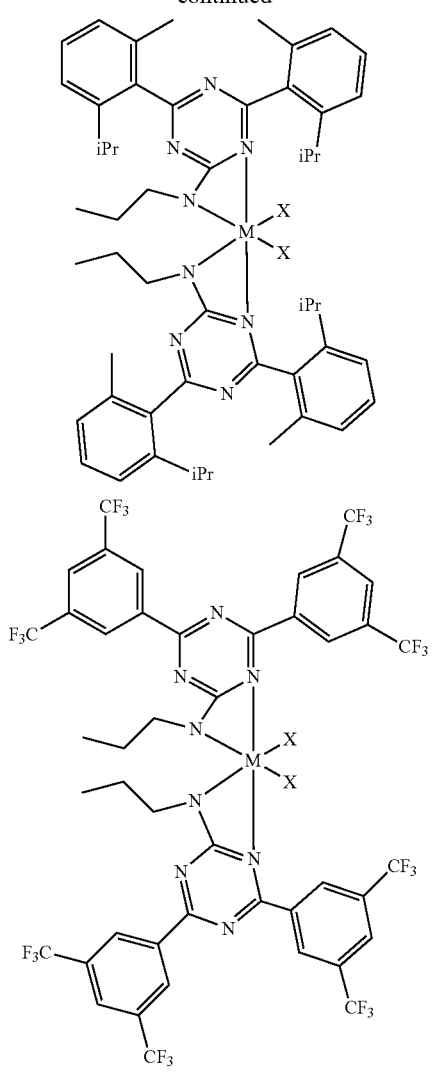
74
-continued
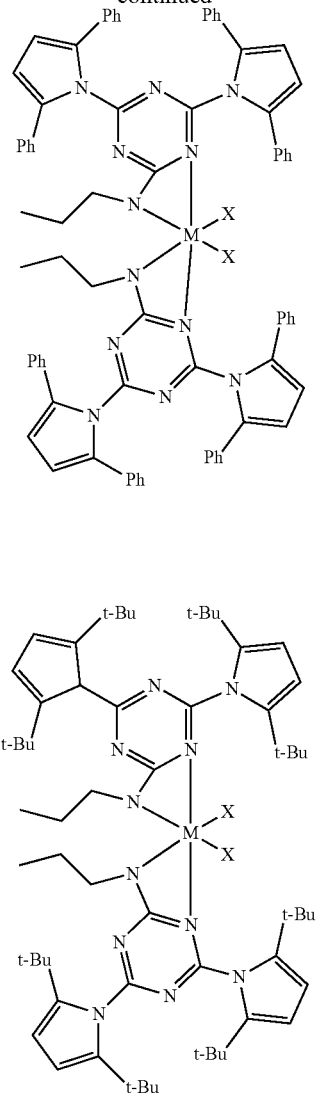
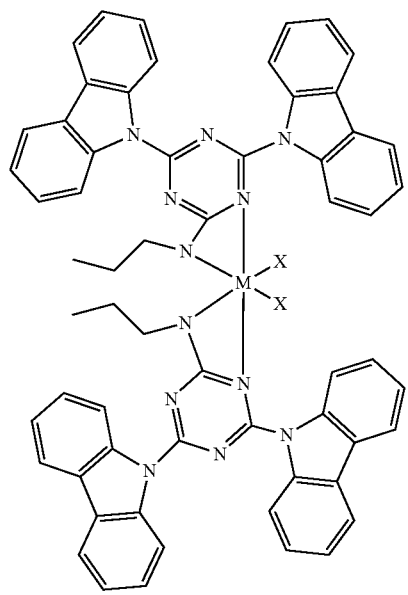
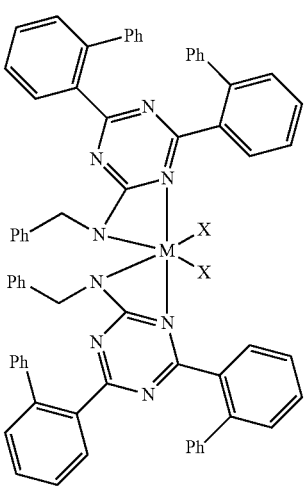
Additional structures exemplifying metal-ligand complexes described by Formula (I) are shown below:

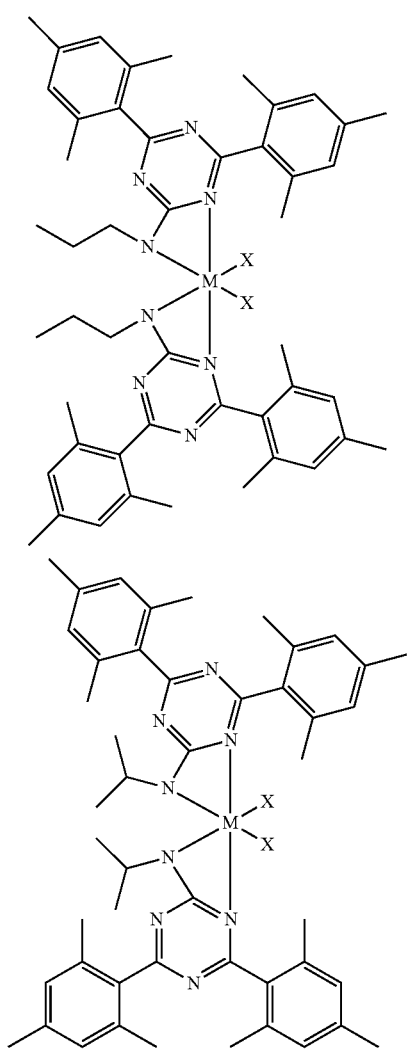
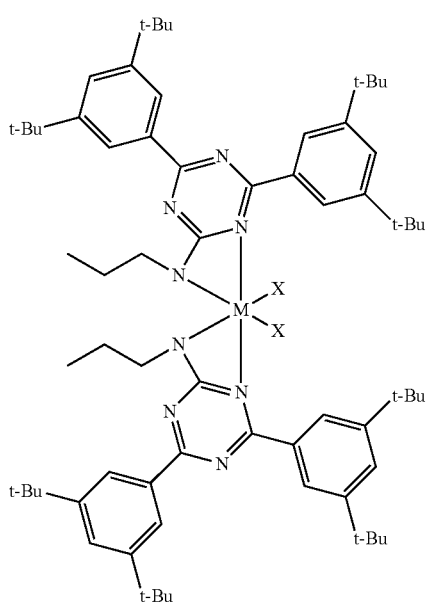
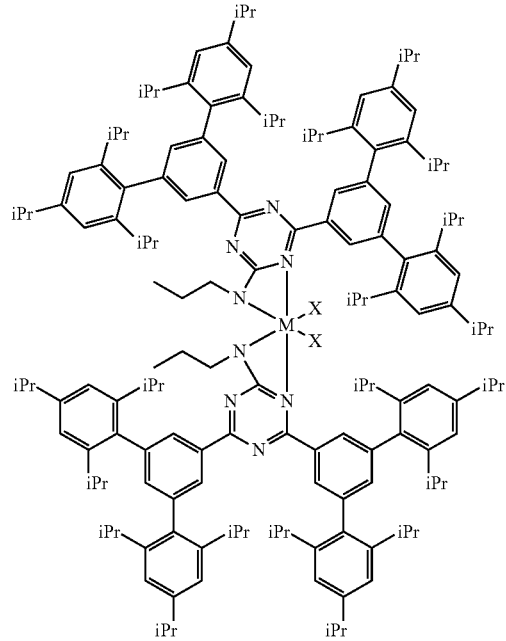
-continued
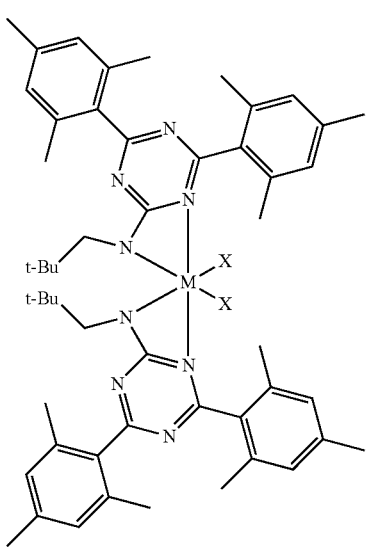

-continued
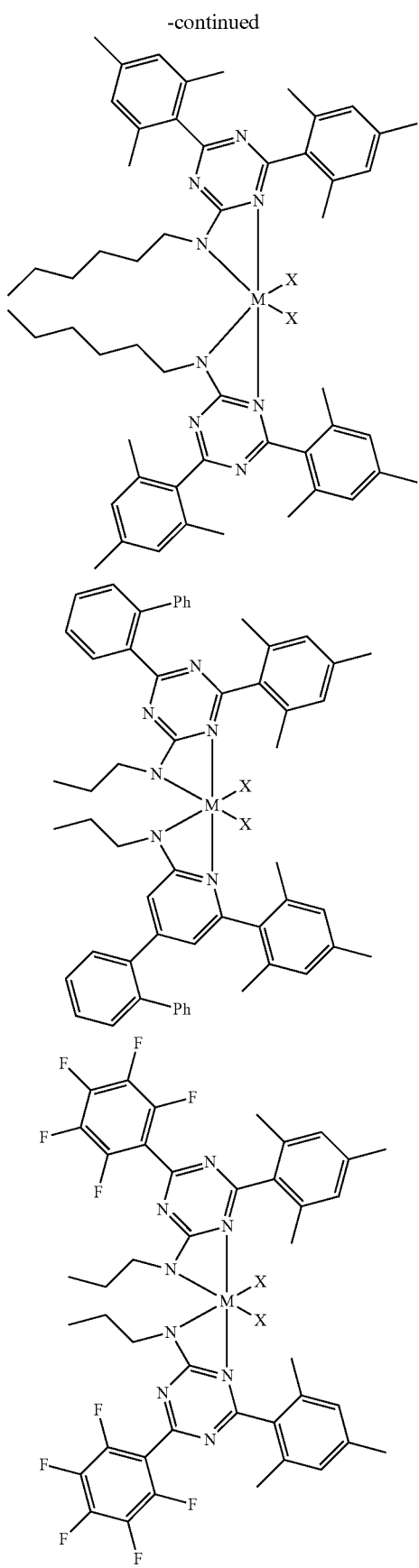
Additional structures exemplifying metal-ligand complexes described by Formula (I) are shown below:
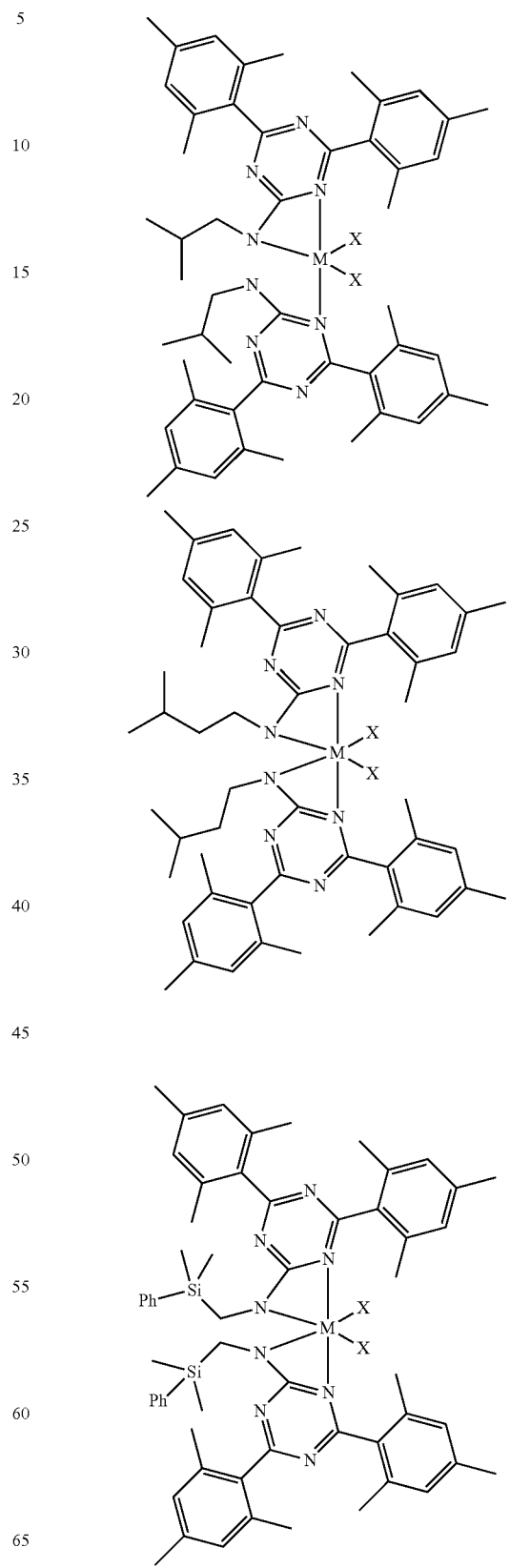

-continued
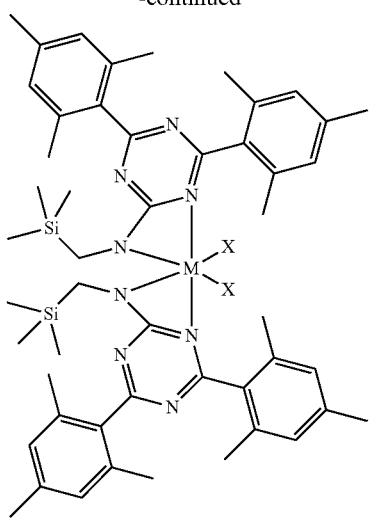
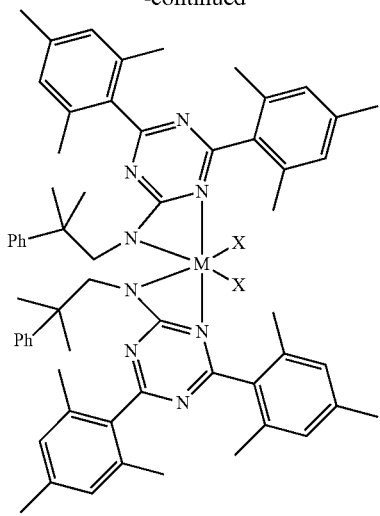
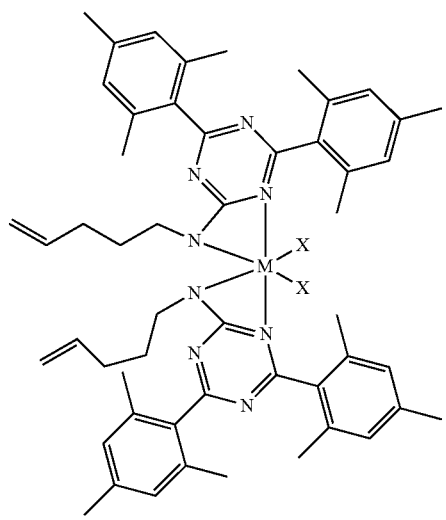
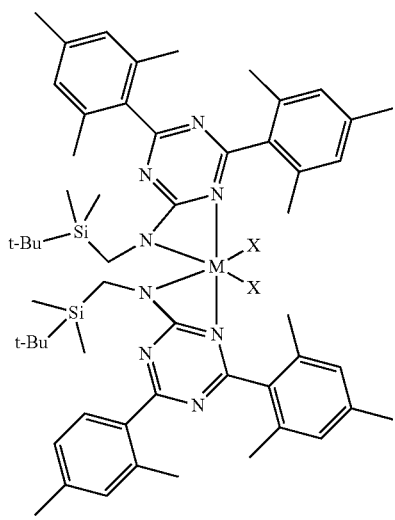
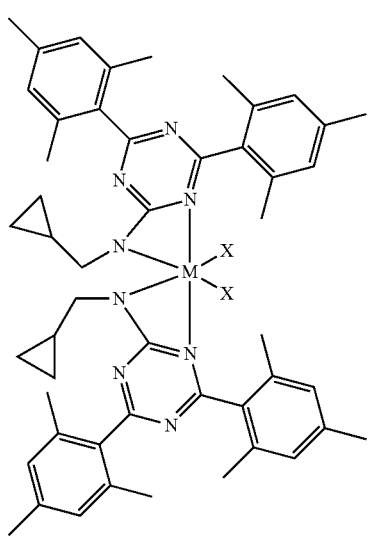
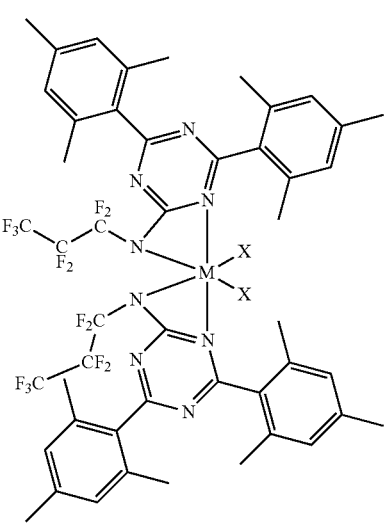

81
-continued
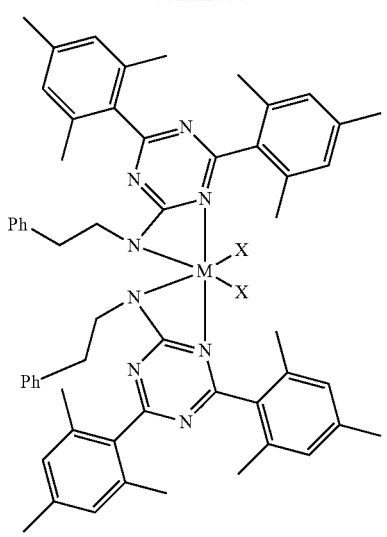
82
-continued
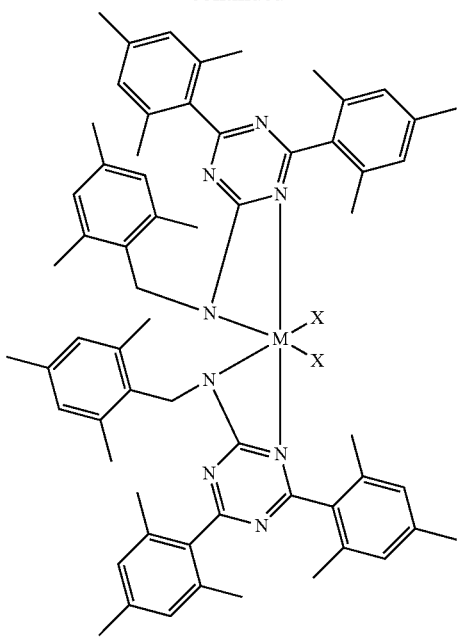
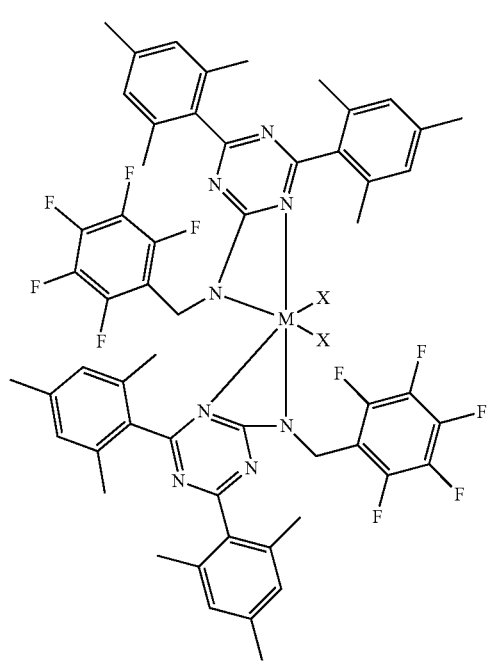
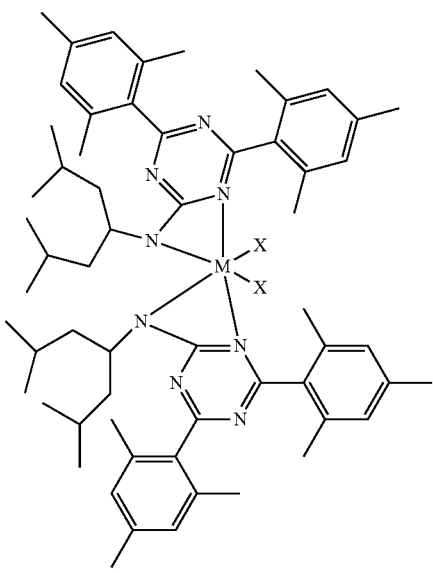

83
-continued
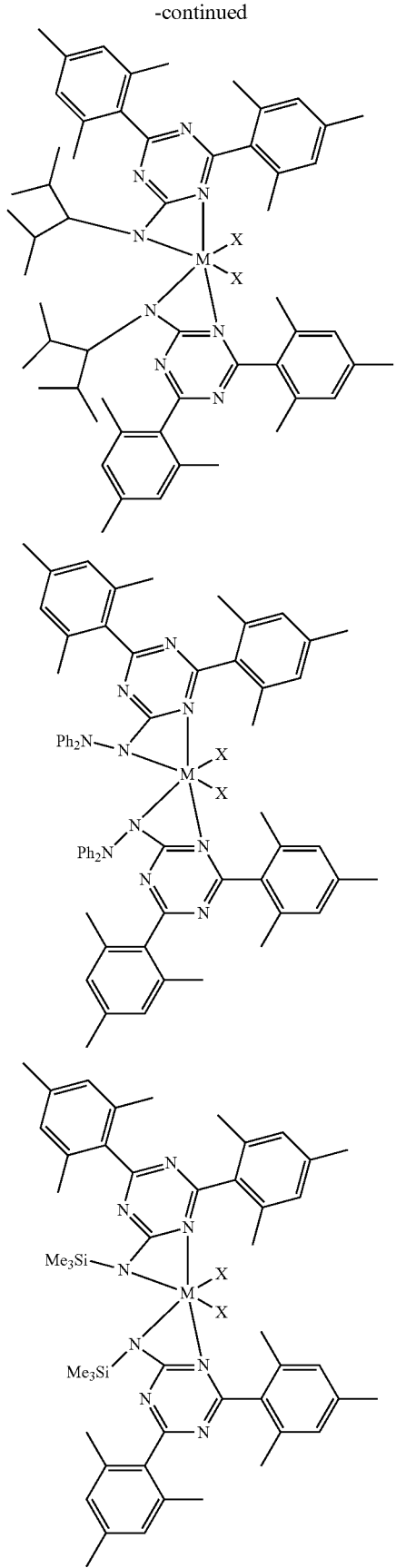
84
Additional structures exemplifying metal-ligand complexes described by Formula (I) are shown below:
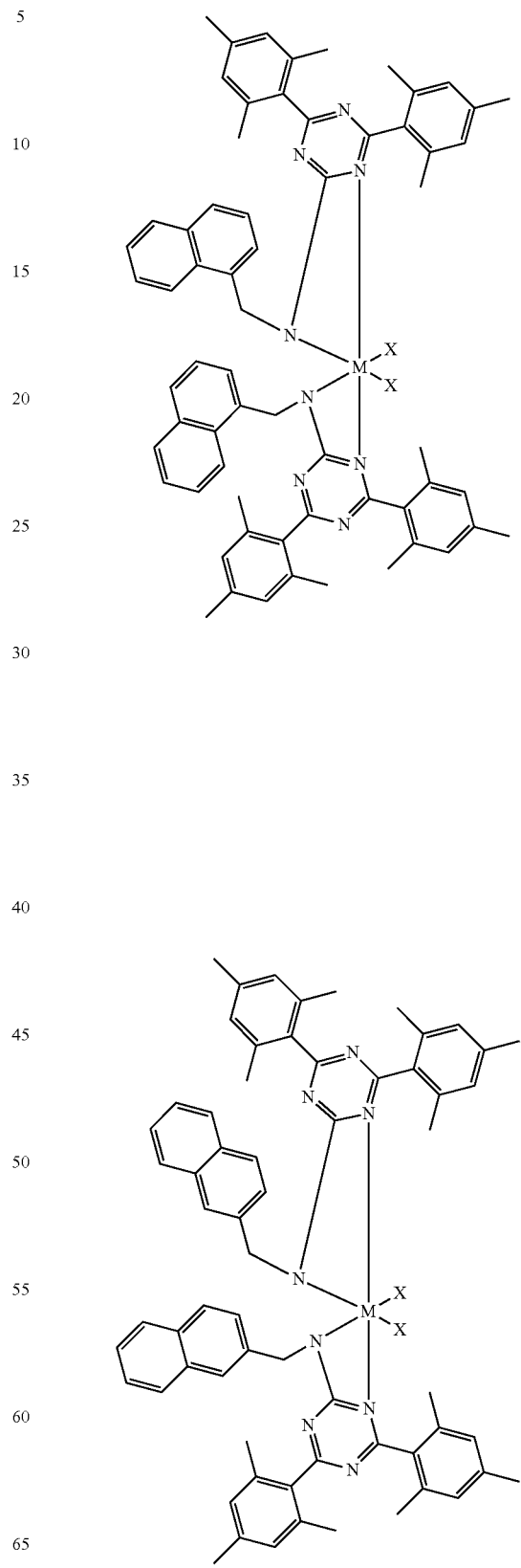

85
-continued
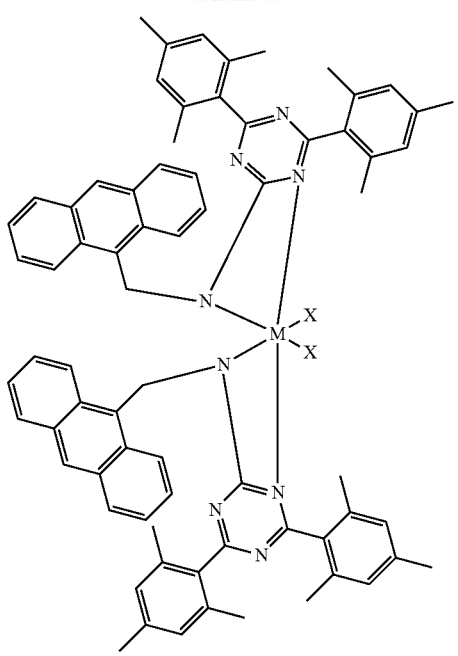
86
-continued
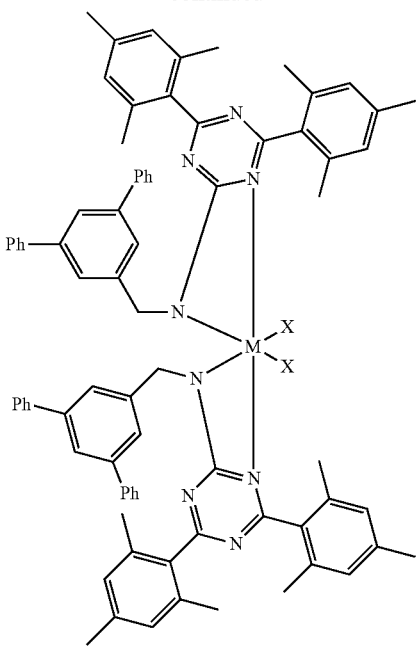
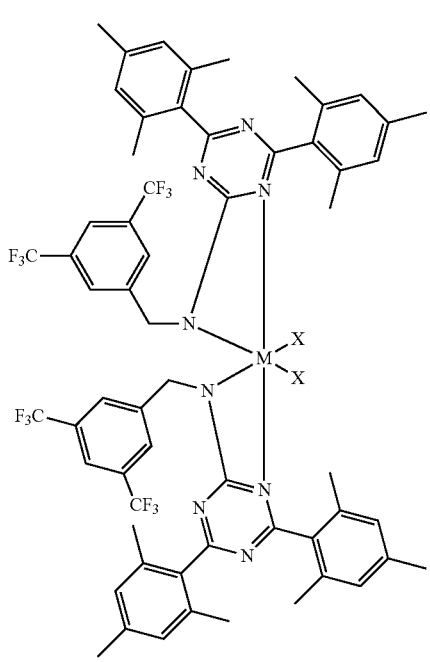
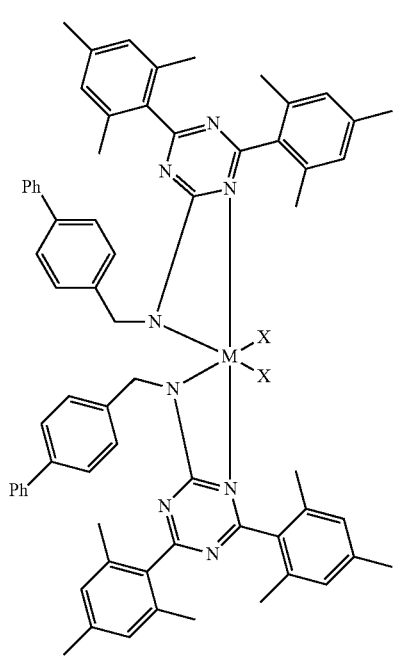

87
-continued
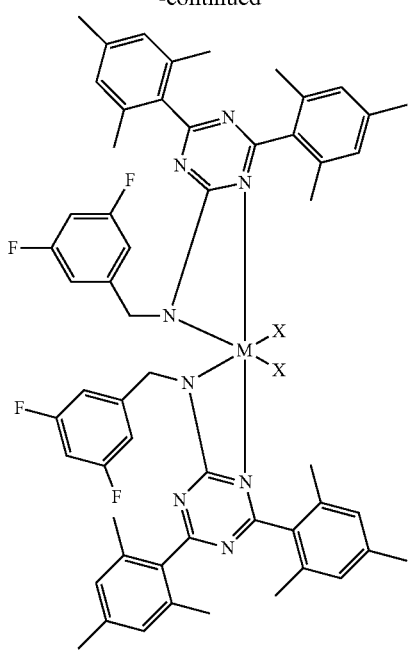
88
-continued
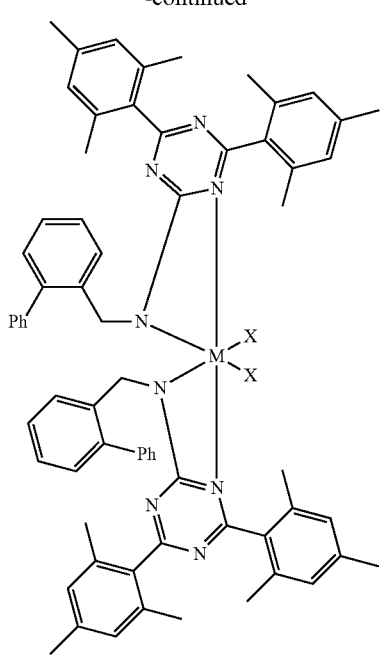
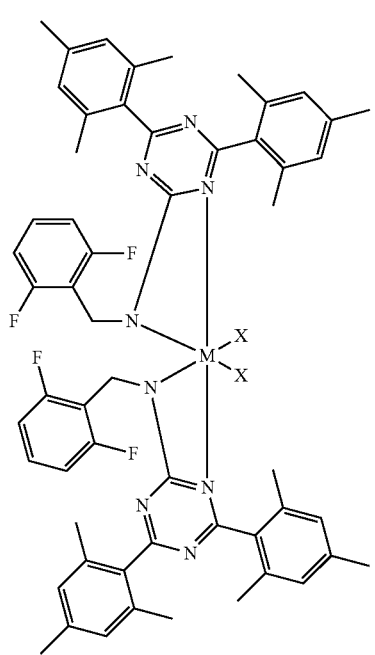
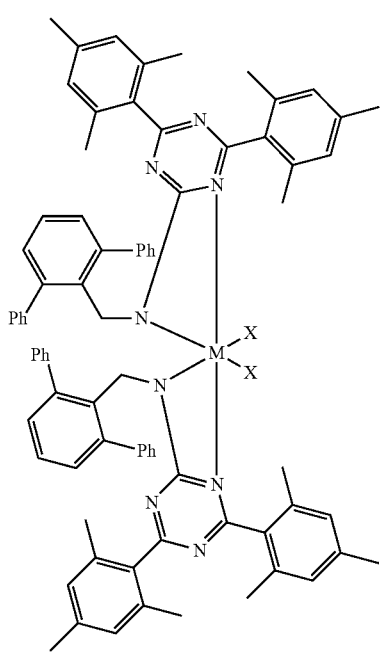

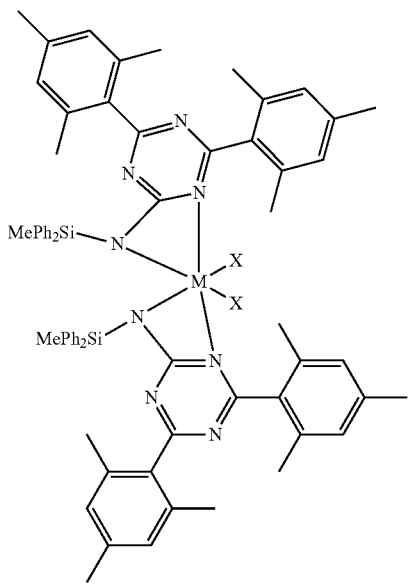
Additional structures exemplifying metal-ligand complexes described by Formula (I) are shown below:
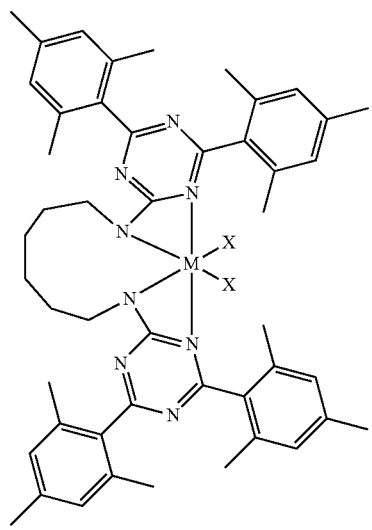
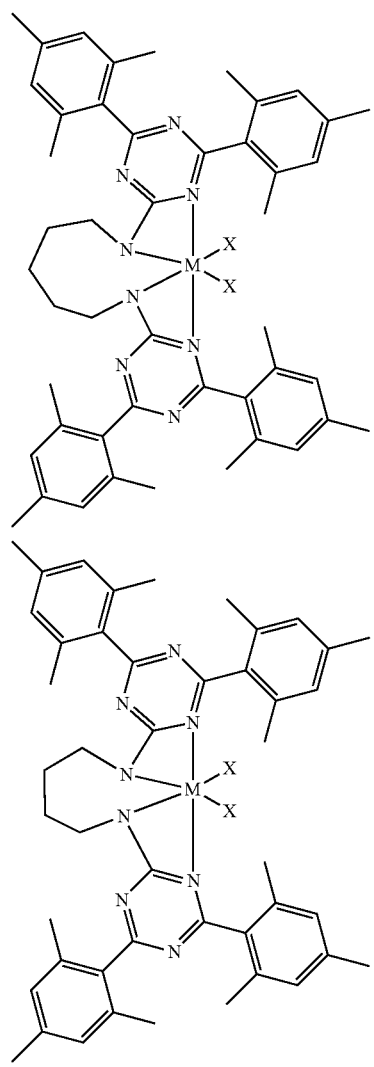
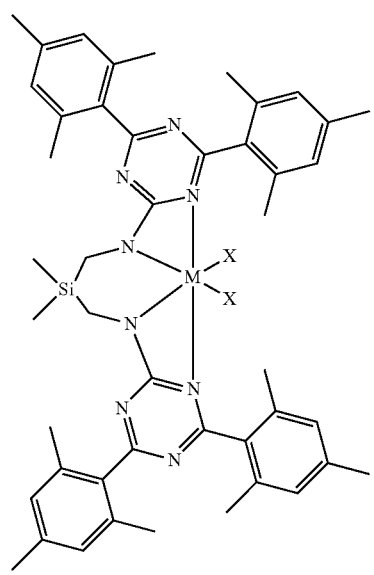

91
-continued
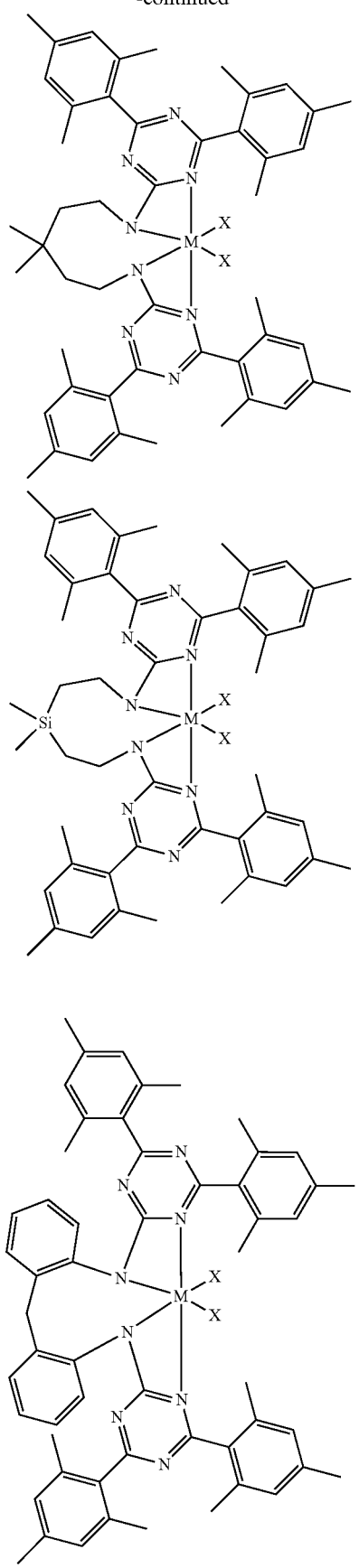
92
-continued
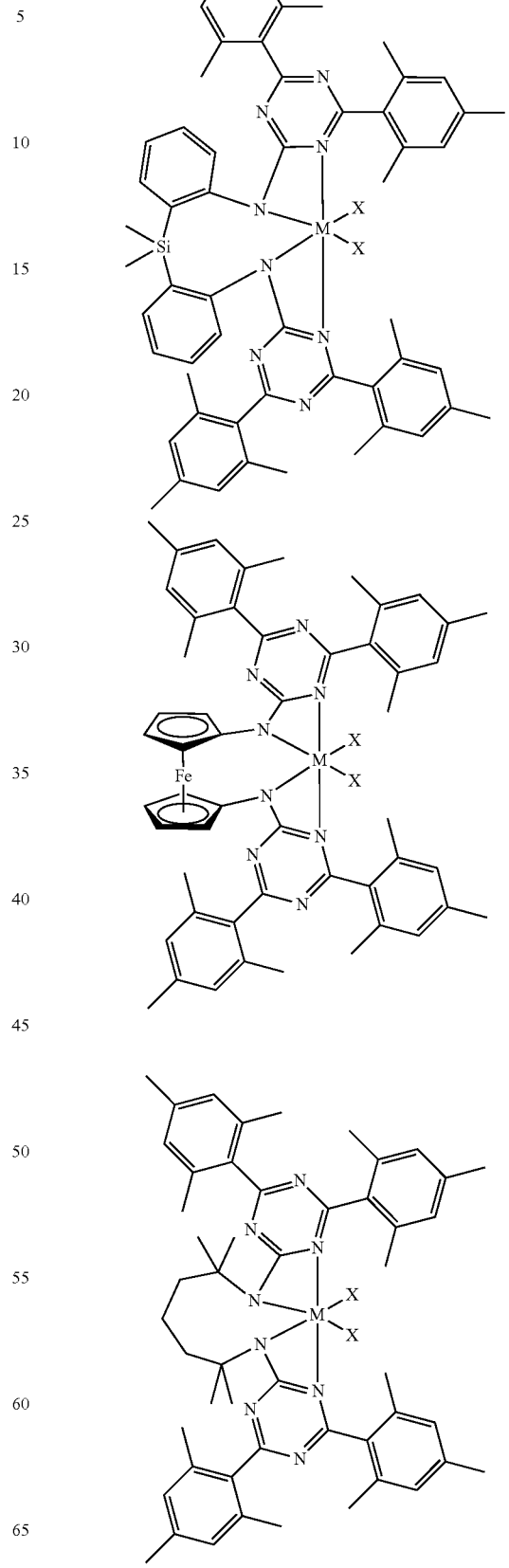

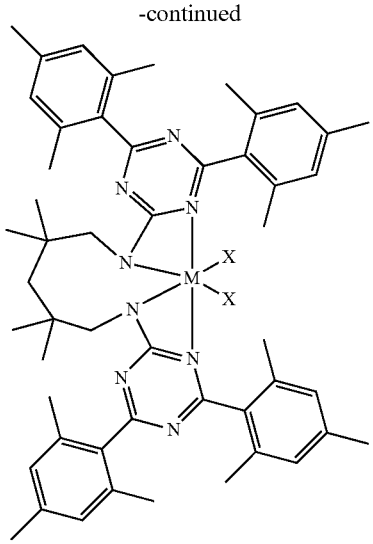
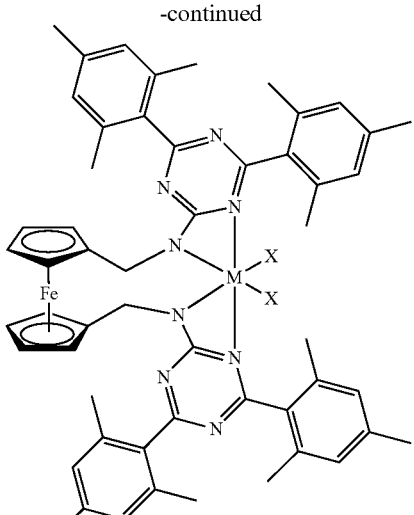
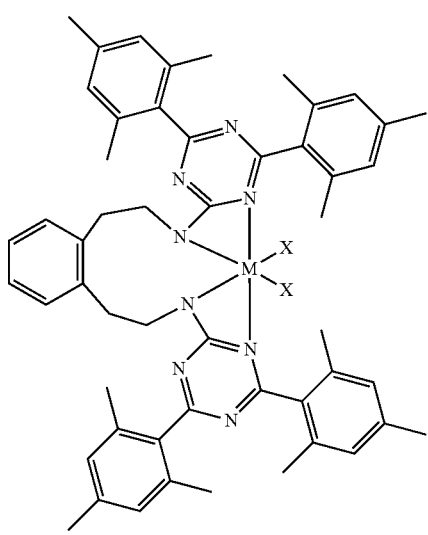
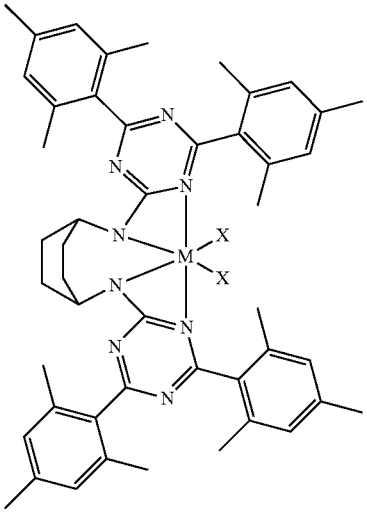
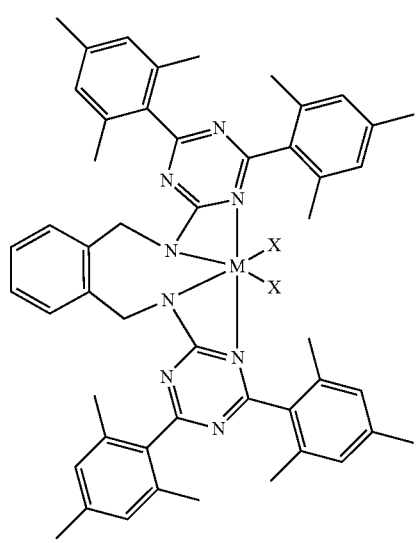
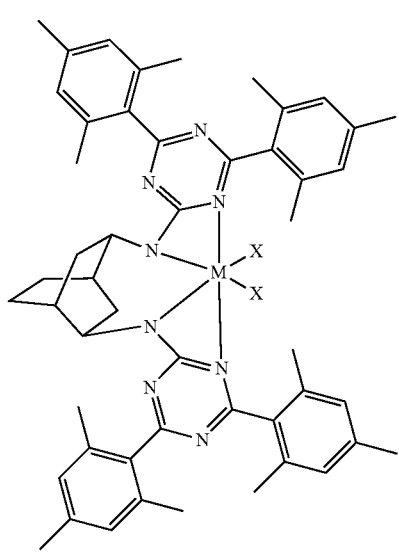
Additional structures exemplifying metal-ligand complexes described by Formula (I) are shown below:

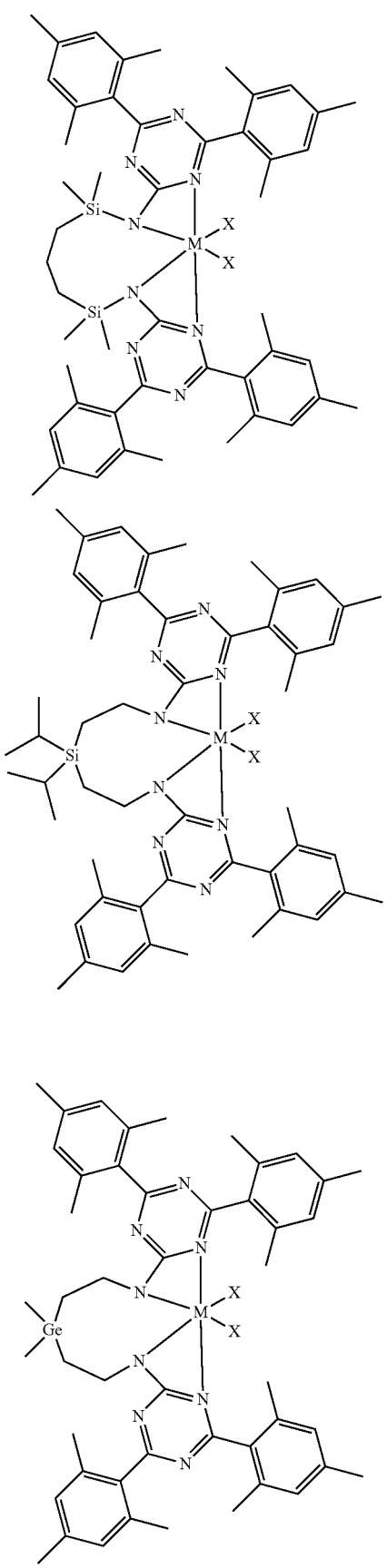
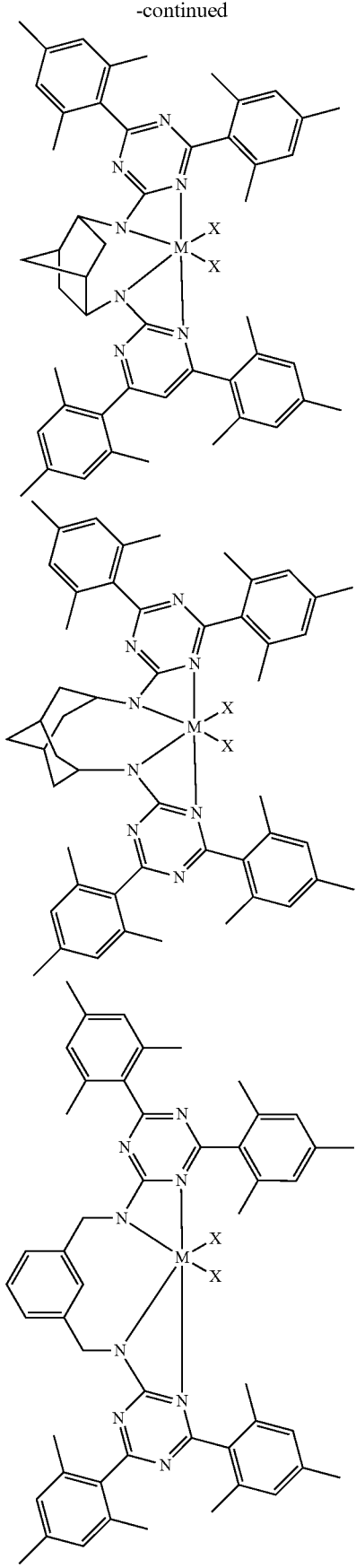

97
-continued
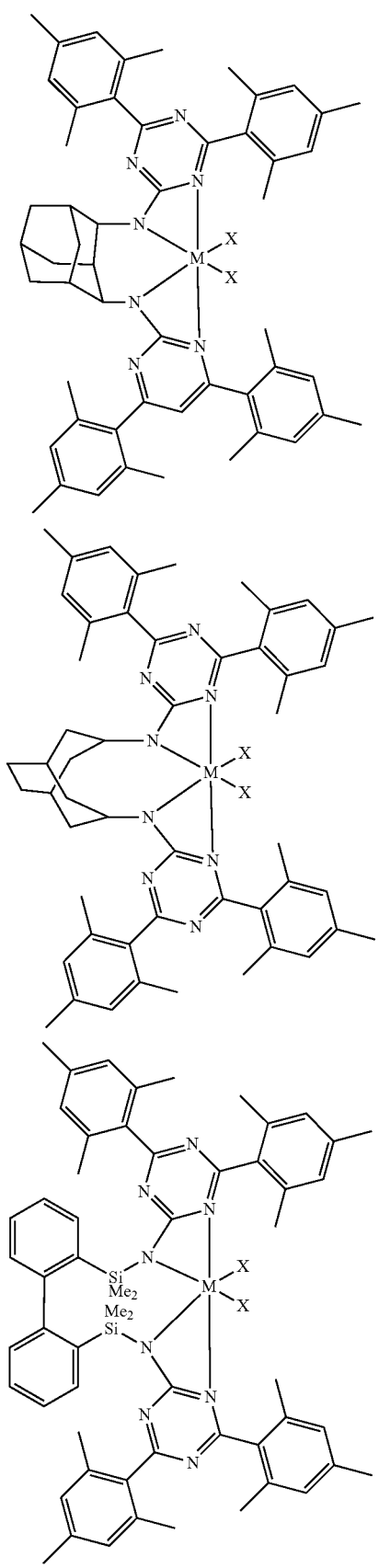
98
-continued
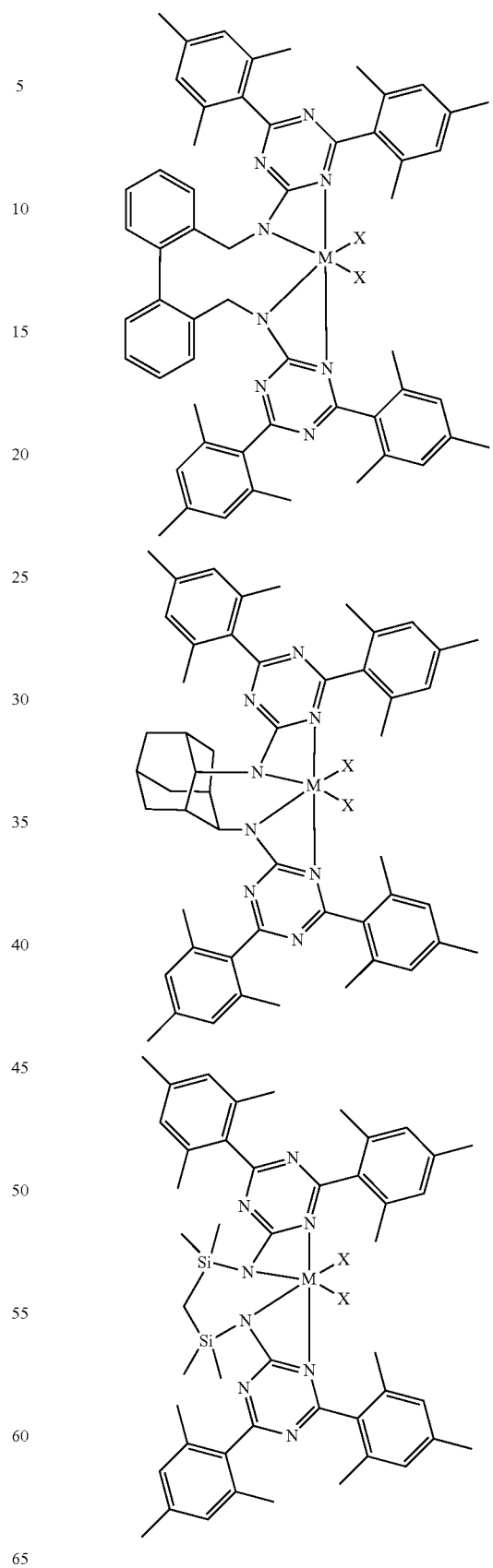

In embodiments, the disclosed catalyst systems provide an olefin-based composition comprising the polymerization reaction product of one or more olefin monomers in the presence of the olefin polymerization catalyst system, as described above.

In embodiments, the disclosure further provides an olefin polymerization process comprising polymerizing one or more olefin monomers in the presence of the olefin polymerization catalyst, as described above.

Co-Catalyst Component

The procatalyst comprising the metal-ligand complex of Formula (I) is rendered catalytically active by contacting it to, or combining it with, the activating co-catalyst or by using an activating technique such as those that are known in the art. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(($C_1$-$C_{10}$)alkyl)aluminum or tri(($C_6$-$C_{18}$)aryl)boron compounds and halogenated (including perhalogenated) derivatives thereof. In some other embodiments, exemplary Group 13 metal compounds are tris (fluoro-substituted phenyl)boranes, in other embodiments, tris(pentafluorophenyl)borane. In some embodiments, the activating co-catalyst is a tris(($C_1$-$C_{20}$)hydrocarbyl)methane borate (e.g., trityl tetrakis(pentafluorophenyl)borate) or a tri(($C_1$-$C_{20}$)hydrocarbyl)ammonium tetra(($C_1$-$C_{20}$)hydrocarbyl)borate (e.g., bis(octadecyl)methylammonium tetrakis (pentafluorophenyl)borate). As used herein, the term "ammonium" means a nitrogen cation that is a (($C_1$-$C_{20}$) hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2$$^+$, ($C_1$-$C_{20}$)hydrocarbylN(H)$_3$$^+$, or N(H)$_4$$^+$, wherein each ($C_1$-$C_{20}$)hydrocarbyl may be the same or different.

Exemplary combinations of neutral Lewis acid activating co-catalysts include mixtures comprising a combination of a tri(($C_1$-$C_4$)alkyl)aluminum and a halogenated tri(($C_6$-$C_{18}$) aryl)boron compound, especially a tris(pentafluorophenyl) borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane):(alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst comprising the metal-ligand complex of Formula (I) may be activated to form an active catalyst composition by combination with one or more cocatalyst such as a cation forming cocatalyst, a strong Lewis acid, or a combination thereof. Suitable cocatalysts for use include polymeric or oligomeric aluminoxanes, especially methyl aluminoxane, as well as inert, compatible, non-coordinating, ion forming compounds. Exemplary suitable cocatalysts include, but are not limited to modified methyl aluminoxane (MMAO); bis(hydrogenated tallow alkyl)methylammonium tetrakis(pentafluorophenyl)borate; triethyl aluminum (TEA); and any combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl) borane, or an ammonium borate with an oligomeric or polymeric alumoxane compound.

The ratio of total number of moles of one or more metal-ligand complexes of Formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of Formula (I). When tris (pentafluorophenyl)borane alone is used as the activating co-catalyst, in some other embodiments, the number of moles of the tris(pentafluorophenyl)borane that are employed to the total number of moles of one or more metal-ligand complexes of Formula (I) form 1:0.5 to 1:10, in some other embodiments, from 1:1 to 1:6, in some other embodiments, from 1:1 to 1:5. The remaining activating co-catalysts are generally employed in approximately mole quantities equal to the total mole quantities of one or more metal-ligand complexes of Formula (I).

Polyolefin Compositions

Embodiments of the present disclosure additionally relate to olefin-based compositions comprising the polymerization reaction product of one or more olefin monomers in the presence of the olefin polymerization catalyst system, which may be in accordance with any of the embodiments previously described.

The polyolefin composition according to the present disclosure may comprise the reaction product of one or more olefinic monomers with the olefin polymerization catalyst system according to the present disclosure under polymerization conditions and in the presence of one or more co-catalysts and/or scavengers.

The polyolefin composition according to the present disclosure may, for example, be an ethylene-based polymer, for example homopolymers and/or interpolymers (including copolymers) of ethylene and optionally one or more comonomers such as α-olefins. Such ethylene-based polymers can have a density in the range of 0.860 to 0.973 g/cm$^3$. All individual values and subranges from 0.860 to 0.973 g/cm$^3$ are included herein and disclosed herein; for example, the density can be from a lower limit of 0.860, 0.880, 0.885, 0.900, 0.905, 0.910, 0.915, or 0.920 g/cm$^3$ to an upper limit of 0.973, 0.963, 0.960, 0.955, 0.950, 0.925, 0.920, 0.915, 0.910, or 0.905 g/cm$^3$.

As used herein, the term "ethylene-based polymer" means a polymer having greater than 50 mol % units derived from ethylene monomer.

In one embodiment, the ethylene-based polymers can have a long chain branching frequency in the range of from 0.0 to 3 long chain branches (LCB) per 1000 carbon atoms. In one embodiment, the ethylene-based polymers can have a molecular weight distribution ($M_w/M_n$) (measured according to the conventional gel permeation chromatography "GPC" method) in the range of from greater than or equal to 2.0. All individual values and subranges from greater than or equal to 2 are included herein and disclosed herein; for example, the ethylene/α-olefin copolymer may have a molecular weight distribution ($M_w/M_n$) in the range of from 2 to 20; or in the alternative, the ethylene/α-olefin interpolymer may have a molecular weight distribution ($M_w/M_n$) in the range of from 2 to 5.

In another embodiment, the ethylene-based polymers may have molecular weight distribution, $M_w/M_n$, of less than 2, e.g., when chain transfer agents are used in the polymerization. All individual values and subranges less than 2 are included and disclosed herein. For example, the $M_w/M_n$ of the ethylene-based polymers may be less than 2, or in the alternative, less than 1.9, or in the alternative, less than 1.8, or in the alternative, less than 1.5. In a particular embodiment, the ethylene-based polymer has a molecular weight distribution from 0.5 to 2.

In one embodiment, the ethylene-based polymers can have a molecular weight ($M_w$) in the range of from equal to or greater than 20,000 g/mole, for example, in the range of from 20,000 to 1,000,000 g/mole, or in the alternative, from 20,000 to 350,000 g/mole, or in the alternative, from 100,000 to 750,000 g/mole.

In one embodiment, the ethylene-based polymers can have a melt index ($I_2$) in the range of 0.02 to 200 g/10 minutes. All individual values and subranges from 0.02 to 200 g/10 minutes are included herein and disclosed herein; for example, the melt index ($I_2$) can be from a lower limit of 0.1, 0.2, 0.5, 0.6, 0.8, 1, 1.5, 2.0, 2.5, 3.0, 3.5, 4.0, 4.5, 5.0, 10, 15, 20, 30, 40, 50, 60, 80, 90, 100, or 150 g/10 minutes, to an upper limit of 0.9, 1, 1.5, 2.0, 2.5, 3.0, 3.5, 4.0, 4.5, 5.0, 10, 15, 20, 30, 40, 50, 60, 80, 90, 100, 150, or 200 g/10 minutes.

In one embodiment, the ethylene-based polymers can have a melt flow ratio ($I_{10}/I_2$) in the range of from 5 to 30. All individual values and subranges from 5 to 30 are included herein and disclosed herein; for example, the melt flow ratio ($I_{10}/I_2$) can be from a lower limit of 5, 5.5, 6, 6.5, 8, 10, 12, 15, 20, or 25 to an upper limit of 5.5, 6, 6.5, 8, 10, 12, 15, 20, 25, or 30.

The ethylene-based polymers may comprise less than 50 mole percent of units derived from one or more α-olefin comonomers. All individual values and subranges from less than 50 mole percent are included herein and disclosed herein; for example, the ethylene-based polymers may comprise from less than 30 mole percent of units derived from one or more α-olefin comonomers; or in the alternative, less than 20 mole percent of units derived from one or more α-olefin comonomers; or in the alternative, from 1 to 20 mole percent of units derived from one or more α-olefin comonomers; or in the alternative, from 1 to 10 mole percent of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene-based polymers may comprise greater than 50 mole percent of units derived from ethylene. All individual values and subranges from greater than 50 mole percent are included herein and disclosed herein; for example, the ethylene-based polymers may comprise at least 52 mole percent of units derived from ethylene; or in the alternative, at least 65 percent by weight of units derived from ethylene; or in the alternative, at least 85 mole percent of units derived from ethylene; or in the alternative, from 50 to 100 mole percent of units derived from ethylene; or in the alternative, from 80 to 100 mole percent of units derived from ethylene.

In one embodiment, the ethylene-based polymer comprises an olefin block copolymer prepared according to an aforementioned chain-shuttling polymerization process. The olefin block copolymer or poly(ethylene α-olefin) block copolymer comprises an ethylene-derived hard segment (i.e., polyethylene hard segment) and a soft segment comprising residuals from the α-olefin and ethylene. The residuals of the α-olefin and ethylene typically are approximately randomly distributed in the soft segment. Preferably, the polyethylene hard segment is characterizable as having less than 5 mole percent (mol %) of a residual of the α-olefin covalently incorporated therein. Preferably, the poly(ethylene α-olefin) block copolymer is characterizable as having a melting temperature of greater than 100 degrees Celsius, and more preferably greater than 120° C., as determined by Differential Scanning Calorimetry using the procedure described later. The poly(ethylene α-olefin) block copolymers comprise ethylene residuals and one or more copolymerizable α-olefin comonomer residuals (i.e., ethylene and one or more copolymerizable α-olefin comonomers in polymerized form). The poly(ethylene α-olefin) block copolymers are characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and "copolymer" are used interchangeably herein. In some embodiments, the multi-block copolymer can be represented by the following formula: (AB)n, where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion.

"Hard" segments refer to blocks of polymerized units in which ethylene residuals are present in an amount greater than 95 weight percent, and preferably greater than 98 weight percent in the poly(ethylene α-olefin) block copolymers. In other words, the comonomer (i.e., α-olefin) residuals content in the hard segments is less than 5 weight percent, and preferably less than 2 weight percent. In some embodiments, the hard segments comprise all or substantially all ethylene residuals. The phrases "polyethylene hard segment" and "ethylene-derived hard segment" are synonymous and mean the hard segment portion of a poly(ethylene α-olefin) block copolymer.

"Soft" segments refer to blocks of polymerized units in which the comonomer (i.e., α-olefin) residuals content is greater than 5 weight percent, preferably greater than 8 weight percent, greater than 10 weight percent, or greater than 15 weight percent in the poly(ethylene α-olefin) block copolymers. In some embodiments, the comonomer residuals content in the soft segments can be greater than 20 weight percent, greater than 25 eight percent, greater than 30 weight percent, greater than 35 weight percent, greater than 40 weight percent, greater than 45 weight percent, greater than 50 weight percent, or greater than 60 weight percent.

Polymerization Process

Any conventional polymerization processes may be employed to produce the polyolefin composition according to the present disclosure. Such conventional polymerization processes include, but are not limited to, solution polymerization process, particle forming polymerization process, and combinations thereof using one or more conventional reactors e.g. loop reactors, isothermal reactors, fluidized bed reactors, stirred tank reactors, batch reactors in parallel, series, and/or any combinations thereof.

In one embodiment, the polyolefin composition according to the present disclosure may, for example, be produced via solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 120 to 300° C.; for example, from 160 to 215° C., and at pressures in the range of from 300 to 1500 psi; for example, from 400 to 750 psi. The residence time in solution phase polymerization process is typically in the range of from 2 to 30 minutes; for example, from 5 to 15 minutes. Ethylene, one or more solvents, one or more high temperature olefin polymerization catalyst systems, one or more co-catalysts and/or scavengers, and optionally one or more comonomers are fed continuously to the one or more reactors. Exemplary solvents include, but are not limited to, isoparaffins. For example, such solvents are commercially available under the name ISOPAR® E from ExxonMobil Chemical Co., Houston, Tex. The resultant mixture of the ethylene-based polymer and solvent is then removed from the reactor and the ethylene-based polymer is isolated. Solvent is typically recovered via a solvent recovery unit, i.e. heat exchangers and vapor liquid separator drum, and is then recycled back into the polymerization system.

In embodiment, the ethylene-based polymer may be produced via solution polymerization in a single reactor system, for example a single loop reactor system, wherein ethylene and optionally one or more α-olefins are polymerized in the presence of one or more high temperature olefin polymerization catalyst systems, optionally one or more other catalysts, and optionally one or more co-catalysts. In one embodiment, the ethylene-based polymer may be produced via solution polymerization in a dual reactor system, for example a dual loop reactor system, wherein ethylene and optionally one or more α-olefins are polymerized in the presence of one or more an olefin polymerization catalyst systems, optionally one or more other catalysts, and optionally one or more co-catalysts. In one embodiment, the ethylene-based polymer may be produced via solution polymerization in a dual reactor system, for example a dual loop reactor system, wherein ethylene and optionally one or more α-olefins are polymerized in the presence of one or more high temperature olefin polymerization catalyst systems, as described herein, in both reactors.

In one embodiment, the ethylene-based polymer may be made using a gas phase polymerization process, e.g., utilizing a fluidized bed reactor. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

A polymerization process may be effected as a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may optionally be removed in a cyclone and/or fine filter. The gas is passed through a heat exchanger wherein the heat of polymerization is removed, compressed in a compressor and then returned to the reaction zone.

The reactor temperature of the fluid bed process herein preferably ranges from 30° C. or 40° C. or 50° C. to 90° C. or 100° C. or 110° C. or 120° C. In general, the reactor temperature is operated at the highest temperature that is feasible taking into account the sintering temperature of the polymer product within the reactor. In the fluid bed polymerization process, the polymerization temperature, or reaction temperature should be below the melting or "sintering" temperature of the polymer to be formed. Thus, the upper temperature limit in one embodiment is the melting temperature of the polyolefin produced in the reactor.

A slurry polymerization process can also be used. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

Also useful is particle form polymerization, a process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and Metallocene-Based Polyolefins Vol. 2 pp. 322-332 (2000), the disclosures of which are incorporated herein by reference.

In one embodiment, the procatalyst comprising the metal-ligand complex of Formula (I) may be combined with one or more additional catalysts in a polymerization process. Suitable catalysts for use include any compound or combination of compounds that is adapted for preparing polymers of the desired composition or type. Both heterogeneous and homogeneous catalysts may be employed. Examples of heterogeneous catalysts include the well-known Ziegler-Natta compositions, especially Group 4 metal halides supported on Group 2 metal halides or mixed halides and alkoxides and the well-known chromium or vanadium based catalysts. Preferably however, for ease of use and for production of narrow molecular weight polymer segments in solution, the catalysts for use herein are homogeneous catalysts comprising a relatively pure organometallic compound or metal complex, especially compounds or complexes based oil metals selected from Groups 3-10 or the Lanthanide series of the Periodic Table of the Elements. It is preferred that any catalyst employed herein, not significantly detrimentally affect the performance of the other catalyst under the conditions of the present polymerization. Desirably, no catalyst is reduced in activity by greater than 25 percent, more preferably greater than 10 percent under the conditions of the present polymerization.

In one embodiment, the procatalyst comprising the metal-ligand complex of Formula (I) may be combined with one or more additional catalysts and a chain shuttling agent in a chain-shuttling polymerization process to prepare the aforementioned olefin block copolymer. Suitable catalysts for use include any compound or combination of compounds that is adapted for preparing polymers of the desired composition or type and are capable of chain shuttling. Nonlimiting examples of such catalysts include:

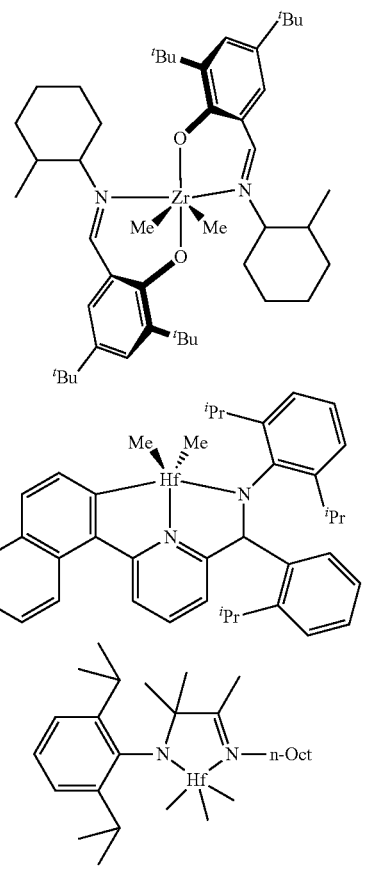

Nonlimiting examples of chain shuttling agents include dialkylzinc reagents and trialkylaluminum reagents.

The procatalyst comprising the metal-ligand complex of Formula (I) may be activated to form an active catalyst composition by combination with one or more co-catalysts, as described above.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers according to embodiments may contain any amounts of additives. The ethylene-based polymers may compromise from about 0 to about 10 percent by the combined weight of such additives, based on the weight of the ethylene-based polymers and the one or more additives. The ethylene-based polymers may further compromise fillers, which may include, but are not limited to, organic or inorganic fillers. Such fillers, e.g. calcium carbonate, talc, $Mg(OH)_2$, can be present in levels from about 0 to about 20 percent, based on the weight of the ethylene-based polymers and the one or more additives and/or fillers. The ethylene-based polymers may further be blended with one or more polymers to form a blend.

EXAMPLES

The following examples illustrate embodiments of the present disclosure but are not intended to limit the scope of the claims. The examples of the instant disclosure demonstrate that the olefin polymerization catalyst systems according to the present disclosure possess improved properties facilitating the production of high molecular weight ($M_w$) polyolefins with narrow polydispersities and especially low octene incorporation.
Procatalyst Components
Comparative Procatalyst $C_1$ has the following structure:
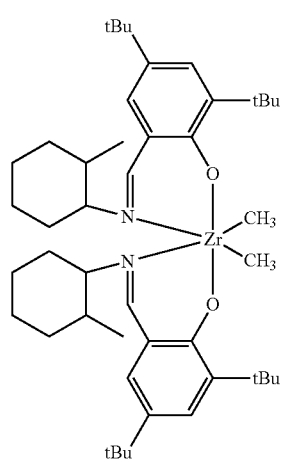
C1
Procatalysts 1-7 have the following structures:
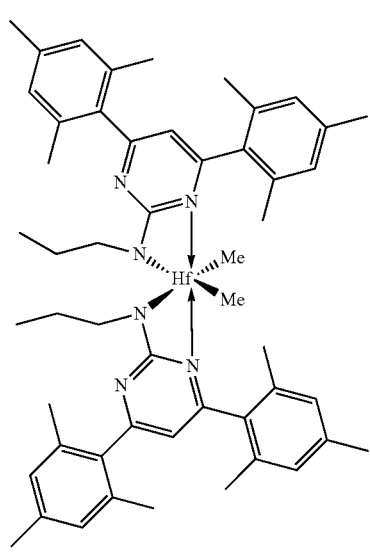
1
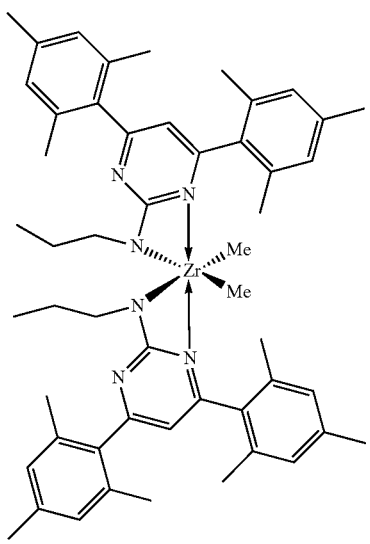
2
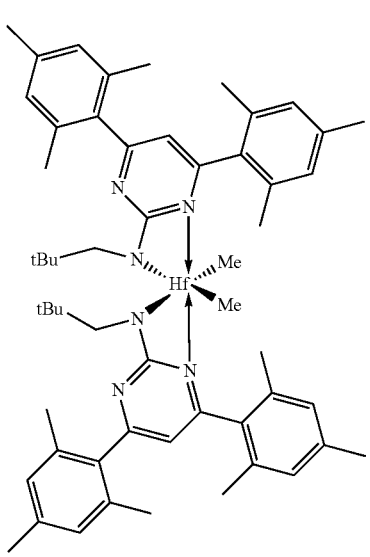
3

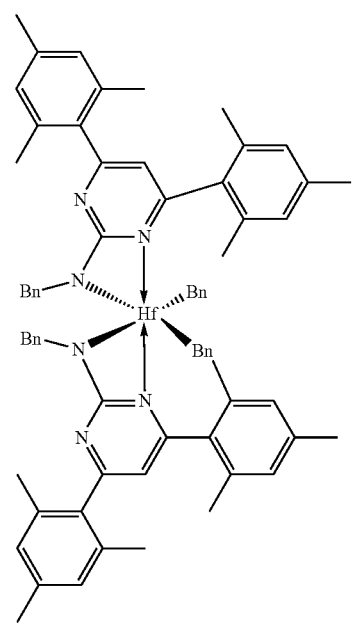

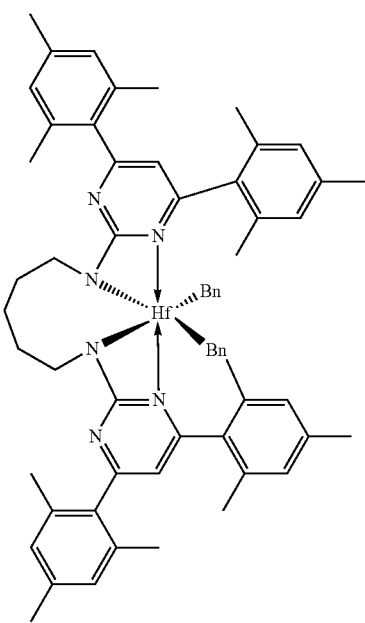

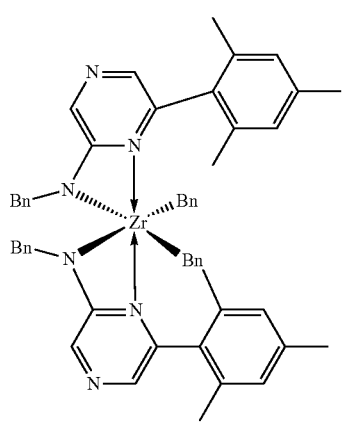

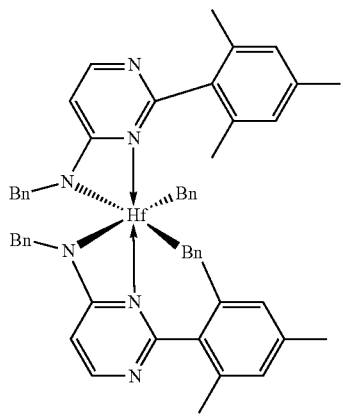

Synthesis of Procatalyst 1

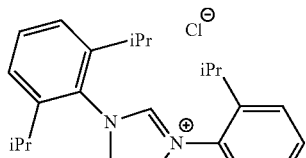

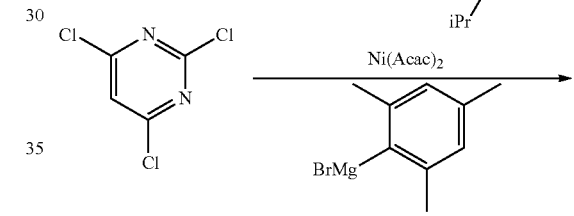

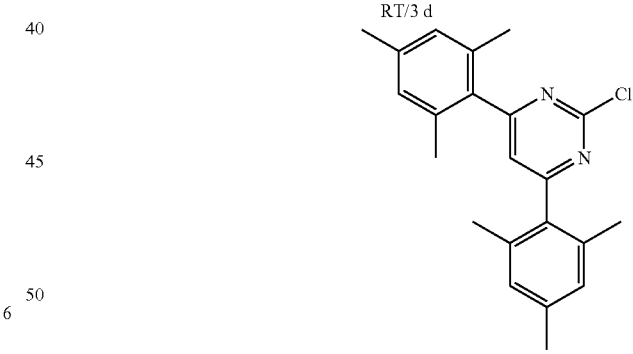

A 40 mL vial was charged with trichloropyrimidine (1.00 g, 5.51 mmol), nickel acetylacetonate (0.042 g, 0.17 mmol), 2,6-diisopropylphenyl imidazolium chloride (0.070 g, 0.17 mmol), and anhydrous THF (15 mL). Under nitrogen, MesMgBr (1M in THF, 11.3 mL, 11.3 mmol) was slowly added dropwise and allowed to stir at room temperature overnight. All volatiles were removed, then water and $CH_2Cl_2$ were added and the organic layer was extracted. All volatiles were removed again and the crude product was purified by column chromatography (90:10 hexanes: EtOAc). Yield: 1.65 g, 85%. $^1$H NMR (400 MHz, $CDCl_3$) δ 7.13-7.10 (s, 1H), 6.94 (s, 4H), 2.31 (s, 6H), 2.11 (s, 12H). $^{13}$C NMR (101 MHz, $CDCl_3$) δ 171.00, 138.87, 135.03, 134.20, 128.66, 121.95, 121.04, 21.11, 20.10.

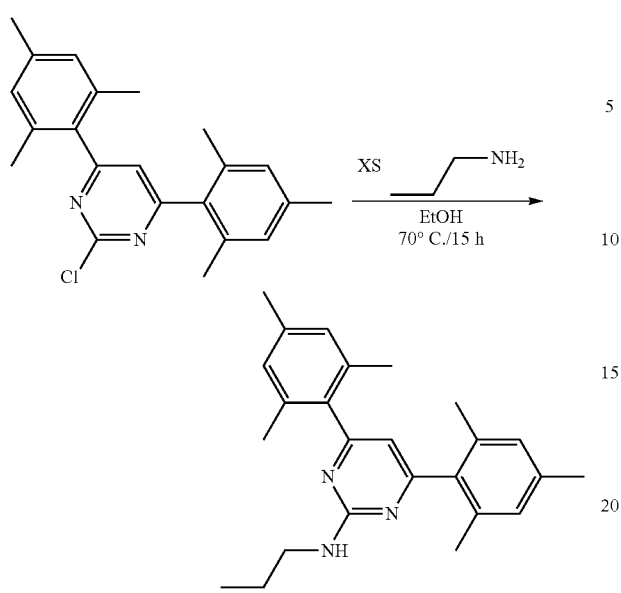

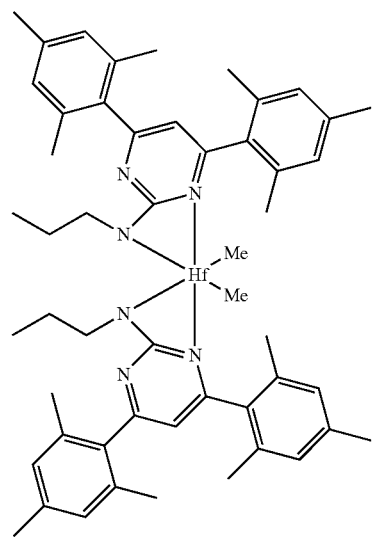

A 40 mL vial was charged with the 2-chloro-4,6-dimesitylpyrimidine (0.500 g, 1.42 mmol), excess n-propylamine (1.17 mL, 14.3 mmol), and ethanol (12 mL). The mixture was heated to 70° C. overnight. A precipitate formed upon cooling and was collected as the pure product. Yield: 0.53 g, 63%. $^1$H NMR (400 MHz, CDCl$_3$) δ 6.90 (s, 4H), 6.38 (s, 1H), 5.24 (t, J=5.7 Hz, 1H), 3.46-3.33 (m, 2H), 2.29 (s, 6H), 2.14 (s, 12H), 1.60 (h, J=7.3 Hz, 2H), 0.94 (t, J=7.4 Hz, 3H). $^{13}$C NMR (101 MHz, CDCl$_3$) δ 168.54, 162.96, 137.64, 134.98, 128.36, 112.03, 43.26, 22.99, 21.05, 19.95, 11.42.

General Procedure for Ligand Metallation

Inside the glovebox a vial was charged with HfCl$_4$ or ZrCl$_4$ (0.23 mmol) and toluene (5 mL). The solution was cooled to −30° C. then MeMgBr (0.35 mL, 3 M, 1.04 mmol) was added. The solution was allowed to stir for 2 min then a cold toluene (5 mL) suspension of the ligand (0.23 mmol) was added. The solution quickly changed to a yellow color and was allowed to stir at room temperature for 2 h. All volatiles were removed and the residue was triturated with hexanes. The residue was taken up in hexanes and filtered through a disposable frit. The yellow solution was evacuated to dryness, then dissolved in ether. The yellow solution was concentrated and cooled to −30° C. to give yellow crystals of the product.

Procatalyst 1 was prepared following the General Procedure for ligand metallation using HfCl$_4$, producing the desired complex in 63% yield. $^1$H NMR (400 MHz, C$_6$D$_6$) δ 6.77-6.71 (s, 4H), 6.71-6.65 (s, 4H), 5.70 (s, 2H), 3.23 (t, J=7.0 Hz, 4H), 2.23 (s, 12H), 2.06 (s, 24H), 1.66 (h, J=7.4 Hz, 4H), 0.92 (t, J=7.4 Hz, 6H), 0.51 (s, 6H). $^{13}$C NMR (101 MHz, C$_6$D$_6$) δ 173.75, 171.59, 165.85, 138.18, 137.76, 137.55, 134.94, 134.85, 134.64, 128.83, 128.50, 110.21, 55.47, 47.83, 24.69, 21.12, 21.08, 20.38, 20.06, 12.18.

Synthesis of Procatalyst 2

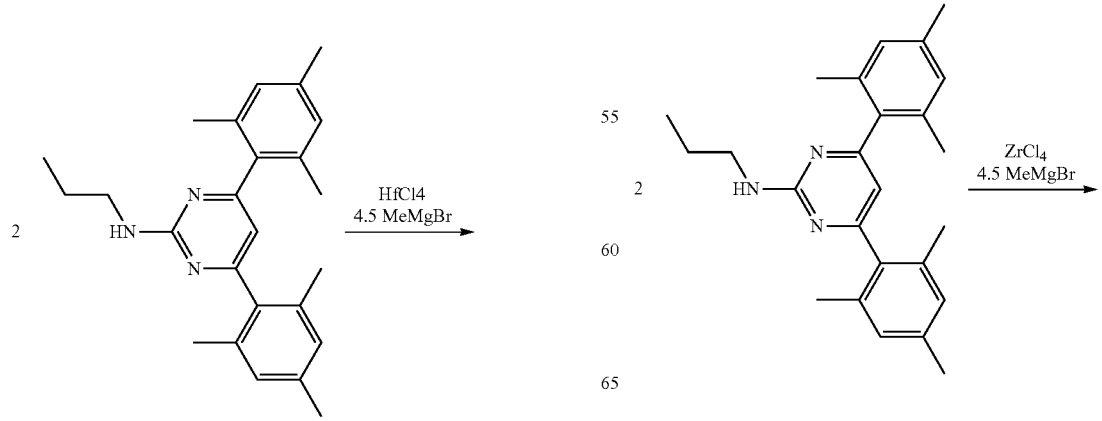

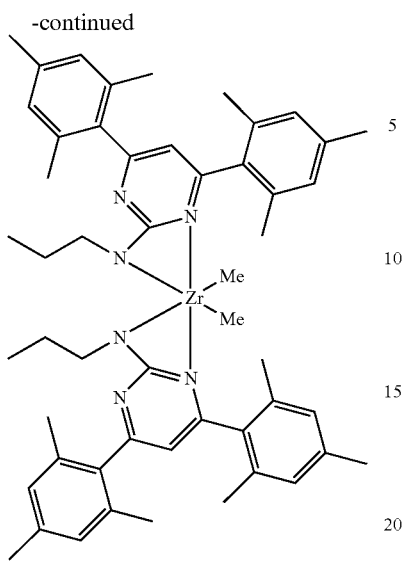

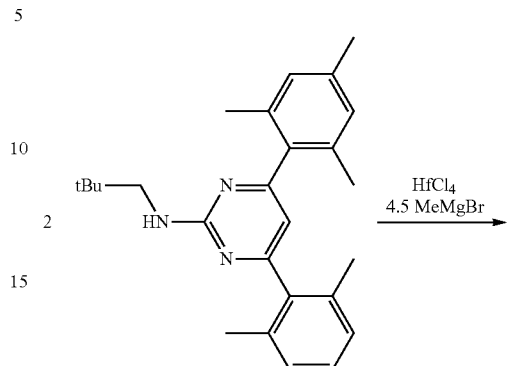

(s, 9H). $^{13}$C NMR (101 MHz, CDCl$_3$) δ 168.53, 163.45, 137.63, 134.95, 128.34, 111.85, 52.48, 32.05, 27.27, 21.05, 19.90.

Procatalyst 2 was prepared following the General Procedure for ligand metallation using ZrCl$_4$, producing the desired complex in 66% yield. $^1$H NMR (400 MHz, C$_6$D$_6$) δ 6.77-6.71 (m, 4H), 6.70-6.63 (m, 4H), 5.64 (s, 2H), 3.44 (dd, J=8.2, 6.7 Hz, 4H), 2.22 (s, 12H), 2.09 (d, J=3.9 Hz, 6H), 2.05 (s, 18H), 1.75 (hept, J=7.3, 6.8 Hz, 4H), 0.91 (t, J=7.4 Hz, 6H), 0.64 (s, 6H). $^{13}$C NMR (101 MHz, C$_6$D$_6$) δ 173.46, 171.93, 165.60, 137.66, 137.25, 137.16, 134.50, 134.45, 134.28, 128.34, 128.02, 109.76, 50.05, 48.25, 24.12, 20.71, 20.69, 19.83, 19.49, 11.79.

Synthesis of Procatalyst 3

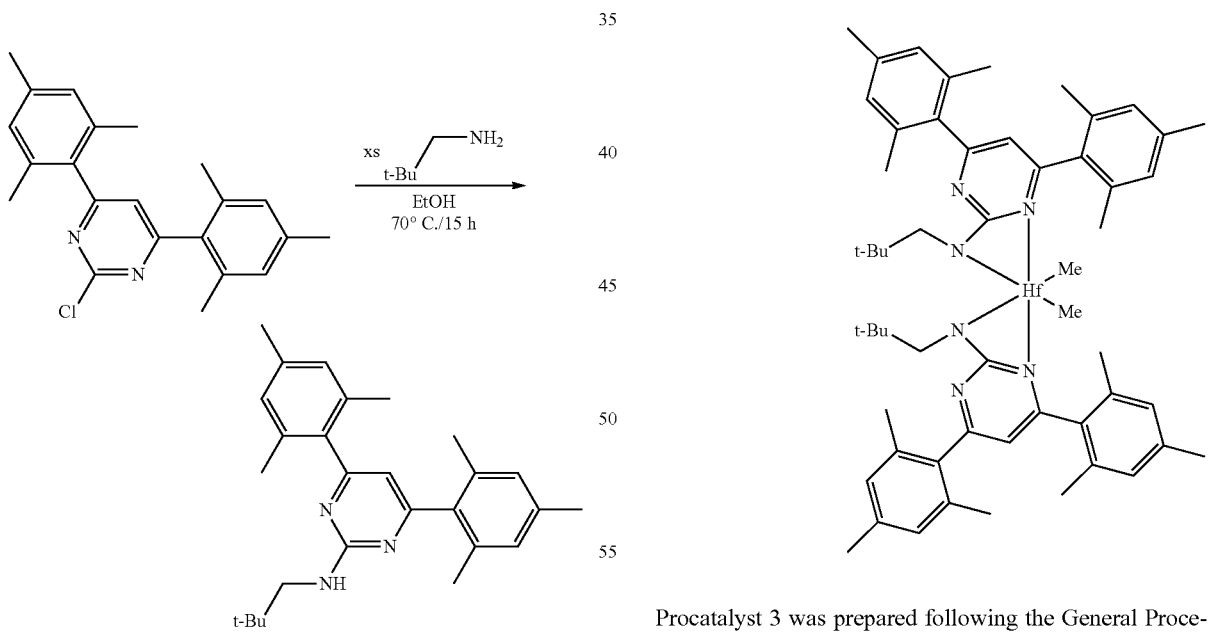

A 40 mL vial was charged with the 2-chloro-4,6-dimesitylpyrimidine (0.50 g, 1.43 mmol), excess neopentylamine (0.5 mL, 5.72 mmol), and ethanol (12 mL). The mixture was heated to 70° C. overnight. A precipitate formed upon cooling and was washed with cold ethanol to give the pure product. Yield: 0.42 g, 73%. $^1$H NMR (400 MHz CDCl$_3$) δ 6.90 (m, 4H), 6.35 (s, 1H), 5.25 (t, J=6.1 Hz, 1H), 3.32 (d, J=6.3 Hz, 2H), 2.29 (s, 6H), 2.13 (d, J=0.6 Hz, 12H), 0.93

Procatalyst 3 was prepared following the General Procedure for ligand metallation using HfCl$_4$, producing the desired complex in 100% yield. $^1$H NMR (400 MHz, C$_6$D$_6$) δ 6.73 (s, 4H), 6.68 (bs, 4H), 5.60 (s, 2H), 3.65 (m, 4H), 2.18 (s, 12H), 2.13-1.85 (m, 24H), 1.05 (s, 18H) 0.69-0.29 (bs, 6H). $^{13}$C NMR (101 MHz, C$_6$D$_6$) δ 173.50, 165.64, 138.09, 137.81, 137.65, 134.73, 134.66, 129.34, 128.65, 125.71, 110.10, 56.73, 35.00, 34.90, 34.16, 31.99, 28.88, 27.27, 25.66, 23.07, 21.45, 21.13, 21.11, 20.91, 20.21, 20.02, 14.37, 11.68.

Synthesis of Procatalyst 4

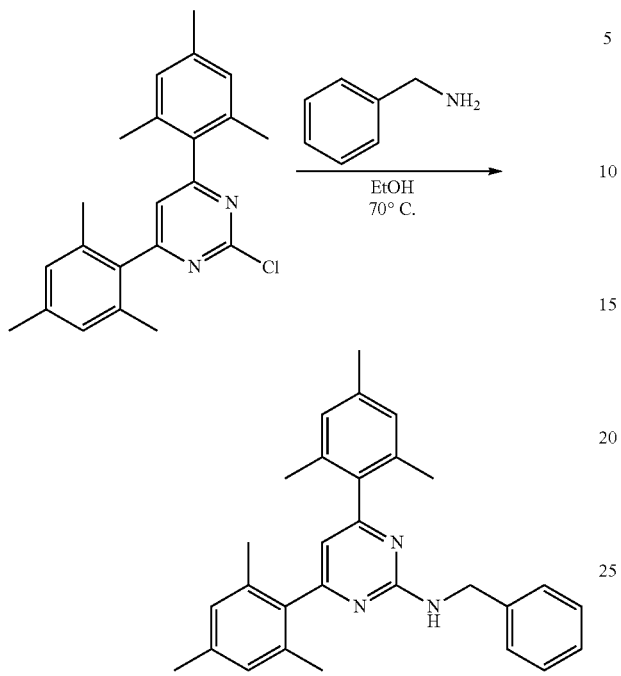

Synthesis of N-benzyl-4,6-dimesitylpyrimidin-2-amine

An oven-dried vial was charged with 2-chloro-4,6-dimesitylpyrimidine (0.72 g, 2.04 mmol), benzylamine (0.88 g, 8.16 mmol)) and ethanol (12 mL). The reaction mixture was stirred in a preheated metal block at 70° C. after which the mixture was filtered. The solid was washed with cold ethanol (3×5 mL) to afford the desired ligand as a white solid (1.82 g, 89%). $^1$H NMR (500 MHz, CDCl$_3$) δ 7.39-7.20 (m, 5H), 6.91 (s, 4H), 6.45 (s, 1H), 5.61 (t, J=6.0 Hz, 1H), 4.67 (d, J=5.9 Hz, 2H), 2.30 (s, 6H), 2.13 (s, 12H). $^{13}$C NMR (126 MHz, CDCl$_3$) δ 171.00, 168.67, 162.86, 139.62, 138.91, 137.72, 135.06, 128.67, 128.40, 127.27, 126.89, 112.60, 45.36, 21.13, 20.12.

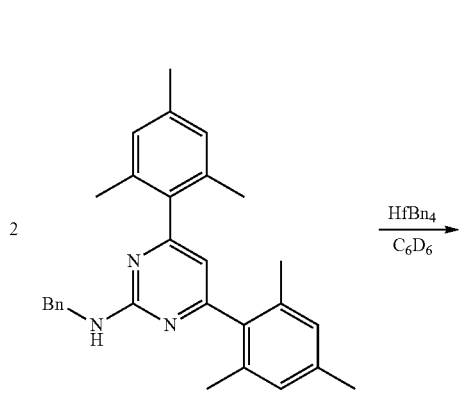

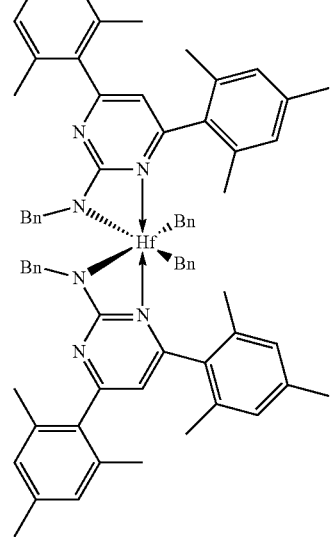

Synthesis of Bis-[2,1]-hafnium(dibenzyl)(N-benzyl-4,6-dimesitylpyrimidin-2-amine) (Procatalyst 4)

An oven-dried vial was charged with N-benzyl-4,6-dimesitylpyrimidin-2-amine (0.05 g, 0.12 mmol). In a nitrogen filled glovebox, tetrabenzylhafnium(IV) (0.032 g, 0.059 mmol) was added followed by benzene-d$_6$ (1.5 mL). The solids were dissolved to obtain a clear yellow solution. An aliquot was removed and the NMR spectrum showed complete conversion of starting material to bisligated Hf-metal complex. The reaction mixture was concentrated to afford the desired metal complex as a yellow solid (0.071 g, 100%). $^1$H NMR (400 MHz, C$_6$D$_6$, 70° C.) δ 7.17-6.92 (m, 34H), 6.84-6.60 (m, 16H), 5.95 (d, J=2.3 Hz, 2H), 4.23 (s, 4H), 2.22 (s, 12H), 2.18-2.00 (m, 39H), 1.77 (s, 3H). $^{13}$C NMR (101 MHz, C$_6$D$_6$, 70° C.) δ 173.73, 171.23, 165.94, 146.71, 140.95, 138.37, 137.59, 136.81, 134.85, 134.47, 133.99, 128.80, 128.48, 128.42, 128.16, 128.03, 128.01, 127.87, 127.10, 126.02, 125.15, 121.30, 49.86, 20.81, 20.52, 20.40, 19.91, 19.67. (All peaks listed in $^1$H and $^{13}$C-NMR. Exist as mixture of isomers at ambient and elevated temperatures.)

Synthesis of Procatalyst 5

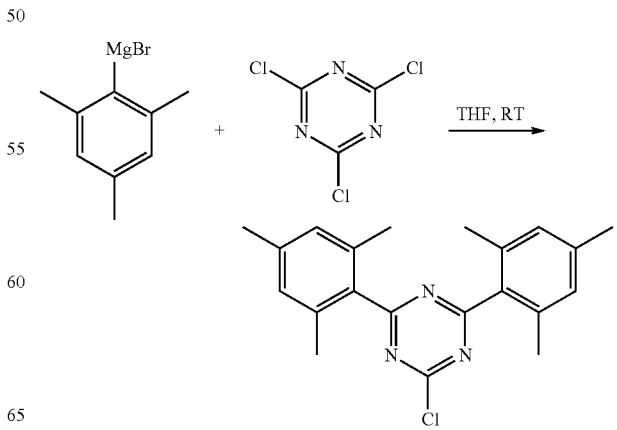

Synthesis of 2-chloro-4,6-dimesityl-1,3,5-triazine

A 100 mL jar was charged with cyanuric chloride (3.0 g, 16.27 mmol) and anhydrous tetrahydrofuran (35 mL). Inside a nitrogen filled glove box, mesitylmagnesium bromide in 1 M diethylether (44 mL, 43.93 mmol) was added dropwise. The reaction mixture was allowed to stir at room temperature overnight. The reaction mixture was concentrated and quenched with water (50 mL) outside the glove box. The reaction mixture was diluted with dichloromethane and the organic phase was washed with water and then dried over anhydrous magnesium sulfate to afford the desired product as an orange solid (5.0 g, 88%). ¹H NMR (400 MHz, CDCl₃) δ 7.09-6.71 (m, 4H), 2.31 (d, J=0.8 Hz, 6H), 2.17 (d, J=0.6 Hz, 12H). ¹³C NMR (101 MHz, CDCl₃) δ 178.46, 171.49, 139.51, 135.35, 133.14, 128.73, 21.16, 19.96.

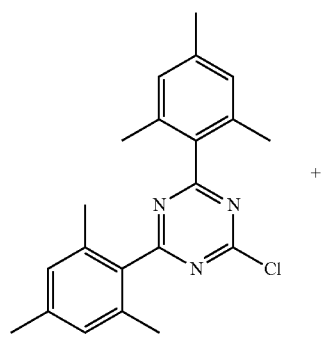

+

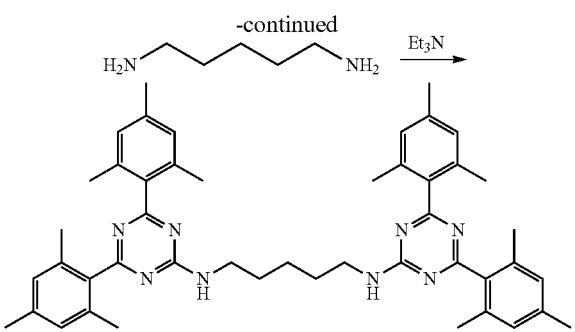

Synthesis of N¹,N⁵-bis(4,6-dimesitylpyrimidin-2-yl)pentane-1,5-diamine

An oven-dried vial was charged with 2-chloro-4,6-dimesitylpyrimidine (0.06 g, 0.59 mmol), cadaverine (0.41 g, 1.17 mmol), triethylamine (0.3 mL, 2.35 mmol) and ethanol (12 mL). The reaction mixture was stirred in a preheated metal block at 70° C. after which the mixture was filtered. The solid was washed with cold ethanol (3×5 mL) to afford the desired ligand as a grey solid (0.26 g, 60%). ¹H NMR (400 MHz, CDCl₃) δ 6.95-6.85 (m, 8H), 6.37 (s, 2H), 5.21 (t, J=5.7 Hz, 2H), 3.39 (td, J=7.2, 5.8 Hz, 4H), 2.29 (s, 12H), 2.13 (s, 24H), 1.72-1.52 (m, 4H), 1.52-1.33 (m, 2H). ¹³C NMR (101 MHz, CDCl₃) δ 168.53, 162.88, 137.62, 136.46, 134.98, 128.36, 112.11, 41.46, 29.64, 24.36, 21.05, 19.97.

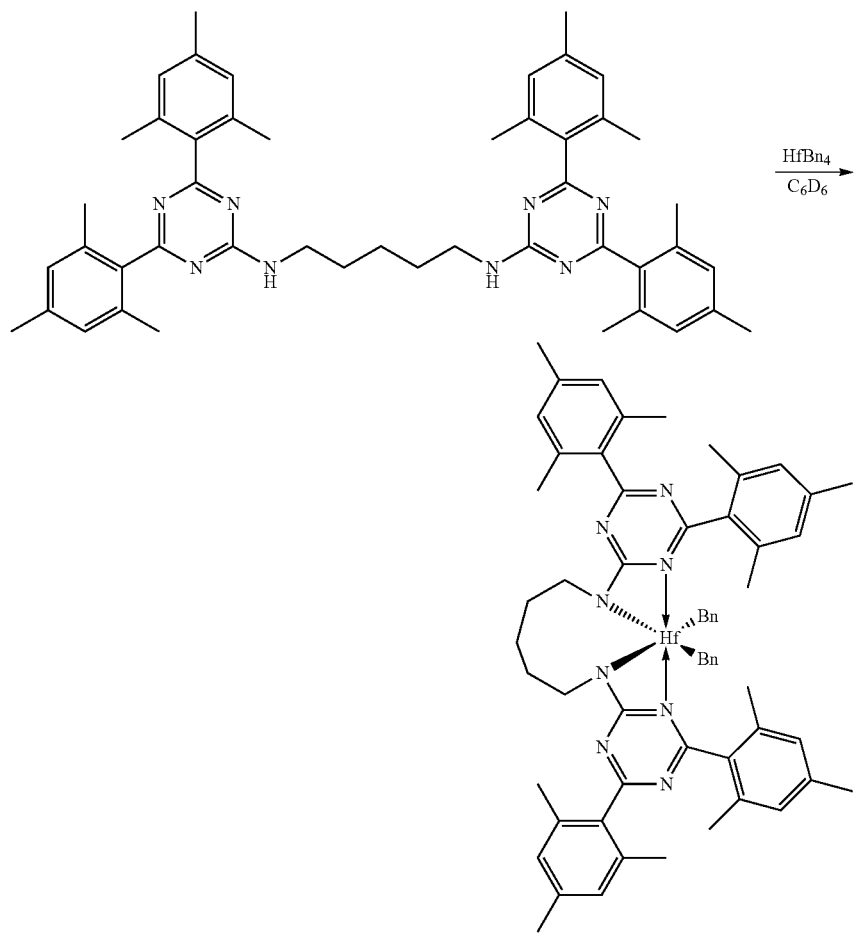

Synthesis of Hafnium(dibenzyl)(N, $N^5$-bis(4,6-dimesitylpyrimidin-2-yl)pentane-1,5-diamine (Procatalyst 5)

An oven-dried vial was charged with $N^1,N^5$-bis(4,6-dimesitylpyrimidin-2-yl)pentane-1,5-diamine (0.06 g, 0.082 mmol). In a nitrogen filled glovebox, tetrabenzylhafnium (IV) (0.044 g, 0.082 mmol) was added followed by benzene-$d_6$ (1.5 mL). The solids were dissolved to obtain a clear yellow solution. An aliquot was removed and the NMR spectrum showed complete conversion of starting material to a mono-ligated Hf-metal complex. The reaction mixture was concentrated to afford the desired metal complex as an orange solid (0.089 g, 100%). $^1$H NMR (400 MHz, $C_6D_6$, 70° C.) δ 7.39-6.87 (m, 34H), 6.89-6.49 (m, 21H), 3.40 (s, 4H), 2.54-2.15 (m, 30H), 2.16-1.75 (m, 53H), 1.52-1.22 (m, 7H), 1.19-0.56 (m, 5H). $^{13}$C NMR (101 MHz, $C_6D_6$, 70° C.) δ 138.45, 137.99, 137.39, 136.20, 134.80, 134.55, 128.81, 128.47, 128.19, 128.02, 125.16, 122.30, 30.09, 20.84, 20.59, 20.48, 19.83, 19.18. (All peaks listed in $^1$H and $^{13}$C-NMR. Exist as mixture of isomers at ambient and elevated temperatures.) Synthesis of Procatalyst 6

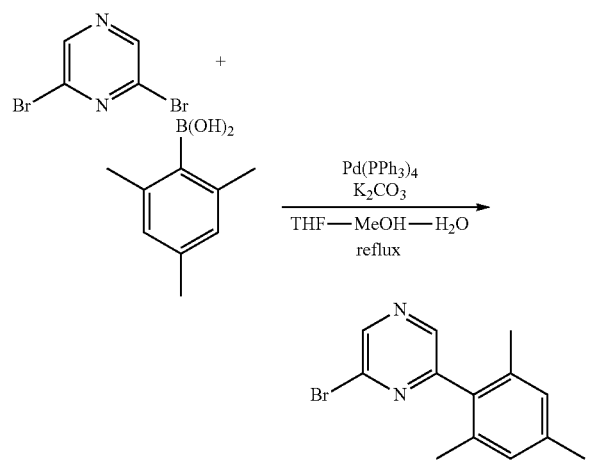

Synthesis of 2-bromo-6-mesitylpyrazine 2,6-Dibromopyridine (3.0 g, 12.5 mmol), 2,4,6-trimethylphenylboronic acid (2.28 g, 13.87 mmol) were dissolved in a solution of MeOH (60 mL), THF (100 mL) and aqueous 2M potassium carbonate (42 mL). The solution was degassed for 45 minutes after which, tetrakistriphenylphosphinepalladium(0) (0.1 g, 0.088 mmol) in THF (5 mL) was added. The solution was refluxed for 12 h at 90° C. The solvent was evaporated and the residue redissolved in DCM. The organic phase was washed with water and then dried over anhydrous magnesium sulfate. The product was purified by reverse phase ISCO chromatography with a RediSep C18 150 g Gold column using 20-100% water-tetrahydrofuran gradient until the title compound eluted. The pure fractions were concentrated to remove tetrahydrofuran, and the aqueous mixture was redissolved in dichloromethane. The organic phase was separated, dried over anhydrous magnesium sulfate, and concentrated to afford the desired product as a white solid (1.1 g, 32%). $^1$H NMR (400 MHz, $CDCl_3$) δ 8.54 (d, J=0.5 Hz, 1H), 8.34 (d, J=0.5 Hz, 1H), 6.85 (dt, J=1.3, 0.7 Hz, 2H), 2.22 (d, J=0.7 Hz, 3H), 1.95 (d, J=0.6 Hz, 6H). $^{13}$C NMR (101 MHz, $CDCl_3$) δ 156.05, 145.00, 143.65, 140.24, 138.90, 136.02, 132.39, 128.55, 21.01, 20.12.

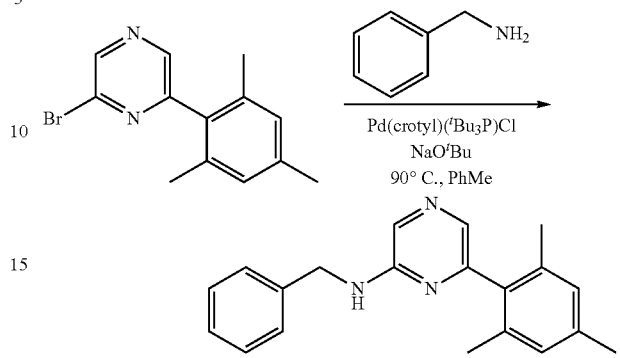

Synthesis of N-benzyl-6-mesitylpyrazin-2-amine

An oven-dried 40 mL vial was charged with 2-bromo-6-mesitylpyrazine (0.29 g, 1.03 mmol), benzylamine (0.5 mL, 4.1 mmol) sodium tert-butoxide (0.2 g, 2.06 mmol) and anhydrous toluene (4 mL) inside a glove box. Chloro(crotyl)(tri-tert-butylphosphine)palladium(II) (0.21 g, 0.051 mmol) was added and the reaction mixture was refluxed for 20 hours. The brown-colored solution was filtered through a pad of silica using dichloromethane, and the solvent was removed under rotary evaporation to yield oil. The crude oil was dry-packed on silica gel and purified on an ISCO instrument with a Redi Sep 40 g column using a 0-50% ethyl acetate-hexanes gradient until the titled compound eluded. The pure fractions were concentrated by rotary evaporation to afford a white solid (0.15 g, 30%). $^1$H NMR (400 MHz, $CDCl_3$) δ 7.82 (s, 1H), 7.76 (s, 1H), 7.36-7.25 (m, 5H), 6.91 (dd, J=1.3, 0.7 Hz, 2H), 4.97 (t, J=5.9 Hz, 1H), 4.54 (d, J=5.8 Hz, 2H), 2.30 (s, 3H) 2.05 (d, J=0.6 Hz, 6H). $^{13}$C NMR (101 MHz, $CDCl_3$) δ 153.92, 152.57, 138.58, 137.85, 136.15, 134.63, 133.90, 129.03, 128.66, 128.37, 127.48, 127.41, 45.71, 21.04, 20.11.

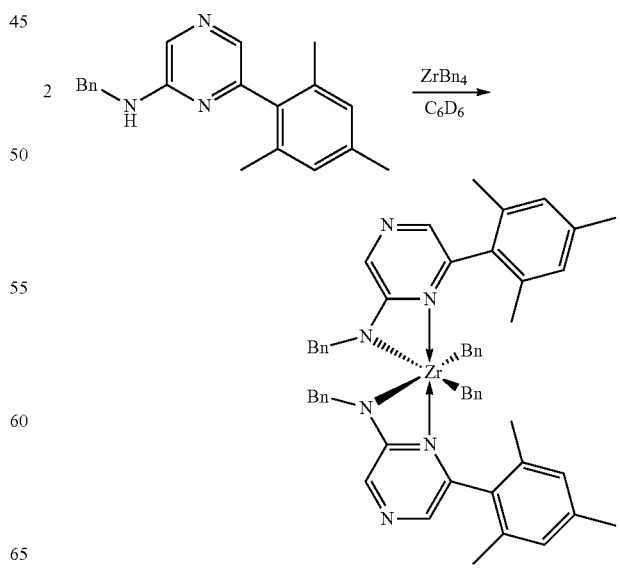

Synthesis of Bis-[2,1]-zirconium(dibenzyl)(N-benzyl-6-mesitylpyrazin-2-amine) (Procatalyst 6)

An oven-dried vial was charged with N-benzyl-6-mesitylpyrazin-2-amine (0.029 g, 0.096 mmol). In a nitrogen filled glovebox, tetrabenzylzirconium(IV) (0.022 g, 0.048 mmol) was added followed by benzene-$d_6$ (1.5 mL). The solids were dissolved to obtain a clear yellow solution. An aliquot was removed and the NMR spectrum showed complete conversion of starting material to bis-ligated Zr-metal complex. The reaction mixture was concentrated to afford the desired metal complex as an orange solid (0.042 g, 100%). $^1$H NMR (500 MHz, $C_6D_6$, 70° C.) δ 7.66 (d, J=4.3 Hz, 2H), 7.60 (d, J=4.5 Hz, 2H), 7.19-6.59 (m, 54H), 3.77 (s, 4H), 2.26-1.87 (m, 27H), 1.82 (s, 12H). $^{13}$C NMR (126 MHz, $C_6D_6$, 70° C.) δ 164.43, 148.57, 144.58, 139.48, 138.25, 137.39, 136.18, 133.04, 132.71, 129.28, 129.18, 128.80, 128.70, 128.47, 128.39, 128.26, 128.22, 128.02, 127.19, 126.89, 126.71, 125.16, 122.11, 81.02, 51.25, 20.83, 20.47, 19.98, 19.75. (All peaks listed in $^1$H and $^{13}$C-NMR. Exist as mixture of isomers at ambient and elevated temperatures.)

Synthesis of Procatalyst 7

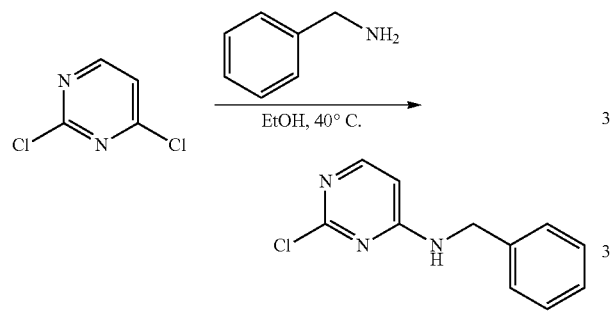

Synthesis of N-benzyl-2-chloropyrimidin-4-amine

An oven-dried vial was charged with 2,4-dichloropyrimidine (1.0 g, 6.88 mmol), benzylamine (0.8 mL, 7.57 mmol) and ethanol (20 mL). The reaction mixture was stirred in a preheated metal block at 40° C. after which the mixture was filtered. The solid was washed with cold ethanol (3×5 mL) to afford the literature reported compound as a white solid (1.2 g, 80%). $^1$H NMR (400 MHz, $C_6D_6$) δ 7.89 (d, J=5.9 Hz, 1H), 7.30-7.16 (m, 5H), 6.12 (d, J=5.9 Hz, 1H), 4.44 (s, 2H).

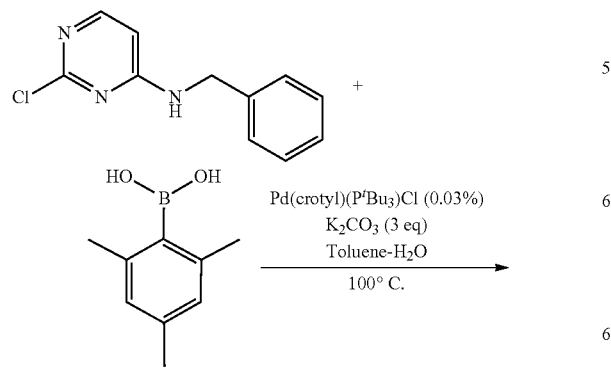

Synthesis of N-benzyl-2-mesitylpyrimidin-4-amine

A 40 mL vial was charged with N-benzyl-2-chloropyrimidin-4-amine (0.3 g, 1.37 mmol), 2,4,6-trimethylphenylboronic acid (0.34 g, 2.05 mmol) and potassium carbonate (0.57 g, 4.10 mmol). After adding toluene (5 mL) and water (0.5 mL) to the reaction mixture, the vial was sealed and the reaction mixture was degassed for 30 minutes after which, chloro(crotyl)(tri-tert-butylphosphine)palladium(II) (0.016 g, 0.041 mmol) in THF (1 mL) was added. The solution was refluxed for 12 h at 100° C. The solvent was evaporated, and the residue redissolved in DCM. The organic phase was washed with water, and then dried over anhydrous magnesium sulfate. The product was purified on an ISCO instrument with a Redi Sep 40 g column using 0-50% ethyl acetate-hexanes gradient until the title compound eluded as a white solid (0.1 g, 25%). $^1$H NMR (400 MHz, CDCl$_3$) δ 8.44-8.10 (m, 1H), 7.36-7.24 (m, 5H), 6.82 (dd, J=1.3, 0.7 Hz, 2H), 6.20 (d, J=6.0 Hz, 1H), 4.39 (s, 2H), 2.25 (s, 3H), 2.07 (d, J=0.6 Hz, 6H). $^{13}$C NMR (101 MHz, CDCl$_3$) δ 167.82, 162.41, 155.97, 137.29, 136.97, 135.00, 128.73, 128.21, 127.45, 127.10, 45.25, 21.07, 19.62.

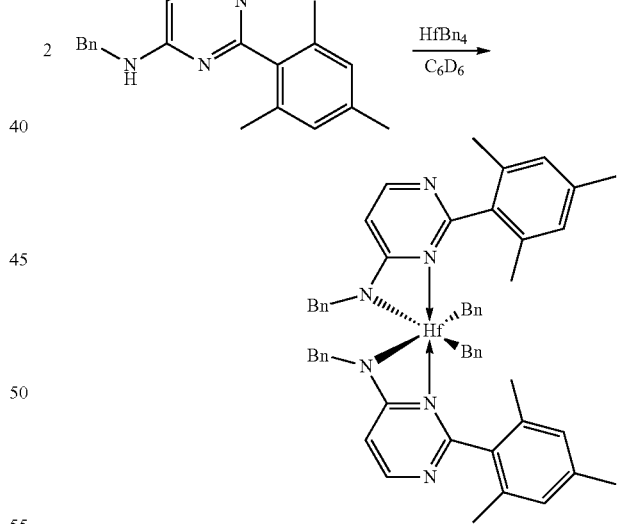

Synthesis of Bis-[2,1]-hafnium(dibenzyl)(N-benzyl-2-mesitylpyrimidin-4-amine) (Procatalyst 7)

An oven-dried vial was charged with N-benzyl-2-mesitylpyrimidin-4-amine (0.03 g, 0.099 mmol). In a nitrogen filled glovebox, tetrabenzylhafnium(IV) (0.027 g, 0.049 mmol) was added followed by benzene-$d_6$ (1.5 mL). The solids were dissolved to obtain a clear yellow solution. An aliquot was removed and the NMR spectrum showed complete conversion of starting material to bis-ligated Hf-metal complex. The reaction mixture was concentrated to afford the desired metal complex as a yellow solid (0.048 g, 100%). $^1$H NMR (500 MHz, C$_6$D$_6$) δ 7.91 (d, J=6.2 Hz, 2H), 7.81 (d, J=6.1 Hz, 2H), 7.16-6.93 (m, 49H), 6.92-6.76 (m, 16H), 6.65 (d, J=6.9 Hz, 8H), 6.46 (d, J=7.6 Hz, 11H), 5.59 (d, J=6.2 Hz, 2H), 5.46 (d, J=6.2 Hz, 2H), 4.28 (s, 4H), 2.14 (s, 6H), 2.08 (d, J=7.6 Hz, 23H), 1.99 (s, 6H), 1.75 (s, 12H). $^{13}$C NMR (126 MHz, C$_6$D$_6$) δ 173.05, 171.83, 165.12, 165.02, 158.81, 158.52, 146.39, 142.28, 139.12, 138.66, 138.53, 137.57, 137.48, 135.80, 135.41, 134.99, 129.24, 128.92, 128.67, 128.33, 128.24, 128.15, 127.30, 126.84, 126.80, 126.25, 125.28, 123.27, 121.66, 100.76, 100.04, 86.73, 84.52, 50.75, 50.47, 21.03, 20.68, 20.64, 19.93, 19.41.

(All peaks listed in $^1$H and $^{13}$C-NMR. Exist as mixture of isomers at ambient and elevated temperatures.)

Batch Reactor Polymerization Procedure

The batch reactor polymerizations were conducted in a 2 L PARR batch reactor. The reactor is heated by an electrical heating mantle, and is cooled by an internal serpentine cooling coil containing cooling water. Both the reactor and the heating/cooling system are controlled and monitored by a CAMILE TG process computer. The bottom of the reactor is fitted with a dump valve, which empties the reactor contents into a stainless steel dump pot, which is prefilled with a catalyst kill solution (typically 5 mL of a IRGAFOS®/IRGANOX®/toluene mixture). The dump pot is vented to a 30 gal. blow-down tank, with both the pot and the tank purged with nitrogen.

All solvents used for polymerization or catalyst makeup are run through solvent purification columns to remove any impurities that may affect polymerization. The 1-octene and ISOPAR® E were passed through 2 columns, the first containing A2 alumina, the second containing Q5. (ISOPAR® E is an isoparaffin fluid, typically containing less than 1 ppm benzene and less than 1 ppm sulfur, which is commercially available from ExxonMobil Chemical Company.) The ethylene was passed through 2 columns, the first containing A204 alumina and 4Å mol sieves, the second containing Q5 reactant. The N$_2$, used for transfers, was passed through a single column containing A204 alumna, 4Å mol sieves and Q5.

The reactor is loaded first from the shot tank that may contain ISOPAR® E solvent and/or 1-octene, depending on desired reactor load. The shot tank is filled to the load set points by use of a lab scale to which the shot tank is mounted. After liquid feed addition, the reactor is heated up to the polymerization temperature set point. If ethylene is used, it is added to the reactor when at reaction temperature to maintain reaction pressure set point. Ethylene addition amounts are monitored by a micro-motion flow meter.

The catalyst and activators were mixed with the appropriate amount of purified toluene to achieve a desired molarity solution. The catalyst and activators were handled in an inert glove box, drawn into a syringe and pressure transferred into the catalyst shot tank. This was followed by 3 rinses of toluene, 5 mL each. Immediately after catalyst addition the run timer begins. If ethylene was used, it was then added by the CAMILE to maintain reaction pressure set point in the reactor. These polymerizations were run for 10 min., then the agitator was stopped and the bottom dump valve opened to empty reactor contents to the dump pot. The dump pot contents are poured into trays placed in a lab hood where the solvent is evaporated off overnight. The trays containing the remaining polymer are then transferred to a vacuum oven, where they are heated up to 140° C. under vacuum to remove any remaining solvent. After the trays cool to ambient temperature, the polymers are weighed for yield/efficiencies, and submitted for polymer testing.

Polymer examples were prepared following the batch reactor process using the following conditions: 120° C.: 280 psig ethylene, 300 g 1-octene, 609 g ISOPAR® E, 10 umol MMAO-3A, 1.2 eq. of bis(hydrogenated tallow alkyl)methylammonium tetrakis(pentafluorophenyl)borate to catalyst. Conditions at 150° C.: 331 psig ethylene, 300 g 1-octene, 546 g ISOPAR® E, 10 umol MMAO-3A, 1.2 eq. of bis(hydrogenated tallow alkyl)methylammonium tetrakis(pentafluorophenyl)borate to catalyst. Conditions at 190° C.: 400 psig ethylene, 300 g 1-octene, 520 g ISOPAR® E, 10 umol MMAO-3A, 1.2 eq. of bis(hydrogenated tallow alkyl)methylammonium tetrakis(pentafluorophenyl)borate to catalyst. All reactions were run for 10 minutes. All polymerizations were performed with bis(hydrogenated tallow alkyl)methylammonium tetrakis(pentafluorophenyl)borate as the activator and MMAO as the scavenger.

Test Methods

Data for batch polymerizations conducted according to the foregoing procedure using Procatalysts 1-7 and Comparative Catalyst C1 are provided in Table 1. Test methods for generating the batch polymerization data will now be described.

Catalyst Efficiency (Efficiency)

The catalyst efficiency is calculated by dividing the number of grams of the polyolefin copolymer prepared by the total number of grams of metal M of ingredient (a) employed (i.e., metal M of the at least one metal-ligand complex of Formula (I)) (i.e., catalyst efficiency is grams of polyolefin copolymer prepared divided by grams metal M of metal-ligand complex(es) of Formula (I) employed).

SymRAD HT-GPC Analysis

The molecular weight data was determined by analysis on a hybrid Symyx/Dow built Robot-Assisted Dilution High-Temperature Gel Permeation Chromatographer (Sym-RAD-GPC). The polymer samples were dissolved by heating for 120 minutes at 160° C. in 1,2,4-trichlorobenzene (TCB) at a concentration of 10 mg/mL stabilized by 300 ppm of butylated hydroxyl toluene (BHT). Each sample was then diluted to 1 mg/mL immediately before the injection of a 250 μL aliquot of the sample. The GPC was equipped with two Polymer Labs PLgel 10 μm MIXED-B columns (300× 10 mm) at a flow rate of 2.0 mL/minute at 160° C. Sample detection was performed using a PolyChar IR4 detector in concentration mode. A conventional calibration of narrow polystyrene (PS) standards was utilized with apparent units adjusted to homo-polyethylene (PE) using known Mark-Houwink coefficients for PS and PE in TCB at this temperature.

Differential Scanning Calorimetry (DSC) Analysis

Melt temperature (Tm), glass transition temperature (Tg), crystallization temperature (Tc) and Heat of Melt may be measured by differential scanning calorimetry (DSC Q2000, TA Instruments, Inc.) using a Heat-Cool-Heat temperature profile. Open-pan DSC samples of 3-6 mg of polymer are first heated from room temperature to setpoint at 10° C. per min. Traces are analyzed individually using TA Universal Analysis software or TA Instruments TRIOS software.

1-Octene Incorporation IR Analysis

HT-GPC analysis preceded the IR analysis since the diluted GPC solutions were used for the IR depositions. A 56-well HT silicon wafer was utilized for deposition and analysis of 1-octene incorporation of the samples. Samples were heated to 160° C. for 210 minutes, then deposited while being heated using a Tecan MiniPrep 75 deposition station. The 1,2,4-trichlorobenzene was evaporated off the deposited wells of the wafer at 160° C. under nitrogen purge and 1-Octene analysis was performed on the HT silicon wafer using a NEXUS 670 FT-IR. Octene incorporation is determined based on the integration of $CH_3$ vs. $CH_2$ stretching frequencies. This measurement is calibrated with ethylene 1-octene copolymer standards for which the 1-octene content is verified by NMR analysis.

In Tables 1, 2, and 3, Procatalysts according to embodiments of this disclosure are referred to by their number whereas Comparative Procatalysts are referred to by their number preceded by "C". Polymer examples prepared using procatalysts according to embodiments of this disclosure are preceded by "P" whereas polymer examples prepared using Comparative Procatalysts are preceded by "CP".

TABLE 1

Batch Reactor Polymerization Data

| Polymer Example No. | Procatalyst No. | Mw (g/mol) | PDI | Efficiency (g poly/g Metal) | Mol % Octene | Reaction Temp (° C.) |
|---|---|---|---|---|---|---|
| CP1 | C1 | 656,000 | 4.44 | 249,000 | 0.7 | 120 |
| P1 | 1 | 668,601 | 3.07 | 264,254 | 3.3 | 150 |
| P2 | 1 | 1,039,128 | 78.4 | 410,387 | 4.4 | 120 |
| P3 | 1 | 135,246 | 16.7 | 72,349 | 2.7 | 190 |
| P4 | 2 | 336,316 | 16.8 | 144,333 | 2.3 | 150 |
| P5 | 2 | 487,398 | 10.6 | 304,196 | 2.4 | 120 |
| P6 | 3 | 744,233 | 7.58 | 69,098 | 5.4 | 120 |
| P7 | 3 | 658,937 | 3.08 | 25,211 | 0.7 | 150 |
| P8 | 4 | 406,504 | 5.71 | 109,620 | 3.0 | 150 |
| P9 | 5 | 257,356 | 8.25 | 15,687 | 1.4 | 150 |
| P10 | 6 | 128,955 | 3.99 | 43,848 | N.D. | 150 |

Chain transfer to a potential chain shuttling agent is necessary for a catalyst to participate in a chain shuttling polymerization process. A catalyst's chain shuttling ability is initially evaluated by running a campaign in which the level of a chain transfer agent (CTA) is varied to observe the depression in molecular weight indicative of chain transfer. The molecular weight of polymer generated by catalysts with good chain shuttling potential will be more sensitive to the addition of CTA than the polymer molecular weight generated by poorer shuttling catalysts.

The Mayo equation (Equation 1) describes how a chain transfer agent decreases the number average chain length ($\overline{X_n}$) from the native number average chain length ($\overline{X_{n0}}$) where no chain transfer agent is present. Equation 2 defines a chain transfer constant, Ca, as the ratio of chain transfer and propagation rate constants. By assuming that the vast majority of chain propagation occurs through ethylene insertion and not comonomer incorporation, Equation 3 describes the expected $M_n$ of a polymerization. $M_{n0}$ is the native molecular weight of the catalyst in the absence of chain shuttling agent and $M_n$ is the molecular weight that is observed with chain transfer agent ($M_n = M_{n0}$ with no chain shuttling agent). Equation 3 ignores the contribution of chain growth from comonomer incorporation, thus it is only applicable for poor incorporating catalysts.

$$\frac{1}{\overline{X_n}} = \frac{1}{\overline{X_{n0}}} + \frac{k_{tr}[\text{chain transfer agent}]}{k_p[\text{monomer}]} \quad \text{Equation 1}$$

$$Ca = \frac{k_{tr}}{k_p} \quad \text{Equation 2}$$

$$\frac{1}{Mn} = \frac{1}{Mn_0} + Ca\frac{[CSA]}{[\text{ethylene}] \times 28} \quad \text{Equation 3}$$

To determine the chain transfer rates for Procatalysts 1, 2, 4 and 7 polymerizations were conducted in the presence of diethylzinc. The $M_n$ for each run was calculated using Equation 3 with the values of Ca and $M_{n0}$ fit using the Microsoft Excel Solver to minimize the squared deviations between the fitted and experimental molecular weight data for all the runs with a particular catalyst. The decrease in polymer polydispersity (PDI or Mw/Mn or MWD) as the diethylzinc concentration increases is an indication that Procatalysts 1, 2, and 4 may undergo reversible chain transfer with dialkyl zinc species (i.e., chain shuttling) as opposed to irreversible chain transfer. These experiments were run in order to evaluate chain transfer performance.

Results from the experiments described above are provided in Table 2 in a batch reactor using the following conditions: 150° C.: 12 g ethylene, 57 g 1-octene, 528 g, ISOPAR® E, 1.2 eq. bis(hydrogenated tallow alkyl)methylammonium tetrakis (pentafluoro-phenyl)borate activator to catalyst, 10 μmol MMAO-3A.

TABLE 2

Chain Transfer Data

| Polymer Example | Procatalyst | Temp (° C.) | Catalyst Loading (μmol) | DEZ loading (μmol) | Polymer Yield (g) | Mw (g/mol) | PDI |
|---|---|---|---|---|---|---|---|
| P11 | 2 | 150 | 2.0 | 0 | 7.4 | 298,532 | 7.36 |
| P12 | 2 | 150 | 3.25 | 542 | 10.6 | 27,231 | 3.53 |
| P13 | 2 | 150 | 3.5 | 2,169 | 7.5 | 5,660 | 3.8 |
| P14 | 1 | 150 | 1.5 | 0 | 19.6 | 404,946 | 3.97 |
| P15 | 1 | 150 | 2.0 | 542 | 17.8 | 23,534 | 1.52 |
| P16 | 1 | 150 | 2.25 | 2,169 | 6.8 | 1,740 | 1.37 |
| P17 | 4 | 150 | 0.3 | 0 | 0.6 | 408,816 | 2.6 |
| P18 | 4 | 150 | 0.35 | 50 | 0.9 | 170,772 | 1.7 |
| P19 | 4 | 150 | 0.4 | 200 | 1.1 | 76,649 | 2.1 |
| P20 | 7 | 150 | 0.4 | 0 | 0.4 | 507,092 | 4.82 |
| P21 | 7 | 150 | 1.0 | 200 | 1.0 | 71,130 | 6.44 |

Table 3 provides the best fit for chain transfer constant (Ca) values using the Mayo equation.

TABLE 3

Chain Transfer Constants

| Procatalyst | Temp (° C.) | Ca |
|---|---|---|
| 1 | 150 | 0.6 |
| 2 | 150 | 1.1 |
| 4 | 150 | 0.5 |
| 7 | 150 | 2.3 |

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a"

component includes aspects having two or more such components, unless the context clearly indicates otherwise.

The invention claimed is:

1. An olefin polymerization catalyst system comprising a procatalyst component chosen from metal-ligand complexes according to Formula (I):

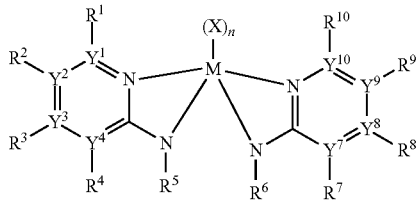

(I)

where:
M is titanium, zirconium, or hafnium;
each X is independently a monodentate or polydentate ligand that is neutral, monoanionic, or dianionic;
n is an integer;
the metal-ligand complex of Formula (I) is overall charge-neutral;
each of $Y^{1-4}$ is independently selected from C or N with the proviso that exactly one of $Y^{1-4}$ is N or exactly two of $Y^{1-4}$ are N;
each of $Y^{7-10}$ is independently selected from C or N with the proviso that exactly one of $Y^{7-10}$ is N or exactly two of $Y^{7-10}$ are N;
$R^1$ and $R^{10}$ are both independently selected from the group consisting of $(C_1-C_{40})$ hydrocarbyl, substituted $(C_1-C_{40})$ hydrocarbyl, $(C_1-C_{40})$ heterohydrocarbyl, substituted $(C_1-C_{40})$ heterohydrocarbyl, and an electron pair;
each of $R^2$, $R^3$, $R^4$, $R^7$, $R^8$, and $R^9$ is independently selected from the group consisting of hydrogen, $(C_1-C_{40})$ hydrocarbyl, substituted $(C_1-C_{40})$ hydrocarbyl, $(C_1-C_{40})$ heterohydrocarbyl, substituted $(C_1-C_{40})$ heterohydrocarbyl, halogen, nitro, and an electron pair; and
$R^5$ and $R^6$ are both independently selected from the group consisting of $(C_1-C_{40})$ hydrocarbyl, substituted $(C_1-C_{40})$ hydrocarbyl, $(C_1-C_{40})$ heterohydrocarbyl, and substituted $(C_1-C_{40})$ heterohydrocarbyl;
any two or more of $R^{1-5}$ optionally may be taken together to form at least one ring structure having from 5 to 16 atoms in the ring excluding any hydrogen atoms;
any two or more of $R^{6-10}$ optionally may be taken together to form at least one ring structure having from 5 to 16 atoms in the ring excluding any hydrogen atoms; and
any two or more of $R^{1-10}$ optionally may be taken together form a linked tetradentate chelant structure.

2. The olefin polymerization catalyst system of claim 1, wherein each X independently is Me, Bn, or Cl.

3. The olefin polymerization catalyst system of claim 1, wherein $R^5$ and $R^6$ are each independently $(C_1-C_{40})$ primary or secondary alkyl groups or substituted primary or secondary alkyl groups.

4. The olefin polymerization catalyst system of claim 1, wherein $R^1$ and $R^{10}$ are aryl, substituted aryl, heteroaryl, or substituted heteroaryl groups.

5. The olefin polymerization catalyst system of claim 1, wherein the metal-ligand complex of Formula (I) is selected from the group consisting of complexes according to Formula (I.a), complexes according to Formula (I.b), complexes according to Formula (I.c), complexes according to Formula (I.d), complexes according to Formula (I.e), and complexes according to Formula (I.f):

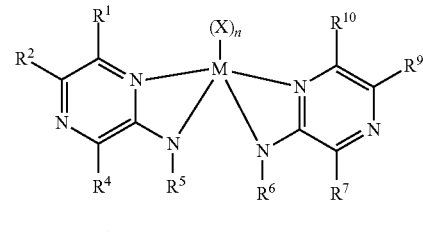

Formula (I.a)

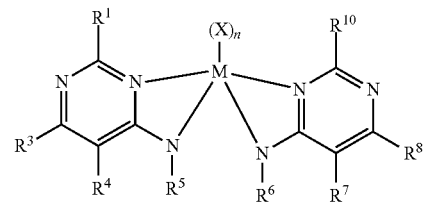

Formula (I.b)

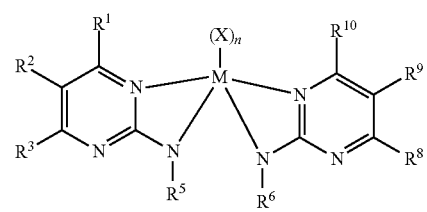

Formula (I.c)

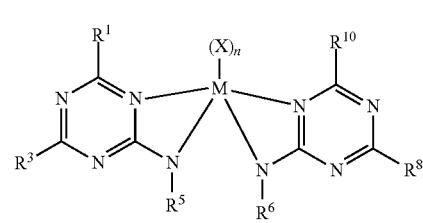

Formula (I.d)

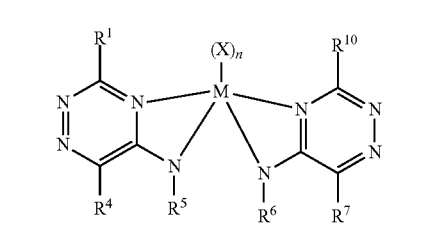

Formula (I.e)

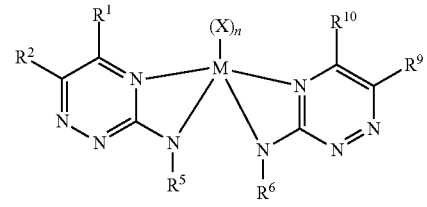

Formula (I.f)

where each of $R^{1-10}$, M, X, and n are as defined in Formula (I).

6. The olefin polymerization catalyst system of claim 5, wherein said metal-ligand complex of Formula (I) is selected from the group consisting of complexes according to Formula (I.a), complexes according to Formula (I.b), complexes according to Formula (I.c), and complexes according to Formula (I.d).

7. The olefin polymerization catalyst system of claim 5, wherein said metal-ligand complex of Formula (I) is a complex according to Formula (I.c).

8. The olefin polymerization catalyst system according to claim 1, wherein said metal-ligand complex of Formula (I) is selected from the group consisting of Procatalysts 1-3:

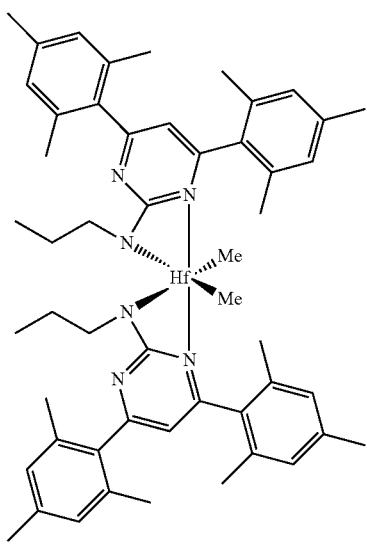

Procatalyst 1

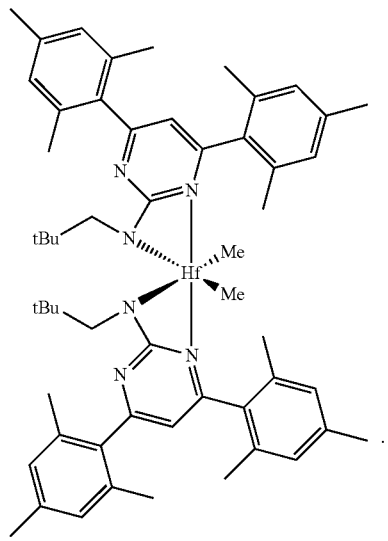

Procatalyst 3

9. The olefin polymerization catalyst system according to claim 1, wherein said metal-ligand complex of Formula (I) is selected from the group consisting of Procatalysts 4-7:

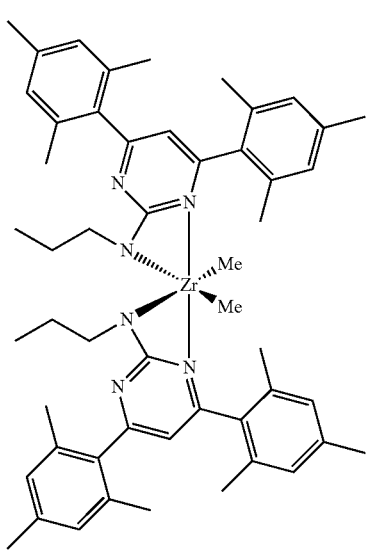

Procatalyst 2

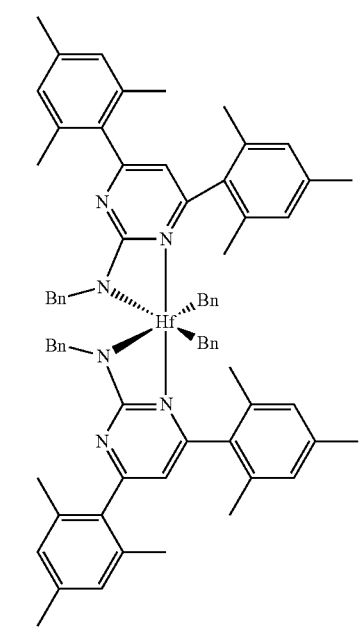

Procatalyst 4

Procatalyst 5

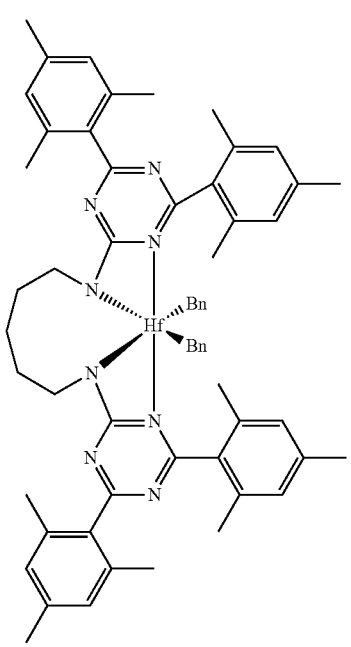

Procatalyst 6

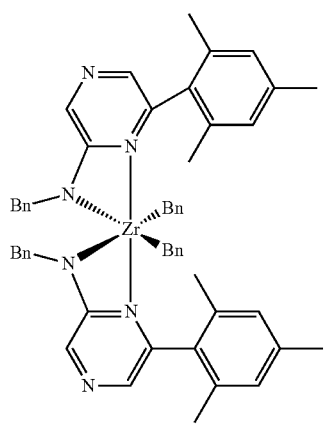

Procatalyst 7

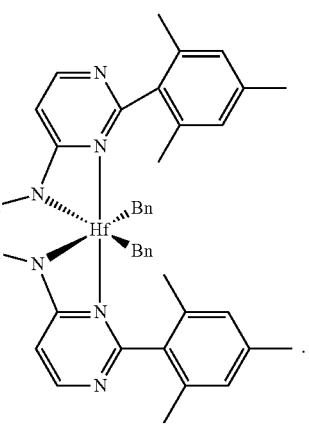

10. The olefin polymerization catalyst system of claim 1, wherein M is zirconium or hafnium.

11. A process for polymerizing one or more olefin-based polymers, the process comprising:

polymerizing one or more olefin monomers in the presence of an olefin polymerization catalyst system according to claim 1.

12. The process according to claim 11, wherein the olefin polymerization catalyst system further comprises an activator and, optionally, a chain transfer agent.

* * * * *